US010013851B2

(12) United States Patent
Inamura et al.

(10) Patent No.: US 10,013,851 B2
(45) Date of Patent: Jul. 3, 2018

(54) GAMING MACHINE

(71) Applicants: Universal Entertainment Corporation, Tokyo (JP); Aruze Gaming (Hong Kong) Limited, Kowloon (HK)

(72) Inventors: Yukinori Inamura, Tokyo (JP); Susumu Mio, Tokyo (JP); Bungo Matsumura, Tokyo (JP); Takehisa Itagaki, Tokyo (JP); Fumihiro Watabe, Tokyo (JP)

(73) Assignees: UNIVERSAL ENTERTAINMENT CORPORATION, Tokyo (JP); ARUZE GAMING (HONG KONG) LIMITED, Kowloon (HK)

( * ) Notice: Subject to any disclaimer, the term of this patent is extended or adjusted under 35 U.S.C. 154(b) by 25 days.

(21) Appl. No.: 15/214,545

(22) Filed: Jul. 20, 2016

(65) Prior Publication Data

US 2017/0032609 A1 Feb. 2, 2017

(30) Foreign Application Priority Data

Jul. 30, 2015 (JP) ................................ 2015-150623

(51) Int. Cl.
*G06F 17/00* (2006.01)
*G07F 17/32* (2006.01)
*G07F 17/34* (2006.01)

(52) U.S. Cl.
CPC ........ *G07F 17/326* (2013.01); *G07F 17/3211* (2013.01); *G07F 17/34* (2013.01)

(58) Field of Classification Search
None
See application file for complete search history.

(56) References Cited

U.S. PATENT DOCUMENTS

2009/0227303 A1* 9/2009 Abe .................... G07F 17/3288 463/6
2009/0239644 A1* 9/2009 Yoshizawa .............. G07F 17/32 463/20
2009/0247273 A1* 10/2009 Bramble ............. G07F 17/3258 463/20

* cited by examiner

*Primary Examiner* — Paul A D'Agostino
(74) *Attorney, Agent, or Firm* — Lex IP Meister, PLLC

(57) ABSTRACT

A gaming machine runs a normal game, and runs a free game when the right to run the free game is awarded. In the free game, symbols are rearranged on a display device and a benefit is awarded based on a combination of the rearranged symbols, bonus random determination is executed based on a bonus random determination table for a number of times corresponding to the number of specific symbols rearranged, the right to run the bonus game obtained as a result of the bonus random determination is accumulatively stored in the running right stocking area of the storage device, and the bonus random determination is repeated for the awarded number of times of the free game. After the end of the free game, the bonus game is serially executed for the number of times of the bonus game accumulatively stored in the running right stocking area.

12 Claims, 90 Drawing Sheets

FIG.8

SYMBOL ARRAYS ON VIDEO REELS FOR NORMAL GAME

| | REEL1 | REEL2 | REEL3 | REEL4 | REEL5 |
|---|---|---|---|---|---|
| 0 | FEATURE | NINE | FEATURE | NINE | FEATURE |
| 1 | QUEEN | TEN | KING | KING | QUEEN |
| 2 | JACK | WILD | GOURD | WILD | ACE |
| 3 | TURTLE | NINE | ACE | NINE | FISH |
| 4 | QUEEN | TEN | NINE | KING | KING |
| 5 | JACK | GOURD | FEATURE | FISH | ACE |
| 6 | GOURD | NINE | TEN | NINE | NINE |
| 7 | QUEEN | TEN | FISH | GOURD | MAN |
| 8 | JACK | FISH | KING | QUEEN | TEN |
| 9 | MAN | JACK | QUEEN | TURTLE | KING |
| 10 | NINE | ACE | TURTLE | NINE | GOURD |
| 11 | DRAGON | TURTLE | KING | GOURD | TEN |
| 12 | QUEEN | NINE | ACE | TEN | QUEEN |
| 13 | JACK | JACK | FEATURE | FEATURE | TURTLE |
| 14 | GOURD | FEATURE | KING | QUEEN | TEN |
| 15 | QUEEN | QUEEN | JACK | DRAGON | FISH |
| 16 | KING | TEN | MAN | NINE | ACE |
| 17 | GOURD | FISH | ACE | TURTLE | TEN |
| 18 | ACE | NINE | DRAGON | ACE | DRAGON |
| 19 | TEN | JACK | KING | KING | ACE |
| 20 | FISH | TURTLE | ACE | MAN | MAN |
| 21 | QUEEN | NINE | WILD | QUEEN | KING |
| 22 | ACE | TEN | KING | JACK | FISH |
| 23 | GOURD | FEATURE | ACE | FEATURE | TEN |
| 24 | QUEEN | NINE | | QUEEN | ACE |
| 25 | JACK | TEN | | TURTLE | TURTLE |
| 26 | GOURD | MAN | | | JACK |
| 27 | QUEEN | ACE | | | ACE |
| 28 | JACK | DRAGON | | | FISH |
| 29 | ACE | KING | | | TEN |
| 30 | | | | | NINE |
| 31 | | | | | MAN |
| 32 | | | | | ACE |
| 33 | | | | | TEN |
| 34 | | | | | |

FIG.9

SYMBOL ARRAYS ON VIDEO REELS FOR FREE GAME (MAN SELECTION)

| | REEL1 | REEL2 | REEL3 | REEL4 | REEL5 |
|---|---|---|---|---|---|
| 0 | FEATURE | NINE | FEATURE | NINE | FEATURE |
| 1 | QUEEN | JACK | ACE | KING | QUEEN |
| 2 | NINE | MAN | FISH | MAN | ACE |
| 3 | FISH | NINE | QUEEN | NINE | FISH |
| 4 | ACE | TEN | MAN | KING | KING |
| 5 | KING | GOURD | NINE | FISH | FEATURE |
| 6 | FISH | KING | GOURD | ACE | NINE |
| 7 | TEN | FISH | KING | MAN | FISH |
| 8 | JACK | ACE | DRAGON | TEN | TEN |
| 9 | MAN | TURTLE | QUEEN | TURTLE | ACE |
| 10 | ACE | KING | GOURD | NINE | FEATURE |
| 11 | DRAGON | GOURD | TEN | GOURD | TEN |
| 12 | KING | TEN | TURTLE | ACE | ACE |
| 13 | TEN | NINE | JACK | FEATURE | TURTLE |
| 14 | MAN | FEATURE | FEATURE | QUEEN | TEN |
| 15 | ACE | QUEEN | TEN | FISH | FEATURE |
| 16 | TEN | TEN | DRAGON | TEN | ACE |
| 17 | TURTLE | MAN | JACK | DRAGON | KING |
| 18 | ACE | ACE | MAN | ACE | DRAGON |
| 19 | NINE | KING | QUEEN | KING | ACE |
| 20 | MAN | DRAGON | TEN | TURTLE | MAN |
| 21 | QUEEN | ACE | MAN | ACE | KING |
| 22 | KING | FEATURE | JACK | QUEEN | FISH |
| 23 | GOURD | TEN | TEN | FEATURE | TEN |
| 24 | JACK | DRAGON | FEATURE | TEN | ACE |
| 25 | TEN | KING | JACK | TURTLE | FEATURE |
| 26 | FISH | MAN | GOURD | NINE | JACK |
| 27 | KING | ACE | QUEEN | KING | ACE |
| 28 | TEN | TURTLE | MAN | DRAGON | FISH |
| 29 | ACE | KING | JACK | NINE | TEN |
| 30 | FEATURE | NINE | GOURD | KING | NINE |
| 31 | QUEEN | TEN | KING | FISH | MAN |
| 32 | NINE | MAN | TURTLE | ACE | ACE |
| 33 | FISH | NINE | ACE | MAN | TEN |
| 34 | ACE | TEN | FISH | TEN | FEATURE |
| 35 | KING | GOURD | TEN | TURTLE | QUEEN |

FIG.10

SYMBOL ARRAYS ON VIDEO REELS FOR FREE GAME (MAN SELECTION)

| | REEL1 | REEL2 | REEL3 | REEL4 | REEL5 |
|---|---|---|---|---|---|
| 36 | FISH | KING | TURTLE | KING | ACE |
| 37 | TEN | FISH | JACK | GOURD | FISH |
| 38 | JACK | ACE | FEATURE | ACE | KING |
| 39 | MAN | TURTLE | QUEEN | FEATURE | FEATURE |
| 40 | ACE | KING | DRAGON | QUEEN | NINE |
| 41 | DRAGON | GOURD | JACK | FISH | FISH |
| 42 | KING | QUEEN | MAN | TEN | TEN |
| 43 | NINE | NINE | QUEEN | DRAGON | ACE |
| 44 | MAN | FEATURE | TEN | ACE | FEATURE |
| 45 | ACE | QUEEN | MAN | KING | TEN |
| 46 | TEN | TEN | KING | MAN | ACE |
| 47 | TURTLE | FISH | TEN | ACE | GOURD |
| 48 | ACE | ACE | | JACK | TEN |
| 49 | NINE | KING | | FEATURE | FEATURE |
| 50 | FISH | DRAGON | | TEN | ACE |
| 51 | QUEEN | ACE | | TURTLE | KING |
| 52 | KING | FEATURE | | | DRAGON |
| 53 | GOURD | TEN | | | ACE |
| 54 | JACK | DRAGON | | | MAN |
| 55 | TEN | KING | | | KING |
| 56 | MAN | MAN | | | FISH |
| 57 | KING | ACE | | | TEN |
| 58 | TEN | TURTLE | | | ACE |
| 59 | ACE | KING | | | FEATURE |
| 60 | | | | | JACK |
| 61 | | | | | ACE |
| 62 | | | | | MAN |
| 63 | | | | | TEN |
| 64 | | | | | NINE |
| 65 | | | | | MAN |
| 66 | | | | | ACE |
| 67 | | | | | TEN |
| 68 | | | | | |

FIG.11

SYMBOL ARRAYS ON VIDEO REELS FOR FREE GAME (DRAGON SELECTION)

| | REEL1 | REEL2 | REEL3 | REEL4 | REEL5 |
|---|---|---|---|---|---|
| 0 | FEATURE | NINE | FEATURE | NINE | FEATURE |
| 1 | JACK | QUEEN | JACK | KING | QUEEN |
| 2 | NINE | DRAGON | MAN | DRAGON | ACE |
| 3 | FISH | NINE | QUEEN | NINE | FISH |
| 4 | ACE | QUEEN | FISH | KING | KING |
| 5 | JACK | GOURD | NINE | DRAGON | FEATURE |
| 6 | FISH | KING | GOURD | ACE | NINE |
| 7 | TEN | FISH | KING | MAN | MAN |
| 8 | JACK | ACE | DRAGON | TEN | TEN |
| 9 | MAN | TURTLE | ACE | TURTLE | QUEEN |
| 10 | ACE | KING | GOURD | NINE | FEATURE |
| 11 | DRAGON | DRAGON | TEN | GOURD | TEN |
| 12 | KING | QUEEN | TURTLE | ACE | ACE |
| 13 | NINE | NINE | JACK | FEATURE | TURTLE |
| 14 | MAN | FEATURE | FEATURE | QUEEN | TEN |
| 15 | QUEEN | QUEEN | QUEEN | FISH | FEATURE |
| 16 | TEN | JACK | MAN | TEN | ACE |
| 17 | TURTLE | DRAGON | JACK | DRAGON | KING |
| 18 | JACK | ACE | DRAGON | ACE | DRAGON |
| 19 | NINE | KING | ACE | KING | ACE |
| 20 | FISH | FISH | TEN | MAN | MAN |
| 21 | JACK | ACE | MAN | ACE | KING |
| 22 | KING | FEATURE | JACK | JACK | TURTLE |
| 23 | GOURD | QUEEN | TEN | FEATURE | TEN |
| 24 | JACK | GOURD | FEATURE | TEN | ACE |
| 25 | TEN | KING | ACE | TURTLE | FEATURE |
| 26 | MAN | MAN | MAN | NINE | JACK |
| 27 | KING | ACE | QUEEN | KING | GOURD |
| 28 | TEN | DRAGON | TURTLE | DRAGON | TEN |
| 29 | ACE | KING | JACK | NINE | FISH |
| 30 | FEATURE | NINE | GOURD | KING | NINE |
| 31 | QUEEN | QUEEN | KING | FISH | DRAGON |
| 32 | NINE | DRAGON | DRAGON | NINE | ACE |
| 33 | FISH | NINE | QUEEN | DRAGON | TEN |
| 34 | ACE | JACK | GOURD | TEN | FEATURE |
| 35 | KING | MAN | TEN | TURTLE | QUEEN |

FIG.12

SYMBOL ARRAYS ON VIDEO REELS FOR FREE GAME (DRAGON SELECTION)

| | REEL1 | REEL2 | REEL3 | REEL4 | REEL5 |
|---|---|---|---|---|---|
| 36 | FISH | KING | FISH | JACK | ACE |
| 37 | TEN | FISH | JACK | GOURD | FISH |
| 38 | JACK | ACE | FEATURE | ACE | QUEEN |
| 39 | MAN | TURTLE | QUEEN | FEATURE | FEATURE |
| 40 | ACE | KING | MAN | QUEEN | NINE |
| 41 | DRAGON | GOURD | JACK | FISH | MAN |
| 42 | KING | QUEEN | DRAGON | TEN | TEN |
| 43 | NINE | TEN | QUEEN | DRAGON | ACE |
| 44 | MAN | FEATURE | TEN | ACE | FEATURE |
| 45 | ACE | QUEEN | DRAGON | KING | TEN |
| 46 | TEN | JACK | JACK | DRAGON | ACE |
| 47 | TURTLE | DRAGON | TEN | ACE | TURTLE |
| 48 | ACE | ACE | | JACK | TEN |
| 49 | NINE | KING | | FEATURE | FEATURE |
| 50 | FISH | FISH | | TEN | ACE |
| 51 | JACK | ACE | | TURTLE | QUEEN |
| 52 | KING | FEATURE | | | DRAGON |
| 53 | GOURD | QUEEN | | | ACE |
| 54 | JACK | GOURD | | | MAN |
| 55 | TEN | KING | | | KING |
| 56 | MAN | DRAGON | | | FISH |
| 57 | KING | ACE | | | TEN |
| 58 | TEN | TURTLE | | | ACE |
| 59 | ACE | KING | | | FEATURE |
| 60 | | | | | JACK |
| 61 | | | | | ACE |
| 62 | | | | | DRAGON |
| 63 | | | | | TEN |
| 64 | | | | | NINE |
| 65 | | | | | DRAGON |
| 66 | | | | | ACE |
| 67 | | | | | TEN |
| 68 | | | | | |

FIG.13

SYMBOL ARRAYS ON VIDEO REELS FOR FREE GAME (FISH SELECTION)

| | REEL1 | REEL2 | REEL3 | REEL4 | REEL5 |
|---|---|---|---|---|---|
| 0 | FEATURE | NINE | FEATURE | NINE | FEATURE |
| 1 | QUEEN | QUEEN | JACK | KING | QUEEN |
| 2 | TEN | FISH | TURTLE | MAN | ACE |
| 3 | FISH | NINE | QUEEN | NINE | TURTLE |
| 4 | ACE | QUEEN | FISH | KING | KING |
| 5 | KING | TURTLE | TEN | FISH | FEATURE |
| 6 | FISH | KING | GOURD | NINE | NINE |
| 7 | TEN | FISH | JACK | MAN | MAN |
| 8 | JACK | QUEEN | FISH | ACE | TEN |
| 9 | MAN | TURTLE | QUEEN | DRAGON | ACE |
| 10 | ACE | KING | GOURD | NINE | FEATURE |
| 11 | DRAGON | GOURD | TEN | GOURD | TEN |
| 12 | JACK | JACK | TURTLE | ACE | ACE |
| 13 | TEN | NINE | JACK | FEATURE | TURTLE |
| 14 | MAN | FEATURE | FEATURE | QUEEN | TEN |
| 15 | ACE | QUEEN | NINE | TURTLE | FEATURE |
| 16 | NINE | JACK | MAN | NINE | ACE |
| 17 | GOURD | FISH | ACE | DRAGON | KING |
| 18 | ACE | ACE | DRAGON | KING | FISH |
| 19 | TEN | KING | NINE | NINE | ACE |
| 20 | FISH | DRAGON | TEN | MAN | MAN |
| 21 | JACK | ACE | GOURD | KING | KING |
| 22 | KING | FEATURE | KING | NINE | FISH |
| 23 | GOURD | NINE | TEN | FEATURE | TEN |
| 24 | JACK | DRAGON | FEATURE | TEN | ACE |
| 25 | TEN | KING | JACK | TURTLE | FEATURE |
| 26 | MAN | FISH | GOURD | NINE | KING |
| 27 | KING | ACE | ACE | KING | GOURD |
| 28 | TEN | TURTLE | FISH | GOURD | TEN |
| 29 | ACE | KING | NINE | NINE | FISH |
| 30 | FEATURE | NINE | GOURD | KING | NINE |
| 31 | JACK | JACK | TEN | FISH | MAN |
| 32 | NINE | FISH | FEATURE | NINE | ACE |
| 33 | GOURD | NINE | QUEEN | MAN | FEATURE |
| 34 | ACE | TEN | GOURD | TEN | KING |
| 35 | KING | TURTLE | TEN | TURTLE | ACE |

FIG.14

SYMBOL ARRAYS ON VIDEO REELS FOR FREE GAME (FISH SELECTION)

| | REEL1 | REEL2 | REEL3 | REEL4 | REEL5 |
|---|---|---|---|---|---|
| 36 | FISH | KING | TURTLE | NINE | FISH |
| 37 | TEN | DRAGON | JACK | GOURD | TEN |
| 38 | JACK | ACE | DRAGON | ACE | KING |
| 39 | MAN | TURTLE | ACE | FEATURE | FEATURE |
| 40 | ACE | KING | MAN | JACK | NINE |
| 41 | TURTLE | GOURD | JACK | GOURD | MAN |
| 42 | KING | QUEEN | TURTLE | TEN | TEN |
| 43 | TEN | NINE | QUEEN | DRAGON | ACE |
| 44 | GOURD | FEATURE | TEN | NINE | FEATURE |
| 45 | ACE | QUEEN | GOURD | KING | TEN |
| 46 | TEN | NINE | KING | MAN | ACE |
| 47 | TURTLE | FISH | TEN | NINE | GOURD |
| 48 | ACE | ACE | | JACK | TEN |
| 49 | TEN | KING | | FEATURE | FEATURE |
| 50 | GOURD | DRAGON | | QUEEN | ACE |
| 51 | JACK | ACE | | TURTLE | JACK |
| 52 | KING | FEATURE | | | DRAGON |
| 53 | GOURD | TEN | | | ACE |
| 54 | JACK | DRAGON | | | MAN |
| 55 | TEN | KING | | | KING |
| 56 | MAN | MAN | | | FISH |
| 57 | KING | ACE | | | TEN |
| 58 | TEN | TURTLE | | | ACE |
| 59 | ACE | KING | | | FEATURE |
| 60 | | | | | JACK |
| 61 | | | | | TURTLE |
| 62 | | | | | TEN |
| 63 | | | | | FISH |
| 64 | | | | | NINE |
| 65 | | | | | MAN |
| 66 | | | | | ACE |
| 67 | | | | | TEN |
| 68 | | | | | |

FIG.15

SYMBOL ARRAYS ON VIDEO REELS FOR FREE GAME (TURTLE SELECTION)

| | REEL1 | REEL2 | REEL3 | REEL4 | REEL5 |
|---|---|---|---|---|---|
| 0 | FEATURE | NINE | FEATURE | NINE | FEATURE |
| 1 | QUEEN | JACK | JACK | KING | QUEEN |
| 2 | NINE | TURTLE | MAN | TURTLE | ACE |
| 3 | FISH | NINE | QUEEN | NINE | FISH |
| 4 | ACE | TEN | FISH | KING | KING |
| 5 | KING | FISH | ACE | FISH | FEATURE |
| 6 | FISH | KING | GOURD | ACE | NINE |
| 7 | TEN | DRAGON | JACK | MAN | MAN |
| 8 | JACK | ACE | TURTLE | TEN | TEN |
| 9 | MAN | TURTLE | QUEEN | FISH | ACE |
| 10 | ACE | KING | GOURD | NINE | FEATURE |
| 11 | DRAGON | GOURD | TEN | GOURD | TEN |
| 12 | KING | TEN | FISH | ACE | ACE |
| 13 | NINE | NINE | JACK | FEATURE | TURTLE |
| 14 | MAN | FEATURE | FEATURE | QUEEN | TEN |
| 15 | ACE | QUEEN | QUEEN | FISH | DRAGON |
| 16 | TEN | TEN | MAN | TEN | ACE |
| 17 | TURTLE | TURTLE | JACK | DRAGON | KING |
| 18 | ACE | ACE | DRAGON | ACE | FEATURE |
| 19 | NINE | KING | QUEEN | KING | ACE |
| 20 | FISH | DRAGON | TEN | MAN | MAN |
| 21 | QUEEN | ACE | TURTLE | ACE | KING |
| 22 | KING | FEATURE | KING | JACK | FISH |
| 23 | GOURD | NINE | NINE | FEATURE | TEN |
| 24 | JACK | DRAGON | FEATURE | TEN | ACE |
| 25 | TEN | KING | JACK | FISH | FEATURE |
| 26 | MAN | GOURD | MAN | NINE | JACK |
| 27 | KING | ACE | QUEEN | KING | GOURD |
| 28 | TEN | TURTLE | TURTLE | GOURD | TEN |
| 29 | ACE | KING | NINE | NINE | FISH |
| 30 | FEATURE | NINE | GOURD | KING | NINE |
| 31 | QUEEN | JACK | QUEEN | TURTLE | MAN |
| 32 | NINE | TURTLE | TURTLE | JACK | ACE |
| 33 | FISH | NINE | JACK | MAN | TEN |
| 34 | ACE | TEN | GOURD | TEN | FEATURE |
| 35 | KING | FISH | TEN | TURTLE | KING |

FIG.16

SYMBOL ARRAYS ON VIDEO REELS FOR FREE GAME (TURTLE SELECTION)

| | REEL1 | REEL2 | REEL3 | REEL4 | REEL5 |
|---|---|---|---|---|---|
| 36 | FISH | KING | FISH | NINE | ACE |
| 37 | TEN | DRAGON | JACK | GOURD | FISH |
| 38 | JACK | ACE | FEATURE | ACE | KING |
| 39 | MAN | TURTLE | QUEEN | FEATURE | FEATURE |
| 40 | ACE | KING | MAN | NINE | NINE |
| 41 | FISH | GOURD | JACK | FISH | MAN |
| 42 | KING | TEN | DRAGON | TEN | TEN |
| 43 | NINE | NINE | ACE | GOURD | ACE |
| 44 | MAN | FEATURE | TEN | ACE | FEATURE |
| 45 | ACE | QUEEN | MAN | KING | TEN |
| 46 | TEN | TEN | JACK | FEATURE | ACE |
| 47 | TURTLE | FISH | TEN | ACE | TURTLE |
| 48 | ACE | ACE | | JACK | TEN |
| 49 | NINE | KING | | MAN | DRAGON |
| 50 | FISH | DRAGON | | TEN | ACE |
| 51 | JACK | ACE | | TURTLE | KING |
| 52 | KING | FEATURE | | | FEATURE |
| 53 | GOURD | TEN | | | ACE |
| 54 | JACK | DRAGON | | | MAN |
| 55 | TEN | KING | | | KING |
| 56 | MAN | MAN | | | FISH |
| 57 | KING | ACE | | | TEN |
| 58 | TEN | TURTLE | | | ACE |
| 59 | ACE | KING | | | FEATURE |
| 60 | | | | | JACK |
| 61 | | | | | ACE |
| 62 | | | | | FISH |
| 63 | | | | | TEN |
| 64 | | | | | NINE |
| 65 | | | | | MAN |
| 66 | | | | | ACE |
| 67 | | | | | TEN |
| 68 | | | | | |

FIG.17

SYMBOL ARRAYS ON VIDEO REELS FOR FREE GAME (GOURD SELECTION)

| | REEL1 | REEL2 | REEL3 | REEL4 | REEL5 |
|---|---|---|---|---|---|
| 0 | FEATURE | NINE | FEATURE | NINE | FEATURE |
| 1 | QUEEN | JACK | ACE | KING | QUEEN |
| 2 | NINE | GOURD | MAN | GOURD | ACE |
| 3 | FISH | NINE | QUEEN | TEN | TURTLE |
| 4 | ACE | TEN | DRAGON | KING | KING |
| 5 | KING | GOURD | NINE | FISH | FEATURE |
| 6 | FISH | JACK | GOURD | ACE | NINE |
| 7 | TEN | FISH | KING | MAN | MAN |
| 8 | JACK | ACE | TURTLE | TEN | QUEEN |
| 9 | MAN | TURTLE | QUEEN | GOURD | ACE |
| 10 | ACE | QUEEN | GOURD | NINE | FEATURE |
| 11 | DRAGON | GOURD | TEN | FISH | NINE |
| 12 | KING | TEN | TURTLE | ACE | ACE |
| 13 | NINE | KING | QUEEN | FEATURE | GOURD |
| 14 | MAN | FEATURE | FEATURE | NINE | QUEEN |
| 15 | ACE | QUEEN | ACE | FISH | FISH |
| 16 | TEN | TEN | MAN | TEN | NINE |
| 17 | TURTLE | FISH | JACK | DRAGON | KING |
| 18 | ACE | ACE | DRAGON | ACE | DRAGON |
| 19 | NINE | KING | ACE | NINE | ACE |
| 20 | FISH | DRAGON | TEN | MAN | MAN |
| 21 | QUEEN | NINE | TURTLE | ACE | KING |
| 22 | KING | FEATURE | QUEEN | QUEEN | FEATURE |
| 23 | GOURD | JACK | TEN | FEATURE | QUEEN |
| 24 | JACK | DRAGON | FEATURE | TEN | ACE |
| 25 | TEN | QUEEN | QUEEN | TURTLE | GOURD |
| 26 | MAN | FISH | MAN | ACE | JACK |
| 27 | KING | KING | KING | KING | ACE |
| 28 | TEN | TURTLE | FISH | DRAGON | GOURD |
| 29 | ACE | ACE | NINE | TEN | QUEEN |
| 30 | FEATURE | NINE | GOURD | NINE | NINE |
| 31 | QUEEN | JACK | KING | FISH | FEATURE |
| 32 | NINE | GOURD | TURTLE | ACE | ACE |
| 33 | FISH | NINE | QUEEN | MAN | TEN |
| 34 | ACE | KING | GOURD | TEN | FEATURE |
| 35 | KING | FISH | TEN | TURTLE | QUEEN |

FIG.18

SYMBOL ARRAYS ON VIDEO REELS FOR FREE GAME (GOURD SELECTION)

| | REEL1 | REEL2 | REEL3 | REEL4 | REEL5 |
|---|---|---|---|---|---|
| 36 | FISH | QUEEN | TURTLE | NINE | ACE |
| 37 | TEN | TURTLE | JACK | MAN | GOURD |
| 38 | QUEEN | ACE | FEATURE | ACE | KING |
| 39 | MAN | MAN | QUEEN | FEATURE | ACE |
| 40 | ACE | QUEEN | MAN | QUEEN | NINE |
| 41 | DRAGON | GOURD | JACK | FISH | FEATURE |
| 42 | KING | ACE | DRAGON | TEN | TEN |
| 43 | NINE | KING | QUEEN | DRAGON | ACE |
| 44 | MAN | FEATURE | TEN | ACE | GOURD |
| 45 | ACE | QUEEN | GOURD | JACK | TEN |
| 46 | TEN | JACK | JACK | MAN | ACE |
| 47 | DRAGON | TURTLE | TEN | ACE | FEATURE |
| 48 | ACE | ACE | FEATURE | NINE | TEN |
| 49 | NINE | NINE | JACK | FEATURE | FISH |
| 50 | FISH | DRAGON | MAN | TEN | ACE |
| 51 | QUEEN | KING | QUEEN | TURTLE | KING |
| 52 | KING | FEATURE | DRAGON | | FEATURE |
| 53 | GOURD | TEN | NINE | | ACE |
| 54 | JACK | DRAGON | GOURD | | MAN |
| 55 | TEN | QUEEN | KING | | KING |
| 56 | MAN | FISH | FISH | | FEATURE |
| 57 | KING | JACK | QUEEN | | TEN |
| 58 | TEN | TURTLE | GOURD | | ACE |
| 59 | ACE | ACE | TEN | | GOURD |
| 60 | | | TURTLE | | TEN |
| 61 | | | JACK | | ACE |
| 62 | | | FEATURE | | FISH |
| 63 | | | QUEEN | | TEN |
| 64 | | | MAN | | JACK |
| 65 | | | JACK | | GOURD |
| 66 | | | DRAGON | | ACE |
| 67 | | | ACE | | TEN |
| 68 | | | TEN | | |
| 69 | | | GOURD | | |
| 70 | | | ACE | | |
| 71 | | | TEN | | |
| 72 | | | | | |

FIG.20

SYMBOL COMBINATION TABLE

| SYMBOL | GRAPHICS | 1 | 2 | 3 | 4 | 5 |
|---|---|---|---|---|---|---|
| WILD | INGOT | 0 | 0 | 0 | 0 | 0 |
| MAN | WEALTH GOD | 0 | 0 | 50 | 100 | 200 |
| DRAGON | DRAGON | 0 | 0 | 30 | 60 | 120 |
| FISH | FISH | 0 | 0 | 25 | 50 | 100 |
| TURTLE | TURTLE | 0 | 0 | 20 | 40 | 80 |
| GOURD | GOURD | 0 | 0 | 15 | 30 | 60 |
| ACE | A | 0 | 0 | 10 | 20 | 50 |
| KING | K | 0 | 0 | 10 | 20 | 50 |
| QUEEN | Q | 0 | 0 | 5 | 15 | 50 |
| JACK | J | 0 | 0 | 5 | 15 | 50 |
| TEN | 10 | 0 | 0 | 5 | 10 | 50 |
| NINE | 9 | 0 | 0 | 5 | 10 | 50 |
| FEATURE※ | MONEY | 0 | 0 | 5 | 10 | 45 |

*PAYOUT & FREE GAME ARE AWARDED IF FEATURE SYMBOL OCCURS IN THREE OR MORE CONSECUTIVE POSITIONS WITHIN A RANGE OF FIRST COLUMN AREA TO FIFTH COLUMN AREA, IRRESPECTIVE OF AREAS ACTIVATED BY WAYS BET

FIG.21

(JACKPOT RANDOM DETERMINATION TABLE)

| TOTAL BET | ON | OFF | TOTAL |
|---|---|---|---|
| 1 | 1 | 4999 | 5000 |
| 2 | 2 | 4998 | 5000 |
| 3 | 3 | 4997 | 5000 |
| 4 | 4 | 4996 | 5000 |
| 5 | 5 | 4995 | 5000 |
| 6 | 6 | 4994 | 5000 |
| 7 | 7 | 4993 | 5000 |
| 9 | 9 | 4991 | 5000 |
| 10 | 10 | 4990 | 5000 |
| 12 | 12 | 4988 | 5000 |
| 14 | 14 | 4986 | 5000 |
| 15 | 15 | 4985 | 5000 |
| 21 | 21 | 4979 | 5000 |
| 28 | 28 | 4972 | 5000 |
| 30 | 30 | 4970 | 5000 |
| 35 | 35 | 4965 | 5000 |
| 45 | 45 | 4955 | 5000 |
| 60 | 60 | 4940 | 5000 |
| 70 | 70 | 4930 | 5000 |
| 75 | 75 | 4925 | 5000 |
| 90 | 90 | 4910 | 5000 |
| 105 | 105 | 4895 | 5000 |
| 120 | 120 | 4880 | 5000 |
| 150 | 150 | 4850 | 5000 |
| 225 | 225 | 4775 | 5000 |
| 300 | 300 | 4700 | 5000 |
| 450 | 450 | 4550 | 5000 |

FIG.22

FEATURE MAN

| TOTAL BET | ON | OFF | TOTAL |
|---|---|---|---|
| 1 | 215037720726 | 99784962279274 | 100000000000000 |
| 2 | 430075441452 | 99569924558548 | 100000000000000 |
| 3 | 645113162178 | 99354886837822 | 100000000000000 |
| 4 | 860150882904 | 99139849117096 | 100000000000000 |
| 5 | 1075188603630 | 98924811396370 | 100000000000000 |
| 6 | 1290226324356 | 98709773675644 | 100000000000000 |
| 7 | 1505264045082 | 98494735954918 | 100000000000000 |
| 9 | 1935339486534 | 98064660513466 | 100000000000000 |
| 10 | 2150377207260 | 97849622792740 | 100000000000000 |
| 12 | 2580452648712 | 97419547351288 | 100000000000000 |
| 14 | 3010528090164 | 96989471909836 | 100000000000000 |
| 15 | 3225565810890 | 96774434189110 | 100000000000000 |
| 21 | 4515792135246 | 95484207864754 | 100000000000000 |
| 28 | 6021056180328 | 93978943819672 | 100000000000000 |
| 30 | 6451131621780 | 93548868378220 | 100000000000000 |
| 35 | 7526320225410 | 92473679774590 | 100000000000000 |
| 45 | 9676697432670 | 90323302567330 | 100000000000000 |
| 60 | 12902263243560 | 87097736756440 | 100000000000000 |
| 70 | 15052640450820 | 84947359549180 | 100000000000000 |
| 75 | 16127829054450 | 83872170945550 | 100000000000000 |
| 90 | 19353394865340 | 80646605134660 | 100000000000000 |
| 105 | 22578960676230 | 77421039323770 | 100000000000000 |
| 120 | 25804526487120 | 74195473512880 | 100000000000000 |
| 150 | 32255658108900 | 67744341891100 | 100000000000000 |
| 225 | 48383487163350 | 51616512836650 | 100000000000000 |
| 300 | 64511316217800 | 35488683782200 | 100000000000000 |
| 450 | 96766974326700 | 3233025673300 | 100000000000000 |

FIG.23

FEATURE DRAGON

| TOTAL BET | ON | OFF | TOTAL |
|---|---|---|---|
| 1 | 153609554926 | 99846390445074 | 100000000000000 |
| 2 | 307219109852 | 99692780890148 | 100000000000000 |
| 3 | 460828664778 | 99539171335222 | 100000000000000 |
| 4 | 614438219704 | 99385561780296 | 100000000000000 |
| 5 | 768047774630 | 99231952225370 | 100000000000000 |
| 6 | 921657329556 | 99078342670444 | 100000000000000 |
| 7 | 1075266884482 | 98924733115518 | 100000000000000 |
| 9 | 1382485994334 | 98617514005666 | 100000000000000 |
| 10 | 1536095549260 | 98463904450740 | 100000000000000 |
| 12 | 1843314659112 | 98156685340888 | 100000000000000 |
| 14 | 2150533768964 | 97849466231036 | 100000000000000 |
| 15 | 2304143323890 | 97695856676110 | 100000000000000 |
| 21 | 3225800653446 | 96774199346554 | 100000000000000 |
| 28 | 4301067537928 | 95698932462072 | 100000000000000 |
| 30 | 4608286647780 | 95391713352220 | 100000000000000 |
| 35 | 5376334422410 | 94623665577590 | 100000000000000 |
| 45 | 6912429971670 | 93087570028330 | 100000000000000 |
| 60 | 9216573295560 | 90783426704440 | 100000000000000 |
| 70 | 10752668844820 | 89247331155180 | 100000000000000 |
| 75 | 11520716619450 | 88479283380550 | 100000000000000 |
| 90 | 13824859943340 | 86175140056660 | 100000000000000 |
| 105 | 16129003267230 | 83870996732770 | 100000000000000 |
| 120 | 18433146591120 | 81566853408880 | 100000000000000 |
| 150 | 23041433238900 | 76958566761100 | 100000000000000 |
| 225 | 34562149858350 | 65437850141650 | 100000000000000 |
| 300 | 46082866477800 | 53917133522200 | 100000000000000 |
| 450 | 69124299716700 | 30875700283300 | 100000000000000 |

FIG.24

FEATURE FISH

| TOTAL BET | ON | OFF | TOTAL |
|---|---|---|---|
| 1 | 134413229242 | 99865586770758 | 100000000000000 |
| 2 | 268826458484 | 99731173541516 | 100000000000000 |
| 3 | 403239687726 | 99596760312274 | 100000000000000 |
| 4 | 537652916968 | 99462347083032 | 100000000000000 |
| 5 | 672066146210 | 99327933853790 | 100000000000000 |
| 6 | 806479375452 | 99193520624548 | 100000000000000 |
| 7 | 940892604694 | 99059107395306 | 100000000000000 |
| 9 | 1209719063178 | 98790280936822 | 100000000000000 |
| 10 | 1344132292420 | 98655867707580 | 100000000000000 |
| 12 | 1612958750904 | 98387041249096 | 100000000000000 |
| 14 | 1881785209388 | 98118214790612 | 100000000000000 |
| 15 | 2016198438630 | 97983801561370 | 100000000000000 |
| 21 | 2822677814082 | 97177322185918 | 100000000000000 |
| 28 | 3763570418776 | 96236429581224 | 100000000000000 |
| 30 | 4032396877260 | 95967603122740 | 100000000000000 |
| 35 | 4704463023470 | 95295536976530 | 100000000000000 |
| 45 | 6048595315890 | 93951404684110 | 100000000000000 |
| 60 | 8064793754520 | 91935206245480 | 100000000000000 |
| 70 | 9408926046940 | 90591073953060 | 100000000000000 |
| 75 | 10080992193150 | 89919007806850 | 100000000000000 |
| 90 | 12097190631780 | 87902809368220 | 100000000000000 |
| 105 | 14113389070410 | 85886610929590 | 100000000000000 |
| 120 | 16129587509040 | 83870412490960 | 100000000000000 |
| 150 | 20161984386300 | 79838015613700 | 100000000000000 |
| 225 | 30242976579450 | 69757023420550 | 100000000000000 |
| 300 | 40323968772600 | 59676031227400 | 100000000000000 |
| 450 | 60485953158900 | 39514046841100 | 100000000000000 |

FIG.25

FEATURE TURTLE

| TOTAL BET | ON | OFF | TOTAL |
|---|---|---|---|
| 1 | 119482739633 | 99880517260367 | 100000000000000 |
| 2 | 238965479266 | 99761034520734 | 100000000000000 |
| 3 | 358448218899 | 99641551781101 | 100000000000000 |
| 4 | 477930958532 | 99522069041468 | 100000000000000 |
| 5 | 597413698165 | 99402586301835 | 100000000000000 |
| 6 | 716896437798 | 99283103562202 | 100000000000000 |
| 7 | 836379177431 | 99163620822569 | 100000000000000 |
| 9 | 1075344656697 | 98924655343303 | 100000000000000 |
| 10 | 1194827396330 | 98805172603670 | 100000000000000 |
| 12 | 1433792875596 | 98566207124404 | 100000000000000 |
| 14 | 1672758354862 | 98327241645138 | 100000000000000 |
| 15 | 1792241094495 | 98207758905505 | 100000000000000 |
| 21 | 2509137532293 | 97490862467707 | 100000000000000 |
| 28 | 3345516709724 | 96654483290276 | 100000000000000 |
| 30 | 3584482188990 | 96415517811010 | 100000000000000 |
| 35 | 4181895887155 | 95818104112845 | 100000000000000 |
| 45 | 5376723283485 | 94623276716515 | 100000000000000 |
| 60 | 7168964377980 | 92831035622020 | 100000000000000 |
| 70 | 8363791774310 | 91636208225690 | 100000000000000 |
| 75 | 8961205472475 | 91038794527525 | 100000000000000 |
| 90 | 10753446566970 | 89246553433030 | 100000000000000 |
| 105 | 12545687661465 | 87454312338535 | 100000000000000 |
| 120 | 14337928755960 | 85662071244040 | 100000000000000 |
| 150 | 17922410944950 | 82077589055050 | 100000000000000 |
| 225 | 26883616417425 | 73116383582575 | 100000000000000 |
| 300 | 35844821889900 | 64155178110100 | 100000000000000 |
| 450 | 53767232834850 | 46232767165150 | 100000000000000 |

FIG.26

FEATURE GOURD

| TOTAL BET | ON | OFF | TOTAL |
|---|---|---|---|
| 1 | 107538335322 | 99892461664678 | 100000000000000 |
| 2 | 215076670644 | 99784923329356 | 100000000000000 |
| 3 | 322615005966 | 99677384994034 | 100000000000000 |
| 4 | 430153341288 | 99569846658712 | 100000000000000 |
| 5 | 537691676610 | 99462308323390 | 100000000000000 |
| 6 | 645230011932 | 99354769988068 | 100000000000000 |
| 7 | 752768347254 | 99247231652746 | 100000000000000 |
| 9 | 967845017898 | 99032154982102 | 100000000000000 |
| 10 | 1075383353220 | 98924616646780 | 100000000000000 |
| 12 | 1290460023864 | 98709539976136 | 100000000000000 |
| 14 | 1505536694508 | 98494463305492 | 100000000000000 |
| 15 | 1613075029830 | 98386924970170 | 100000000000000 |
| 21 | 2258305041762 | 97741694958238 | 100000000000000 |
| 28 | 3011073389016 | 96988926610984 | 100000000000000 |
| 30 | 3226150059660 | 96773849940340 | 100000000000000 |
| 35 | 3763841736270 | 96236158263730 | 100000000000000 |
| 45 | 4839225089490 | 95160774910510 | 100000000000000 |
| 60 | 6452300119320 | 93547699880680 | 100000000000000 |
| 70 | 7527683472540 | 92472316527460 | 100000000000000 |
| 75 | 8065375149150 | 91934624850850 | 100000000000000 |
| 90 | 9678450178980 | 90321549821020 | 100000000000000 |
| 105 | 11291525208810 | 88708474791190 | 100000000000000 |
| 120 | 12904600238640 | 87095399761360 | 100000000000000 |
| 150 | 16130750298300 | 83869249701700 | 100000000000000 |
| 225 | 24196125447450 | 75803874552550 | 100000000000000 |
| 300 | 32261500596600 | 67738499403400 | 100000000000000 |
| 450 | 48392250894900 | 51607749105100 | 100000000000000 |

FIG.27

(JACKPOT PAYOUT DETERMINATION TABLE)

| LEVEL | WEIGHT |
|---|---|
| GRAND | 1674/10000000 |
| MAJOR | 6696/10000000 |
| MINOR | 279012/10000000 |
| MINI | 3016342/10000000 |
| CREDIT AWARD | 6696276/10000000 |
| TOTAL | 10000000/10000000 |

FIG.28

| LEVEL | % |
|---|---|
| GRAND | 0.12% |
| MAJOR | 0.12% |
| MINOR | 0.42% |
| MINI | 0.84% |

● IF WINNING IS ACHIEVED IN JACKPOT RANDOM DETERMINATION, SHIFT TO ⑨
● IF NO WINNING IS ACHIEVED IN JACKPOT RANDOM DETERMINATION, SHIFT TO ②

■ COEXISTENCE WITH REEL SKIP FUNCTION

FIG.84

| | GAMBLE ON | GAMBLE ON |
|---|---|---|
| CASH OUT | TAKE WIN | TAKE WIN |
| GAMBLE | GAMBLE START | — |
| MAX BET | INVALID | GAMBLE START |
| SPIN | TO NORMAL GAME | TO NORMAL GAME |

FIG.88

| NO | SCREEN | CONTROL PANEL | OPERATION |
| --- | --- | --- | --- |
| 1 | EXIT | HELP | SHIFT TO NORMAL SCREEN |
| 2 | PREV. | BET ×1 | SHIFT TO PREVIOUS PAGE |
| 3 | NEXT | BET ×2 | SHIFT TO NEXT PAGE |

FIG.91

| BUTTON TYPE | WHILE IDLING | DURING GAME | WHILE ERROR TAKES PLACE | DURING AUDIT | TAKE WIN OR GAMBLE |
|---|---|---|---|---|---|
| HELP | TURNED ON | TURNED OFF | TURNED OFF | TURNED OFF | TURNED ON |
| LANGUAGE SWITCH | TURNED ON | TURNED OFF | TURNED OFF | TURNED OFF | TURNED OFF |
| VOLUME | TURNED ON | TURNED ON | TURNED OFF | TURNED OFF | TURNED ON |
| NUMBER OF LINES | TURNED ON (WHEN SELECTABLE) | TURNED OFF | TURNED OFF | TURNED OFF | TURNED OFF |
| BET AMOUNT | TURNED ON | TURNED OFF | TURNED OFF | TURNED OFF | TURNED OFF |
| PAY TABLE | TURNED ON | TURNED OFF | TURNED OFF | TURNED OFF | TURNED ON |

GAMING MACHINE

CROSS-REFERENCE TO RELATED APPLICATION

This application claims the benefit of Japanese Pat. App. No. 2015-150623, filed on Jul. 30, 2015, which application is incorporated herein by reference in its entirety.

FIELD OF THE INVENTION

The present invention relates to a gaming machine having a bonus game.

BACKGROUND OF THE INVENTION

There has been a gaming machine in which a bonus is awarded when a predetermined condition (winning) is established. The bonus encompasses a bonus with which a fixed payout is awarded and a jackpot-type bonus with which a part of gaming media inserted into a gaming machine is pooled and the pooled gaming medium is awarded to a gaming machine having satisfied a predetermined condition. A player who plays a game on such a gaming machine mainly aims at receiving a benefit regarding the bonus (e.g., jackpot), and such a game has been popular among players. (see e.g., PTL 1 (Specification of Publication of U.S. Patent application No. 2011/0118003))

BRIEF SUMMARY OF THE INVENTION

In a gaming machine awarding a bonus (e.g., jackpot), it is important to maintain the player's interest in the awarding of a bonus as long as possible.

An object of the present invention is to provide a gaming machine which is able to maintain an interest in the awarding of a bonus.

The present invention relates to a gaming machine including: a display device configured to display a game result by rearranging symbols;

a storage device configured to store a bonus random determination table used for determining whether to award the right to run a bonus game, and including a running right stocking area in which the right to run the bonus game is accumulatively stored; and a controller, the controller executing the steps of:

(1A) as a normal game, randomly selecting symbols to be rearranged on the display device;

(1B) rearranging the symbols selected in the step (1A) on the display device and awarding a benefit based on a combination of the rearranged symbols;

(1C) when the awarded benefit is the right to run the free game for a predetermined number of times, randomly selecting, as a free game, symbols to be rearranged on the display device;

(1D) rearranging the symbols selected in the step (1C) on the display device, awarding a benefit based on a combination of the rearranged symbols, and executing, based on the bonus random determination table, bonus random determination for a number of times corresponding the number of specific symbols rearranged;

(1E) accumulatively storing, in the running right stocking area of the storage device, the right to run the bonus game obtained as a result of the bonus random determination;

(1F) repeating the steps (1C) to (1E) until the free game is run for the awarded number of times;

(1G) after the running of the free game for the predetermined number of times, successively running the bonus game for a number of times corresponding to the right to run the bonus game accumulatively stored in the running right stocking area of the storage device.

According to the arrangement above, when the right to run the free game for a predetermined number of times is awarded in the normal game, bonus random determination is executed for a number of times corresponding to the number of specific symbols rearranged on the display device, each time the free game is executed, and the right to run the bonus game obtained as a result of the bonus random determination is accumulatively stored (stocked) in the running right stocking area. After the running of the free game for the predetermined number of times ends, the bonus game is successively executed for the number of times accumulatively stored (stocked) in the running right stocking area.

On this account, the player recognizes that the bonus random determination is executed each time the specific symbol is displayed on the display device during the free game period in which the free game is executed for the predetermined number of times, but the result of the bonus random determination is unknown until the execution of the free game ends. This makes it possible to maintain, during the free game period, the player's expectation on the bonus game executed for a number of times which is proportional to the number of specific symbols displayed on the display device.

In addition to the above, the above-described gaming machine of the present invention is arranged such that the storage device includes a bonus storage area in which a part of a bet amount betted to run the normal game is accumulatively stored as a resource, a table storage area in which a bonus random determination table for determining whether to award the right to run the bonus game and a bonus payout determination table for determining the payout amount in the bonus game based on the resource, and the running right stocking area in which the right to run the bonus game is accumulatively stored, and the controller is configured to execute the steps of:

(2A) in the bonus storage area of the storage device, accumulatively storing a part of a bet amount betted to run the normal game as a resource;

(2B) as the normal game, randomly selecting symbols to be rearranged on the display device;

(2C) rearranging the symbols selected in the step (2B) on the display device and awarding a benefit based on a combination of the rearranged symbols;

(2D) when the awarded benefit is the right to run the free game for a predetermined number of times, randomly selecting, as a free game, symbols to be rearranged on the display device;

(2E) rearranging the symbols selected in the step (2D) on the display device, awarding a benefit based on a combination of the rearranged symbols, and executing, based on the bonus random determination table, bonus random determination for a number of times corresponding the number of specific symbols rearranged;

(2F) accumulatively storing, in the running right stocking area of the storage device, the right to run the bonus game obtained as a result of the bonus random determination;

(2G) repeating the steps (2D) to (2F) until the free game is run for the awarded number of times;

(2H) after the running of the free game for the predetermined number of times, serially running the bonus game for a number of times corresponding to the right to run the bonus game accumulatively stored in the running right stocking area of the storage device, as random determination based on the bonus payout determination table.

According to the arrangement above, in the bonus storage area of the storage device, a part of a bet amount betted to run the normal game is accumulatively stored as a resource, and in the bonus game random determination based on the bonus payout determination table is executed to determine a payout amount based on the accumulatively-stored resource.

This makes it possible to maintain, during the free game period, the player's expectation on the bonus game executed for a number of times proportional to the number of the specific symbols displayed on the display device, i.e., the bonus game with which a payout based on the accumulatively-stored resource may be awarded.

In addition to the above, the above-described gaming machine of the present invention is arranged such that the controller is configured to:

award the right to run the free game for the predetermined number of times when the number of the specific symbols rearranged on the display device is a predetermined number or more; and in the step (1B), execute bonus random determination based on the bonus random determination table for a number of times corresponding to the number of the specific symbols rearranged, and accumulatively store, in the running right stocking area of the storage device, the right to run the bonus game obtained as a result of the bonus random determination.

According to the arrangement above, when a predetermined number or more specific symbol is rearranged on the display device, awarding of the right to run the free game for a predetermined number of times is triggered (or re-triggered in the free game), and execution of the bonus random determination for a number of times corresponding to the number of the rearranged specific symbols on the display device is triggered. With this arrangement, the bonus random determination is executed when the right to run the free game is awarded, but the result of the bonus random determination is unknown until the end of the free game. This makes it possible to maintain, during the free game period, the player's expectation on the bonus game awarded as a result of the bonus random determination executed when the right to run the free game is awarded.

In addition to the above, the above-described gaming machine of the present invention is arranged such that the controller is configured to:

when the right to run the bonus game at least once is awarded as a result of the bonus random determination, display a message notifying that the right to run the bonus game is awarded on the display device, during a period from awarding of the right to run the bonus game to end of running of the free game for the predetermined number of times.

This arrangement allows the player to know the awarding of the right to run the bonus game during the free game period.

In addition to the above, the above-described gaming machine of the present invention is arranged such that the controller is configured to:

execute an effect of changing a display state of the specific symbol rearranged on the display device to another display state.

This arrangement allows the player to know that the bonus random determination is executed each time the specific symbol is rearranged on the display device by the effect of changing the display state of the specific symbol to another display state.

In addition to the above, the above-described gaming machine of the present invention is arranged such that the controller is configured to:

when the specific symbol is rearranged on the display device and winning is achieved in random determination, execute a step-up effect of displaying effect images from a minor effect to a major effect stepwise on the display device.

According to the arrangement above, when the specific symbol is rearranged on the display device and bonus random determination is executed, a step-up effect of displaying effect images from a minor effect to a major effect stepwise may be executed. This increases the player's expectation on the awarding of the right to run the bonus game as a result of the bonus random determination.

In addition to the above, the above-described gaming machine of the present invention is arranged such that the controller is configured to:

in the step (1G), display a payout amount awarded as a result of the bonus game on the display device;

when the right to run the bonus game is awarded as a result of the bonus random determination, execute confirmation effect random determination of determining whether to execute a bonus game confirmation effect; and when the bonus game confirmation effect is executed as a result of the confirmation effect random determination, execute the bonus game confirmation effect of emphasizing the awarding of the right to run the bonus game on the display device, at a timing before a payout amount awarded in the bonus game is displayed on the display device.

According to the arrangement above, the bonus game of emphasizing that the right to run the bonus game is awarded is performed on the display device at a timing during a period ranging from the determination of the execution of the bonus game confirmation effect as a result of the confirmation effect random determination executed when the right to run the bonus game is awarded to a timing at which the player knows a specific payout amount as the payout amount consequently awarded in the bonus game is displayed on the display device.

This allows the player to know that the right to run the bonus game has been awarded, at a stage before knowing the payout amount consequently awarded in the bonus game. With this arrangement, when the bonus game confirmation effect is executed, the player's expectation is changed from the expectation on whether the right to run the bonus game is awarded to the expectation on a specific payout amount awarded in the bonus game.

Further, another aspect of the present invention is a method of controlling a game in a gaming machine comprising a symbol display unit configured to rearrange symbols of plural types including a specific symbol which triggers bonus random determination; and a control unit including: a free game control processing unit configured to successively execute a free game more than once when a predetermined condition is triggered;

a random determination processing unit configured to execute, when the specific symbol is displayed on the symbol display unit, bonus random determination for a number of times corresponding to the number of the displayed specific symbols;

a storage processing unit configured to store at least one result of the bonus random determination by the random determination processing unit; and a processing unit configured to serially award a prize based on the at least one result of the bonus random determination stored in the storage processing unit and the number of the at least one result, after execution of the free game more than once by the free game control unit.

According to the arrangement above, when the free game is executed more than once by the free game control processing unit of the control unit, the bonus random determination is executed each time the specific symbol is displayed in each free game. The bonus random determination result is such that the free game is executed plural times and each execution of the free game takes a predetermined time. After a time calculated by multiplying the predetermined time by the number of times of execution of the free game executed in the predetermined time elapses, a prize is serially awarded in accordance with the stored bonus random determination result. On this account, the player recognizes that the prize random determination is executed each time the specific symbol is displayed during the free game period in which the free game is executed plural times, but the result of the random determination is unknown until the execution of the free game ends, with the result that the expectation on the awarding of the prize during the free game period is maintained.

A gaming machine capable of maintaining expectation on awarding of a bonus is provided.

BRIEF DESCRIPTION OF THE DRAWINGS

FIG. 8 shows symbol arrays on normal game video reels of the slot machine related to the embodiment of the present invention.

FIG. 9 shows symbol arrays (MAN selection) on free game video reels of the slot machine related to the embodiment of the present invention.

FIG. 10 shows symbol arrays (MAN selection) on free game video reels of the slot machine related to the embodiment of the present invention.

FIG. 11 shows symbol arrays (DRAGON selection) on free game video reels of the slot machine related to the embodiment of the present invention.

FIG. 12 shows symbol arrays (DRAGON selection) on free game video reels of the slot machine related to the embodiment of the present invention.

FIG. 13 shows symbol arrays (FISH selection) on free game video reels of the slot machine related to the embodiment of the present invention.

FIG. 14 shows symbol arrays (FISH selection) on free game video reels of the slot machine related to the embodiment of the present invention.

FIG. 15 shows symbol arrays (TURTLE selection) on free game video reels of the slot machine related to the embodiment of the present invention.

FIG. 16 shows symbol arrays (TURTLE selection) on free game video reels of the slot machine related to the embodiment of the present invention.

FIG. 17 shows symbol arrays (GOURD selection) on free game video reels of the slot machine related to the embodiment of the present invention.

FIG. 18 shows symbol arrays (GOURD selection) on free game video reels of the slot machine related to the embodiment of the present invention.

FIG. 20 shows a symbol combination table of the slot machine related to the embodiment of the present invention.

FIG. 21 is an explanatory diagram of a normal game jackpot random determination table of the slot machine related to the embodiment of the present invention.

FIG. 22 shows a free game (MAN) jackpot random determination table of the slot machine related to the embodiment of the present invention.

FIG. 23 shows a free game (DRAGON) jackpot random determination table of the slot machine related to the embodiment of the present invention.

FIG. 24 shows a free game (FISH) jackpot random determination table in the slot machine related to the embodiment of the present invention.

FIG. 25 shows a free game (TURTLE) jackpot random determination table in the slot machine related to the embodiment of the present invention.

FIG. 26 shows a free game (GOURD) jackpot random determination table in the slot machine related to the embodiment of the present invention.

FIG. 27 shows a jackpot payout determination table of the slot machine related to the embodiment of the present invention.

FIG. 28 shows an increment rate when a part of a bet amount is accumulated as resource for a jackpot payout in the embodiment of the present invention.

FIG. 84 shows RESIDUAL GAMBLE of the slot machine related to the embodiment of the present invention.

FIG. 88 shows HELP specification of the slot machine related to the embodiment of the present invention.

FIG. 91 shows arrangement of screen touch buttons of the slot machine related to the embodiment of the present invention.

DETAILED DESCRIPTION OF THE PREFERRED EMBODIMENT

Embodiment Overview

Figure 1:
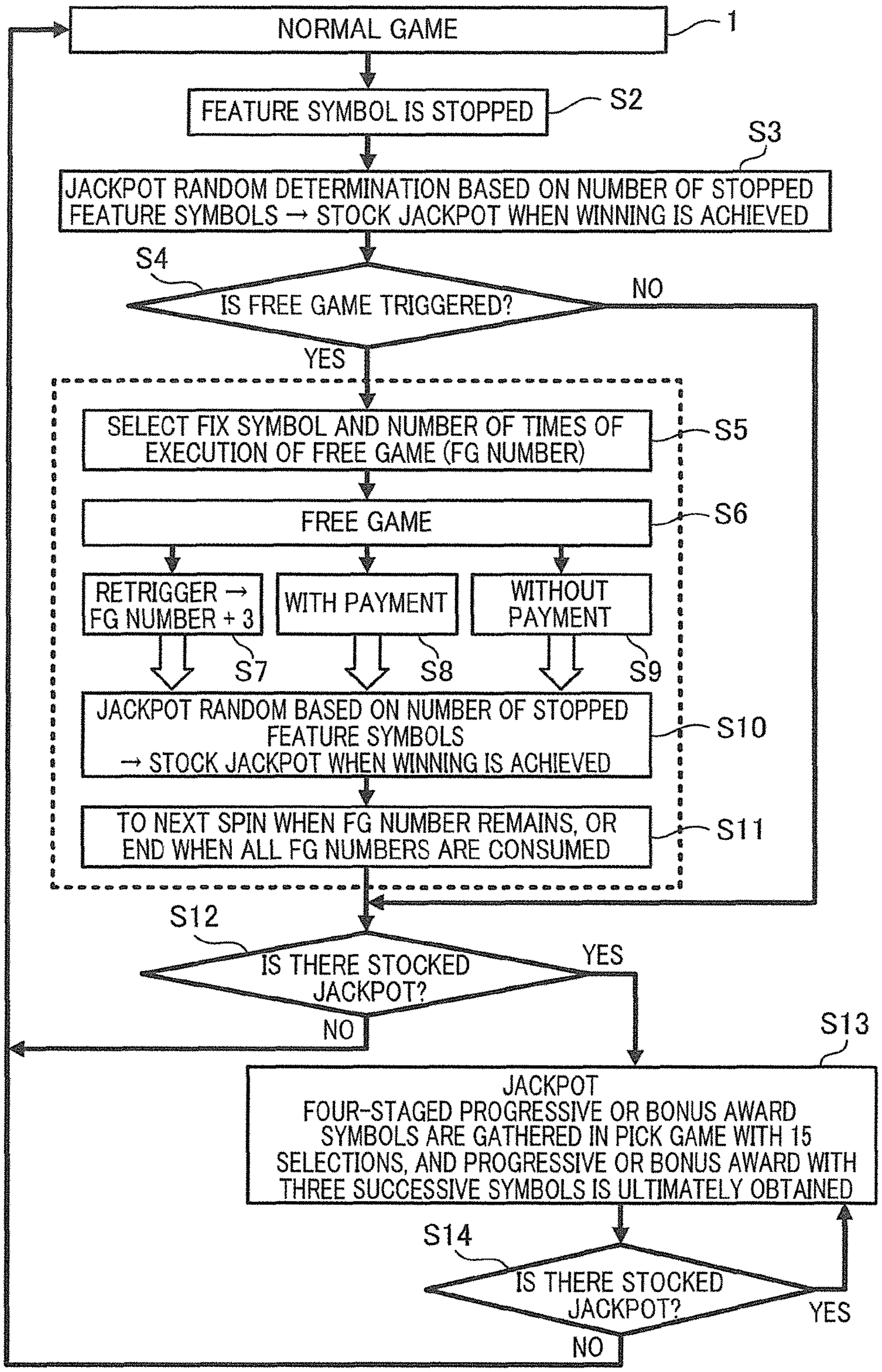
FIG. 1 shows the outline of game content of a slot machine according to an embodiment of the present invention.

The following will describe an embodiment the present invention with reference to figures. FIG. 1 shows the outline of games run in a slot machine related to the embodiment of the present invention.

The present embodiment deals with an example where the gaming machine is a slot machine configured to run a game which awards a benefit based on a combination of a plurality of symbols rearranged in a result determination area selected.

To be more specific, a slot machine 1 includes a display device (e.g., a lower image display panel 141) configured to display a game result by rearranging symbols, a storage device (RAM 73) storing a jackpot random determination table (bonus random determination table) by which whether to award the right to run a jackpot game (equivalent to the right to run a bonus game) is determined and having a running right stocking area in which the right to run the jackpot game is accumulatively stored, and a controller (e.g., a main CPU 71, a ROM 72, and a RAM 73).

As a process executed by this slot machine 1, the slot machine 1 runs a normal game of awarding a benefit based on a combination of symbols rearranged on the display device (51). When a specific symbol (FEATURE symbol) stops on the display device (S2), jackpot random determination (equivalent to bonus random determination) is executed based on the number of stopped FEATURE symbols, and jackpot is stocked when win is achieved in the jackpot random determination (S3). When a free game is triggered in the normal game (S4), a fix symbol fixed on the display device in the free game and the number of times of execution of the free game (FG number) are selected (S5). In the free game, when a fix symbol stops on the display device, the fix symbol is accumulatively fixed on the display device (S6). After the addition of the number of times of execution of the free game (three times) by re-trigger (S7), the awarding of payout (S8), and no payout (S9) as a result of the free game, jackpot random determination is executed based on the number of specific symbols (FEATURE symbols) having stopped on the display device, and the jackpot is stocked when winning is achieved in the jackpot random determination (S10). Thereafter, the free game is run again when the remaining number of times of execution of the free game is one or more, and the free game ends when the free game is run for the remaining number of times of execution of the free game (S11).

After S11 or when the free game is not triggered in the normal game (S4), whether there is a stocked jackpot is determined (S12). When there is a stocked jackpot, symbols are gathered in a pick game with 15 selections as a jackpot game (bonus game), and progressive or bonus award with three successive symbols is ultimately obtained (S13) Then whether there is a stocked jackpot is determined again (S14). When there is a stocked jackpot, the jackpot game is executed again (S13). When there no stocked jackpot, the process returns to the normal game (51).

Definitions and the Like

The slot machine is a type of a gaming machine. While the present embodiment deals with the slot machine as an example of the gaming machine, the slot machine may be a different type of machine on condition that a normal game can be individually run by the machine and a free game developing from the normal game can be run by the machine.

A normal game of the present embodiment is run by the slot machine. The normal game is a slot game of rearranging symbols.

The symbols encompasses "MAN", "DRAGON", "FISH", "TURTLE", "GOURD", "ACE", "KING", "QUEEN", "JACK", "TEN", "NINE", "WILD", and "FEATURE".

A coin, paper money, or electrically valuable information corresponding to these is used as a gaming value. Note that the gaming value in the present invention is not particularly limited. Examples of the gaming value include gaming media such as medals, tokens, cyber money, tickets, and the like. A ticket is not particularly limited, and a later-mentioned barcoded ticket may be adopted for example.

In the present embodiment, the free game may be any type of game, provided that the free game provides a player with a different gaming mode from that of the normal game. The "free game" is a game runnable with a bet of fewer gaming values than the normal game. Note that "bet of fewer gaming values" encompasses a bet of zero (0) gaming value. The "free game" therefore may be a game runnable without a bet of a gaming value, which free game awards an amount of gaming values based on symbols rearranged. In other words, the "free game" may be a game which is started without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value. Further, the "free game" is a game to which transition occurs when a predetermined condition (free game trigger) is satisfied in the normal game.

The expression rearrange in this specification means dismissing an arrangement of symbols, and arranging symbols once again. Arrangement means a state where the symbols can be visually confirmed by a player.

[Explanation of Functional Flow Diagram]

Figure 2:
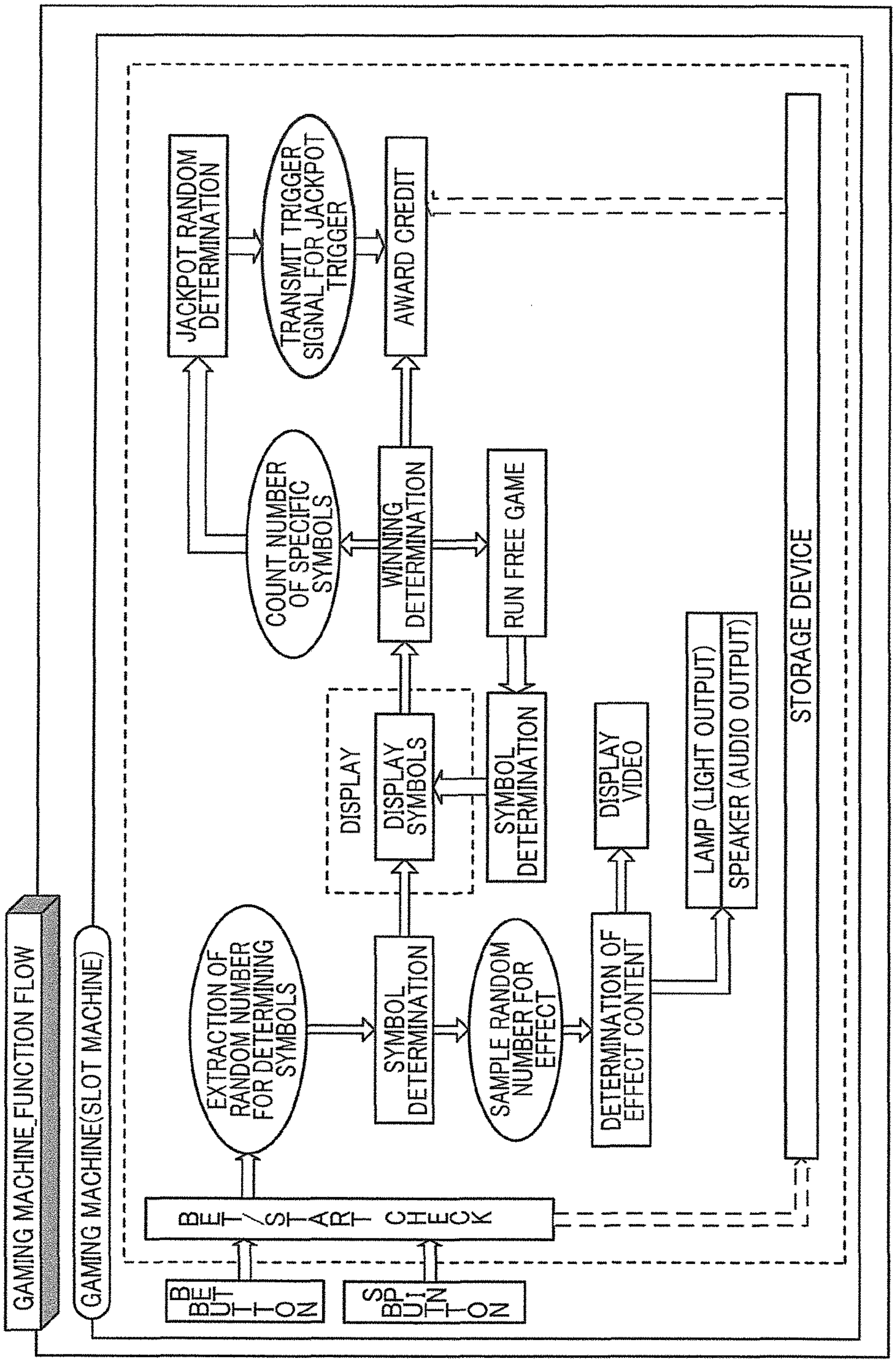
FIG. 2 shows a functional flow of the slot machine of the embodiment of the present invention.

The following describes basic functions of the slot machine related to the embodiment of the present invention, with reference to FIG. 2. FIG. 2 is a diagram showing functional flow of the slot machine related to the embodiment of the present invention.

<Start-Check>

First, the slot machine checks whether or not a bet button has been pressed by a player, and subsequently checks whether or not a spin button has been pressed by the player.

<Symbol Determination>

Next, when the spin button has been pressed by the player, the slot machine extracts a random number for symbol determination, and determines symbols to be displayed for the player at the time of stopping the scroll of the symbol array, for respective video reels displayed on the display device.

<Symbol Display>

Then the slot machine starts the scroll of the symbol array of each video reel, and stops the scroll so that the determined symbols are displayed for the player.

<Winning Determination>

Subsequently, as the scroll of the symbol array of each video reel is stopped, the slot machine determines whether the combination of the symbols displayed for the player is a combination related to winning.

<Determination of Number of Specific Symbols>

How many specific symbols are included in the displayed symbols is determined.

<Jackpot Random Determination>

Jackpot random determination is executed for a number of times corresponding to the number of the specific symbols. A jackpot trigger signal is output when winning is achieved, and the jackpot is stocked. The jackpot is a function which is arranged such that at least one of coins consumed by a player at each slot machine is accumulated as a jackpot amount, and coins equivalent to the accumulated jackpot amount is paid to a slot machine which wins the jackpot. In the present case, the slot machine calculates an amount (accumulative amount) accumulated to the jackpot amount each time the game is played, and sends the calculation result to an external controller. The external controller adds the accumulative amount sent from each slot machine to the jackpot amount.

<Free Game>

When a combination of symbols related to a free game trigger is displayed as a result of result determination, the free game is executed. In the embodiment of the present invention, as the free game, a game (free game) which executes the random determination of the symbols for a predetermined number of times to determine the above-described determination of to-be-stopped symbols, without the consumption of coins.

<Payout>

When the combination of symbols displayed for the player is a combination related to winning, the slot machine offers, to the player, a benefit according to the combination. For example, when a combination of symbols related to a payout of coins has been displayed, the slot machine pays out coins of the number corresponding to the combination of symbols to the player.

When win is achieved in the jackpot random determination and a jackpot is stocked, the jackpot game is executed for a stocked number of times. As the jackpot game, symbols are gathered in a pick game with 15 selections, and progressive or bonus award with three successive symbols is ultimately obtained.

In addition to the above, the slot machine may have other benefits such as mystery bonus, in addition to the benefit above. In the mystery bonus, a predetermined number of coins are paid out when a win is achieved in dedicated random determination. When a spin button is pressed, the slot machine samples a random number for the mystery bonus, and whether a mystery bonus trigger is established is randomly determined.

<Determination of Effect>

The slot machine produces an effect by displaying an image on the display device, outputting light from a lamp, and outputting sound from a speaker. The slot machine samples an effect-use random number and determines the content of an effect based on randomly determined symbols or the like.

[Overall Structure of Game System]

Figure 3:
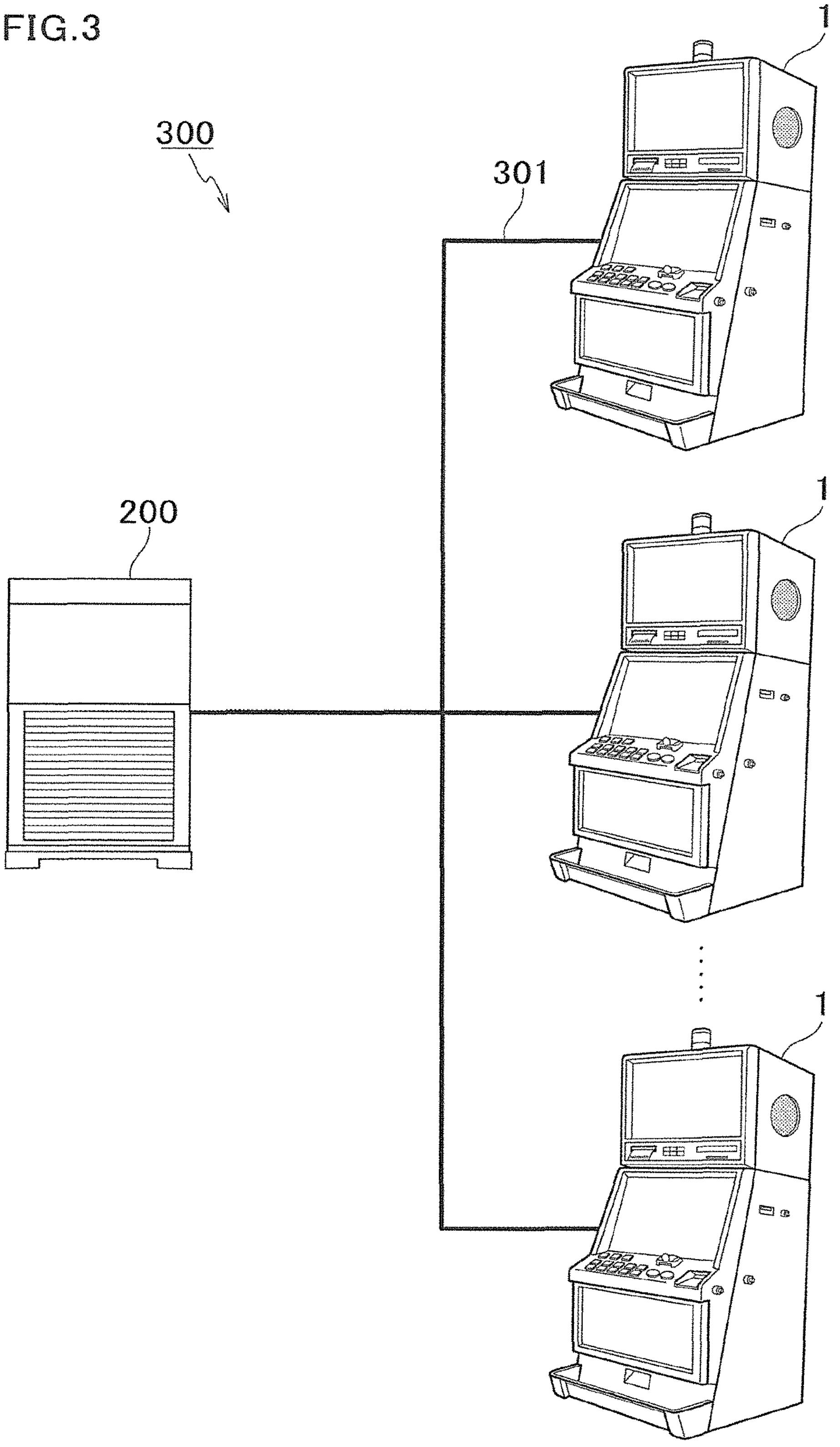
FIG. 3 shows a game system including the slot machine of the embodiment of the present invention.

The basic functions of the slot machine have been described as above. Now, referring to FIG. 3, a game system including the slot machine will be described. FIG. 3 shows the game system including the slot machine of the embodiment of the present invention.

A game system 300 includes a plurality of slot machines 1 and an external controller 200 connected with the slot machines 1 via a communication line 301.

The external controller 200 is for controlling the plurality of slot machines 1. In the present embodiment, the external controller 200 is a so-called hall server installed in a gaming facility where the plurality of slot machines 1 are provided. Each of the slot machines 1 has a unique identification number, and the external controller 200 identifies which one of the slot machines 1 transmitted data, by referring to the identification number. Further, the external controller 200 determines transmission target of data with the identification number when transmitting data to a slot machine 1.

It is to be noted that the game system 300 may be constructed within a single gaming facility where various games can be performed, such as a casino, or may be constructed among a plurality of gaming facilities. Further, when the game system 300 is constructed in a single gaming facility, the gaming system may be constructed in each floor or section of the gaming facility. The communication line 301 may be a wired or wireless line, and can adopt a dedicated line, an exchange line or the like.

[Overall Structure of Slot Machine]

Figure 4:
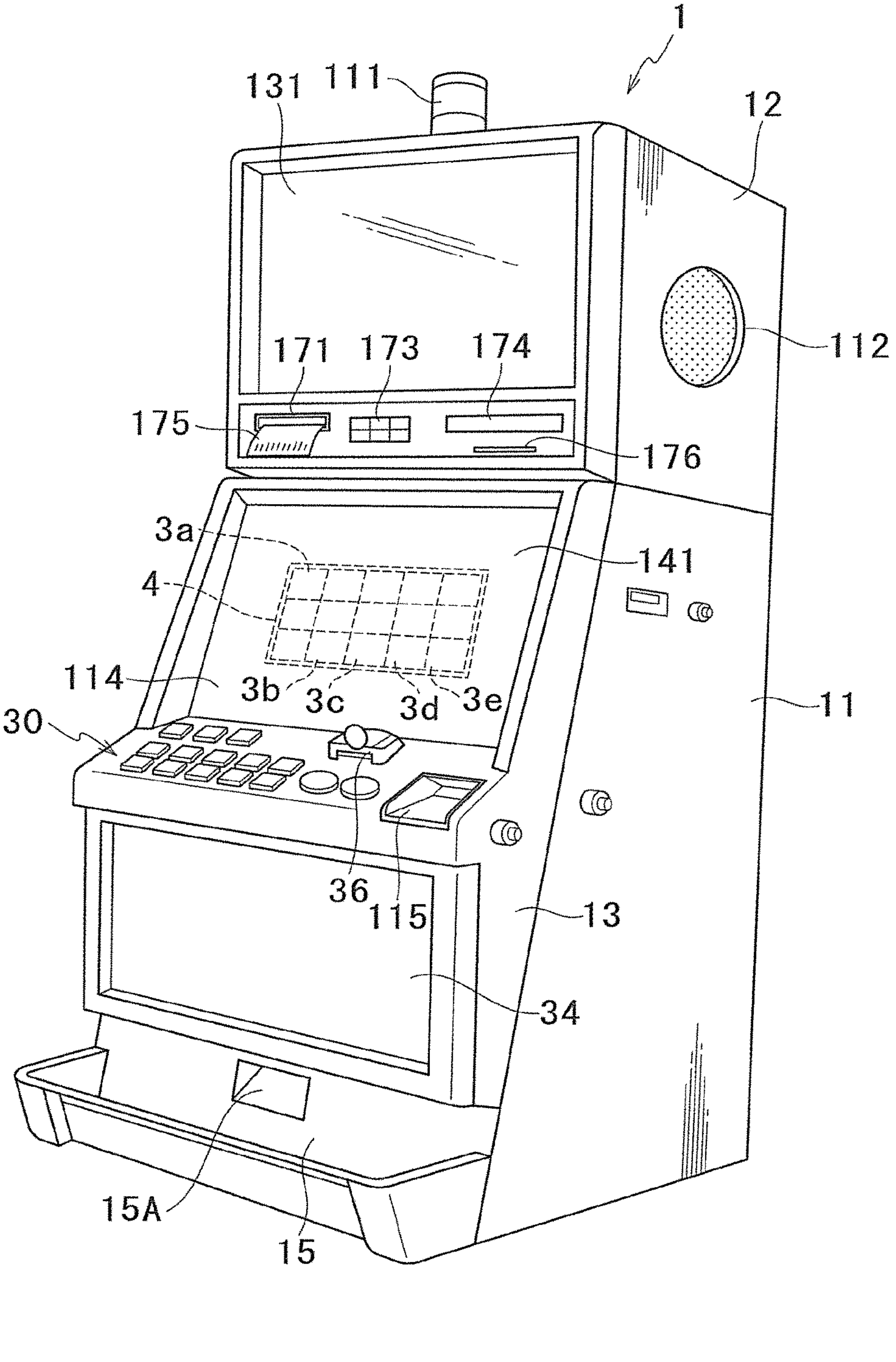
FIG. 4 shows the overall structure of the slot machine of the embodiment of the present invention.

Now, referring to FIG. 4, the overall structure of the slot machine 1 will be described. FIG. 4 shows the overall structure of the slot machine of the embodiment of the present invention.

A coin, a paper money, or electrically valuable information corresponding to these is used as a gaming medium in the slot machine 1. In the embodiment of the present invention, furthermore, a later-described ticket with barcode is also used. It is to be noted that the gaming medium is not limited to these, and for example a medal, a token, cyber money or the like can be adopted.

The slot machine 1 includes a cabinet 11, a top box 12 installed on the upper side of the cabinet 11, and a main door 13 provided at the front surface of the cabinet 11.

Figure 6:
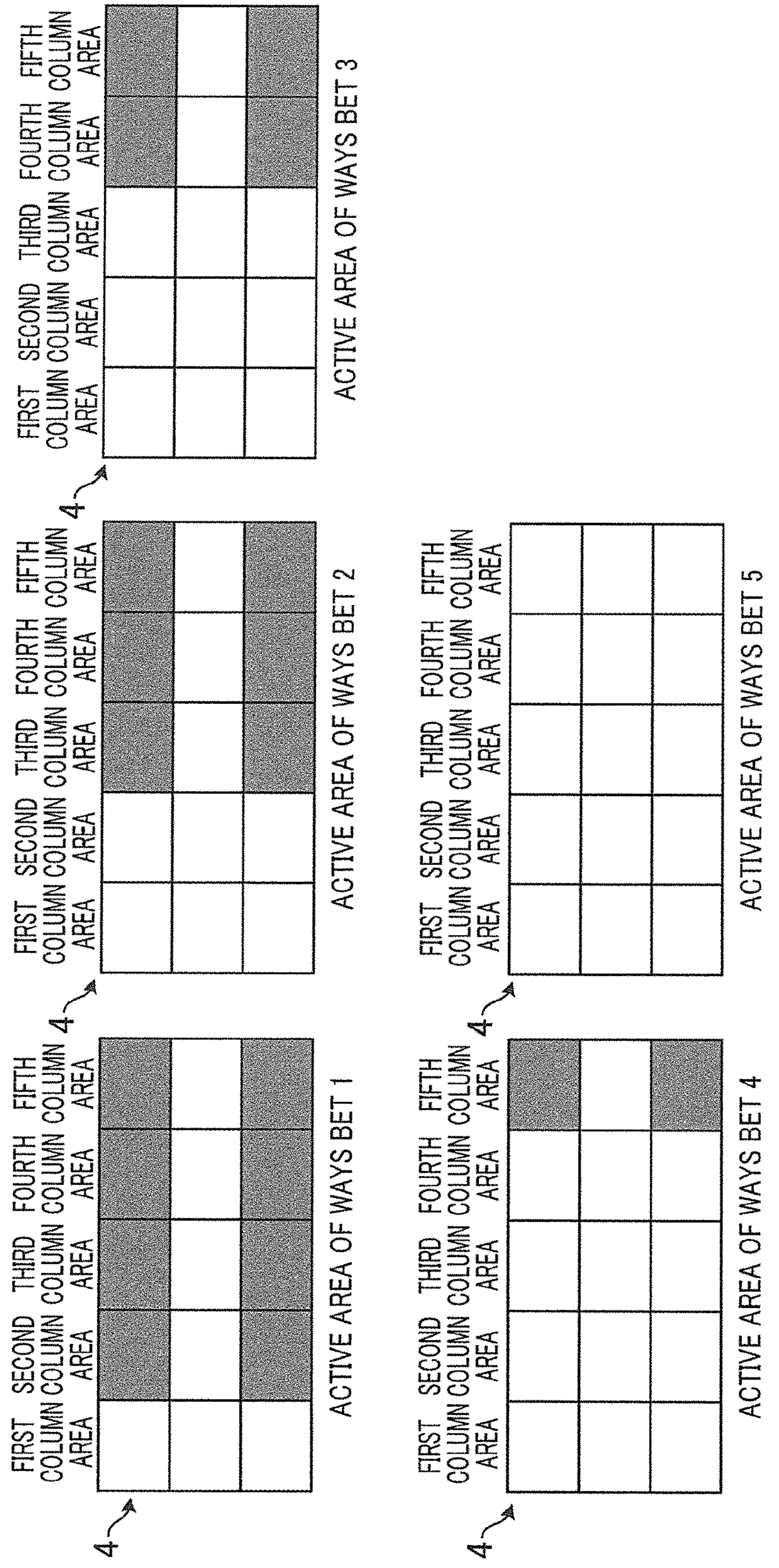
FIG. 6 illustrates active areas of "WAYS BET" in the slot machine of the embodiment of the present invention.
Figure 7:
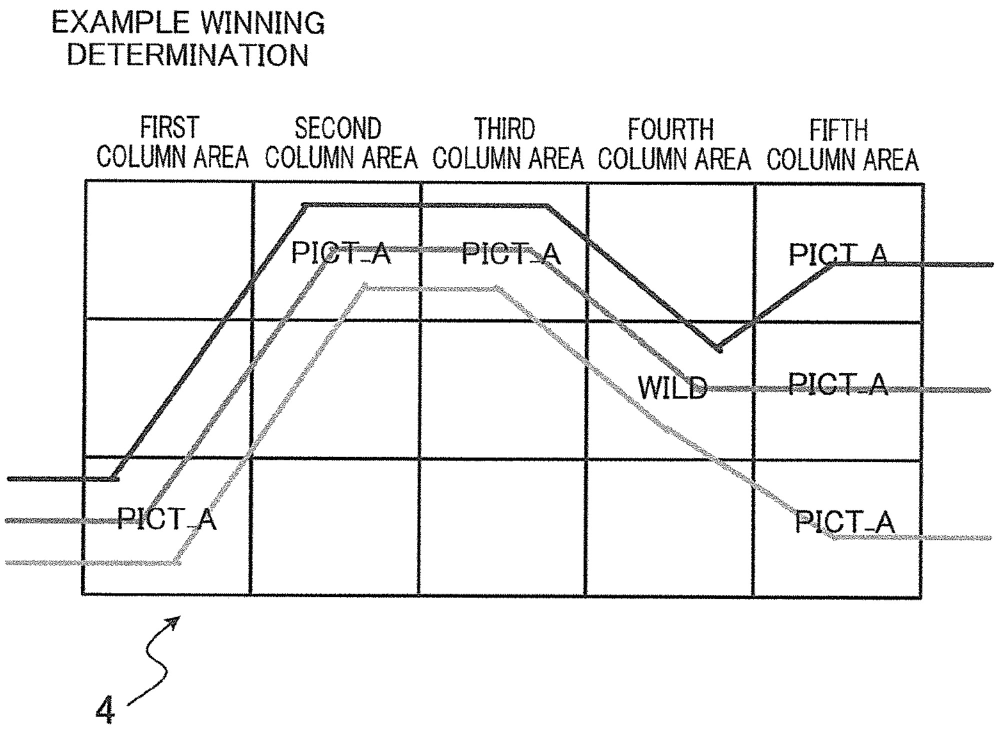
FIG. 7 is an explanatory diagram of an example of result determination of "WAYS BET" in the slot machine related to the embodiment of the present invention.

At the center of the main door 13, a lower image display panel 141 is provided. The lower image display panel 141 is a liquid crystal panel and constitute a display. The lower image display panel 141 has a symbol display area 4. The symbol display area 4 includes five column areas (first column area to fifth column area) each of which is divided into three areas: the upper stage, the middle stage, and the lower stage, as shown in FIG. 6 and FIG. 7. In the first column area to fifth column area, five video reels 3 (3*a*, 3*b*, 3*c*, 3*d*, and 3*e*) are displayed, respectively. In the embodiment of the present invention, the video reels are for expressing in the form of a video rotation and stop of symbols depicted on the circumferential surfaces of mechanical reels. To each of the video reels 3 is allocated a symbol array including predetermined symbols (see, e.g., FIG. 8 to FIG. 18 which will be described later).

In the symbol display area 4, the symbol array allocated to each video reel 3 (3*a*, 3*b*, 3*c*, 3*d*, 3*e*) scrolls and stops after elapse of a predetermined time. As a result, parts of the respective symbol arrays (three successive symbols in the embodiment of the present invention) are displayed for the player. In the first to fifth column areas of the symbol display area 4, symbols are displayed respectively in the three areas (the upper stage area, the middle stage area, and the lower stage area) to correspond to each video reel 3. To put it differently, 15 symbols forming a 5 by 3 matrix are displayed in the symbol display area 4.

In the embodiment of the present invention, "LEFT TO RIGHT" type is adopted for determining the winning. That is, by selecting one of five stages of WAYS BET (WAYS BET1, WAYS BET2, WAYS BET3, WAYS BET4, and WAYS BET5), there are determined result determination areas to be subjected to result determination, out of 15 areas (the 5 by 3 matrix) of the symbol display area 4. Then a winning occurs when a predetermined number of symbols stopped in the result determination areas of first column area to fifth column area, which areas are subjected to result determination, are linked (see FIG. 7).

Specifically, as shown in FIG. 6, when "WAYS BET1" is selected, the areas out of the symbol display area 4 subjected to result determination (areas activated) are: the upper stage, the middle stage, and the lower stage of the first column area; the middle stage of the second column area; the middle stage of the third column area; the middle stage of the fourth column area; and the middle stage of the fifth column area. Specifically, when "WAYS BET2" is selected, the areas out of the symbol display area 4 subjected to result determination (areas activated) are: the upper stage, the middle stage, and the lower stage of the first column area; the middle stage of the second column area; the middle stage of the third column area; the middle stage of the fourth column area; and the middle stage of the fifth column area. When "WAYS BET3" is selected, the areas out of the symbol display area 4 subjected to result determination (areas activated) are: the upper stage, the middle stage, and the lower stage of the first column area; the middle stage of the second column area; the upper stage, the middle stage, and the lower stage of the third column area; the middle stage of the fourth column area; and the middle stage of the fifth column area. When "WAYS BET4" is selected, the areas out of the symbol display area 4 subjected to result determination (areas activated) are: the upper stage, the middle stage, and the lower stage of the first column area; the middle stage of the second column area; the upper stage, the middle stage, and the lower stage of the third column area; the upper stage, the middle stage, and the lower stage of the fourth column area; and the middle stage of the fifth column area. When "WAYS BET5" is selected, the areas out of the symbol display area 4 subjected to result determination (areas activated) are: the upper stage, the middle stage, and the lower stage of the first column area; the middle stage of the second column area; the upper stage, the middle stage, and the lower stage of the third column area; the upper stage, the middle stage, and the lower stage of the fourth column area; and the upper stage, the middle stage, and the lower stage of the fifth column area.

For example, as shown in FIG. 7, when the "WAYS BET5" is selected, all the areas out of the symbol display area 4 are subjected to result determination (activated). As shown in FIG. 7, when a certain symbol (PICT A, encompassing WILD symbol) occurs in the lower stage of the first column area, the upper stage of the second column area, the upper stage of the third column area, the middle stage of the fourth column area, and the upper stage, the middle stage, and the lower stage of the fifth column area, there are three wins in which the symbol occurs in five linked positions from the first column area to the fifth column area (LEFT TO RIGHT). In the "LEFT TO RIGHT" type, the symbols may appear to be scattered in the first sight; however, if they are linked throughout the first column area to the fifth column area, it is determined as winning. Although the present embodiment adopts the "LEFT TO RIGHT" type, it is possible to adopt a line type which regards as a winning line a line connecting any of three areas out of each symbol array of the video reel.

The lower image display panel 141 includes a touch panel 114. The player is allowed to input instructions by touching the lower image display panel 141.

Figure 5:
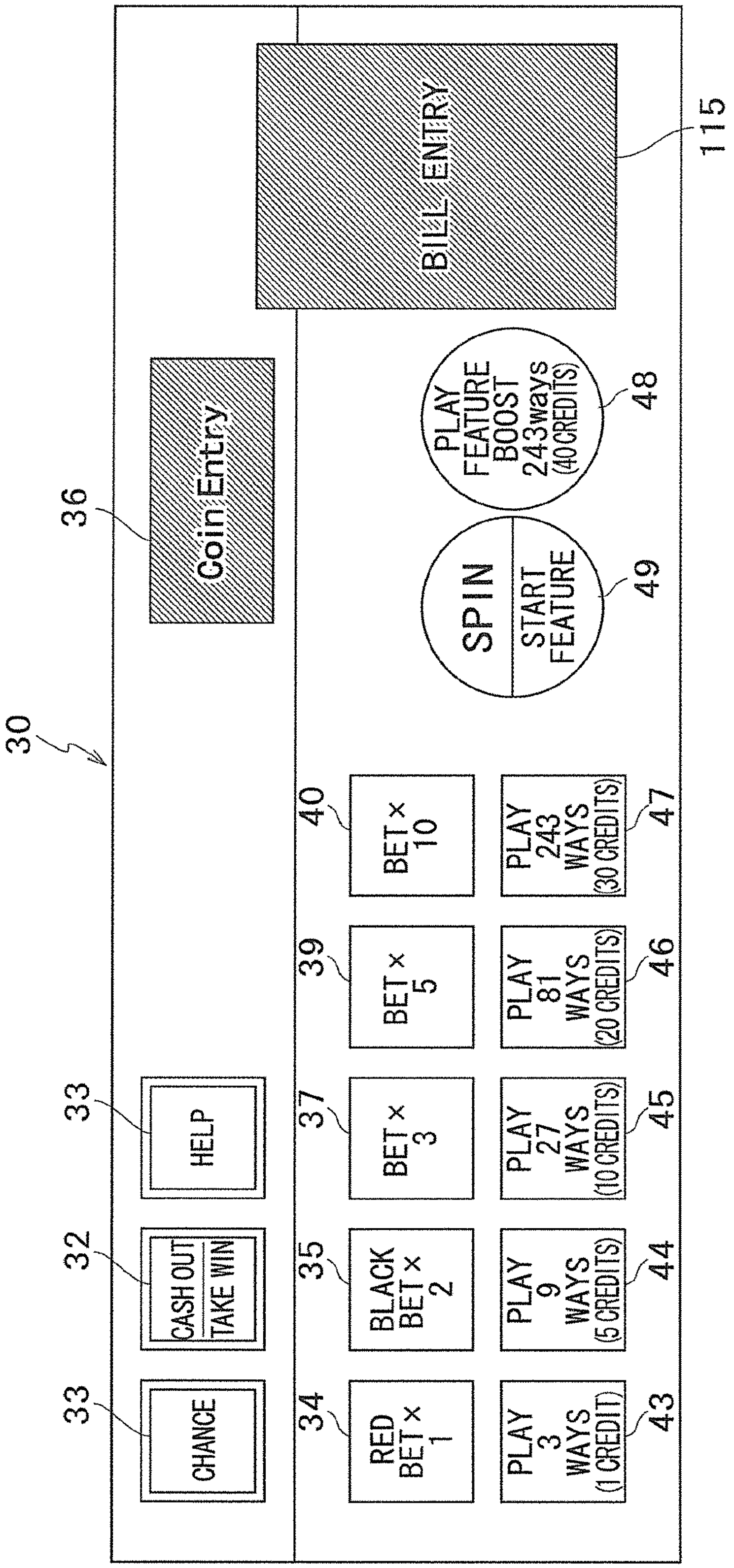
FIG. 5 shows a control panel of the slot machine of the embodiment of the present invention.

As shown in FIG. 4 and FIG. 5, below the lower image display panel 141 are provided various buttons on the control panel 30 (input device), a coin entry 36 which guides coins into the cabinet 11, and a bill entry 115.

The control panel 30 shown in FIG. 5 includes: a RESERVE button 31, a CASHOUT/TAKE WIN button 32, and a help button 33 arranged in the left side area of the upper stage; a 1-BET button 34, a 2-BET button 35, a 3-BET button 37, a 5-BET button 39, a 10-BET button 40, a WAYS BET1 button 43, a WAYS BET2 button 44, a WAYS BET3 button 45, a WAYS BET4 button 46, and a WAYS BET5 button 47 in the left side area of the lower stage. Further, the coin entry 36 and the bill entry 115 for accepting tickets with barcodes, bills, and the like are arranged in the upper stage on the right side area, and the spin button 49 and the GAMBLE button 48 are arranged in the lower stage on the right side area.

The RESERVE button 31 is used to set the slot machine 1 in a standby state for a while when, for example, the player temporarily leaves the seat. When this RESERVE button 31 is pressed, a message "RESERVED" and the remaining time are displayed on the lower image display panel 141 (see FIG. 74). The cashout/take win button 32 is an operation button used when checking out coins (credit) reserved in the slot machine 10 is discharged. The help button 33 is pressed when the operating method of a game is unclear. When the help button 33 is pressed, various types of help information are displayed on the upper image display panel 131 and the lower image display panel 141.

The WAYS BET1 button 43, the WAYS BET2 button 44, the WAYS BET3 button 45, the WAYS BET4 button 46, and WAYS BET5 button 47 are buttons for determined result determination areas to be subjected to result determination (to be activated), out of 15 areas (the 5 by 3 matrix) of the symbol display area 4. To determine the areas to be subjected to result determination by the WAYS BET1 button 43, 1 credit is required. To determine the areas to be subjected to result determination by the WAYS BET2 button 44, 3 credits are required. To determine the areas to be subjected to result determination by the WAYS BET3 button 45, 7 credits are required. To determine the areas to be subjected to result determination by the WAYS BET4 button 46, 15 credits are required. To determine the areas to be subjected to result determination by the WAYS BET5 button 47, 30 credits are required.

The 1-BET button 34 is a button to determine ×1 as the multiplying factor relative to the payout (1BET). The 2-BET button 35 is a button to determine ×2 as the multiplying factor relative to the payout (2BET). The 3-BET button 37 is a button to determine ×3 as the multiplying factor relative to the payout (3BET). The 5-BET button 39 is a button to determine ×5 as the multiplying factor relative to the payout (5BET). The 10-BET button 40 is a button to determine ×10 as the multiplying factor relative to the payout (10BET). As described above, five credit types are selectable.

In the present embodiment, the credit amount to be placed as a bet is determined by means of selecting any of the foregoing five stages of WAYS BET (i.e., WAYS BET1, WAYS BET2, WAYS BET3, WAYS BET4, WAYS BET5) and any of the foregoing five types of BET buttons (i.e., 1-BET Button 34, 2-BET button 35, 3-BET button 37, 5-BET button 39, 10-BET button 40), and a unit game is started thereafter.

Specifically, the credit amount bet for starting the unit game is a product resulting from multiplication of the number of credits required by the selected WAYS BET by the credit value corresponding to the selected bet button. The number of credits required for the WAYS BET is 1 credit for WAYS BET1, 3 credits for WAYS BET2, 7 credits for WAYS BET3, 15 credits for WAYS BET4, and 30 credits for WAYS BET5. For example, when the WAYS BET1 and 2-BET button 35 are selected, 2 credits, which is a product of 1×2, are placed as the bet. Further, when the WAYS BET3 and 3-BET button 37 are selected, 21 credits, which is a product of 7×3, are placed as the bet. Further, when the WAYS BET5 and 10-BET button 40 are selected, 300 credits, which is a product of 30×10, are placed as the bet.

The spin button 49 is a button for starting scroll of the video reels 3 (3*a*, 3*b*, 3*c*, 3*d*, and 3*e*). The spin button 49 also serves as a button for use in selection making in relation to the progress of the game. The GAMBLE button 48 is used for transition to a GAMBLE game.

The coin entry 36 is used for receiving coins into the cabinet 11. The bill entry 115 validates paper money, and accepts genuine paper money and a barcode attached ticket 175 into the cabinet 11.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The slot machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the credit amount, date and time, the identification number of the slot machine 1, and the like, and then outputs the ticket as the ticket 175 with a barcode. The player is able to play games by causing the slot machine to read the ticket 175 with the barcode and to exchange the ticket 175 with the barcode for paper money or the like at a predetermined location in the gaming facility (e.g., a counter in the casino).

The card slot 176 is provided to insert a card storing predetermined data thereto. The card stores, for example, data for identifying the player and data regarding the playing history of the player. From and to the card inserted into the card slot 176, data is read and written by a later-described card reader 172. The card may store data equivalent to coins, paper money, or credits.

The data display 174 is constituted by a fluorescent display, LEDs and the like, and displays the data read by the card reader 172 and the data inputted by the player via the keypad 173, for example. The keypad 173 is provided to input instructions and data regarding the issuance of a ticket or the like.

[Symbol Arrays on Video Reels]

Next, with reference to FIG. 8 to FIG. 18, the following describes a configuration of the symbol arrays on the video reels 3 of the slot machine 1.

As shown in FIG. 8, to a first video reel ("Reel 1") 3*a*, a second video reel ("Reel2") 3*b*, a third video reel ("Reel3") 3*c*, a 4th video reel ("Reel4") 3*d*, a 5th video reel ("Reel5") 3*e* of the normal game video reel 3, symbol arrays each constituted by corresponding to code numbers "0" to "33" are allocated, respectively.

As shown in FIGS. 9 to 18, to a first video reel ("Reel 1") 3*a*, a second video reel ("Reel2") 3*b*, a third video reel ("Reel3") 3*c*, a 4th video reel ("Reel4") 3*d*, a 5th video reel ("Reel5") 3*e* of the free game video reel 3 for the free game (five types: for MAN, for DRAGON, for FISH, for TURTLE, and for GOURD), symbol arrays each constituted by symbols corresponding to code numbers "0" to "71" are allocated, respectively.

Further, as shown in FIG. 8 to FIG. 18, the types of symbols arrayed on each video reel 3 include: normal symbols, a wild symbol which is an almighty symbol that could substitute for any other symbol, and a feature symbol that constitutes a trigger of jackpot random determination and a condition for winning (feature win) which awards the right to play the free game. The normal symbols are for example "MAN", "DRAGON", "FISH", "TURTLE", "GOURD", "ACE", "KING", "QUEEN", "JACK", "TEN", or "NINE".

[Structures of Circuits Provided to Slot Machine]

Figure 19:
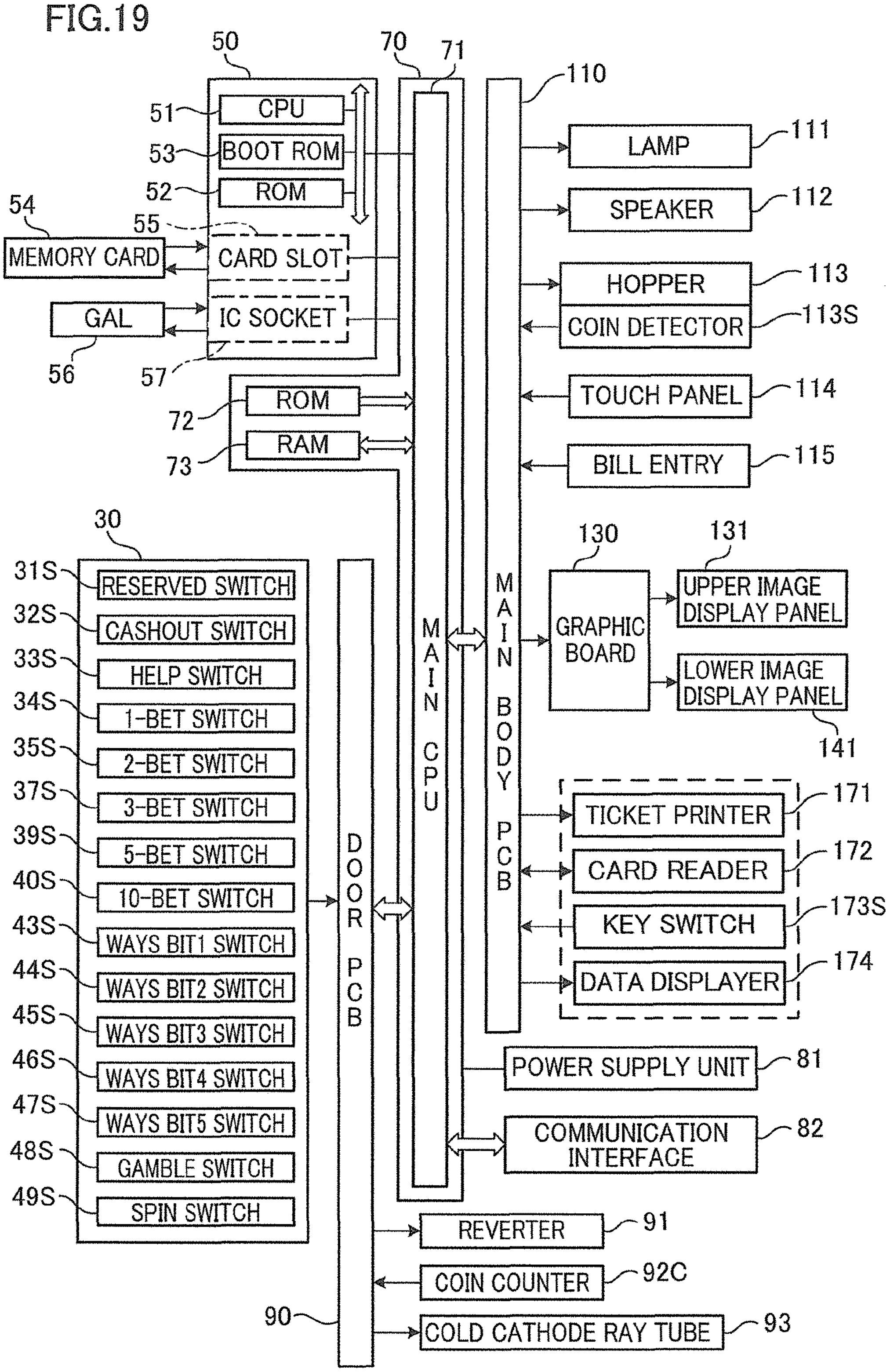
FIG. 19 is a block diagram showing an internal structure of the slot machine related to the embodiment of the present invention.

Now, referring to FIG. 19, the configuration of a circuit in the slot machine 1 will be described. FIG. 19 is a block diagram showing an internal structure of the slot machine of the embodiment of the present invention.

A gaming board 50 is provided with a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a nonvolatile memory, and stores a game program and a game system program. The game program includes a program related to game progression, a random determination program, and a program for producing effects by images and sounds (see e.g., FIG. 30 to FIG. 34 described later). Furthermore, the game program includes data (see FIG. 8 to FIG. 18) defining the arrangement of the symbol array allocated to each video reel 3.

The random determination program is a program for randomly determining to-be-stopped symbol on the video reels 3. The to-be-stopped symbol is data for determining three symbols to be displayed to the symbol display area 4 out of plural symbols forming each symbol array. The slot machine 1 of the embodiment of the present invention determines, as the to-be-stopped symbols, the symbols to be displayed in a predetermined area (e.g. the middle stage) out of the three areas provided for each of the video reels 3 of the symbol display area 4. This way symbols to be displayed in the three areas (the upper stage area, the middle stage area, and the lower stage area) corresponding to each video reel 3 of the symbol display area 4.

The aforementioned random determination program includes symbol determination data. The symbol determination data is data that specifies random numbers so that each of the symbols forming the symbol array is determined at an equal probability for each of the video reels 3. For example, for the first video reel ("Reel 1") 3*a* of the normal game video reel 3 shown in FIG. 8, the data specifies the random numbers such that 30 symbols (with the code numbers "0" to "29") constituting the symbol array are determined at the same probability (i.e., 1/30). However, because the number of the symbols in 30 symbols is different between the types, the probability of the selection is different between the types of the symbols (i.e., the types are differently weighted). For example, in FIG. 8, the symbol array of the first video reel 3*a* ("Reel 1") of the normal game video reel 3 includes three "ACE" symbols and only one "DRAGON" symbol. Therefore the former is selected at the probability of "3/30" whereas the latter is selected at the probability of "1/30".

While in the embodiment of the present invention the data is arranged to differentiate the number of symbols constituting the symbol array between the video reels 3 (30 symbols for the video reel 3*a*, 30 symbols for the video reel 3*b*, 24 symbols for the video reel 3*c*, 26 symbols for video reel 3*d*, and 34 symbols for the video reel 3*e*), the number of symbols constituting the symbol column may be identical between the video reels 3. For example, each of all symbol arrays of the video reels 3*a* to 3*e* of the video reels 3 may be constituted by 50 symbols. This arrangement increases the degree of freedom in setting the probabilities of the selection of the symbols of different types in each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents and settings of the game to be played on the slot machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the preliminary authentication program, and the like. The authentication program is a program (falsification check program) for authenticating the game program and the game system program. The pre-authentication program is a program for authenticating the aforementioned preliminary authentication program. The authentication program and the preliminary authentication program are written along a procedure (authentication procedure) for proving that the program to be the subject has not been falsified.

The motherboard 70 is provided with a main CPU 71, a ROM 72, a RAM 73, and a communication interface 82. The ROM 72 and the RAM 73 correspond to the storage unit.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted. Further, through the gaming board 50, a process of loading the game program and the game system program stored in the memory card 54 is started.

The processor of the present invention includes the main CPU 71, the ROM 72, and the RAM 73 above and the memory card 54 storing the game program and the game system program, and controls the slot machine by causing the CPU 71 to execute the game program and the game system program. Needless to say, the processor may alternatively store the game program and the game system program in the ROM 72 instead of the memory card 54.

The RAM 73 stores data and programs which are used in operation of the main CPU 71. For example, when the process of loading the aforementioned game program, game system program or authentication program is executed, the RAM 73 can store the program. The RAM 73 is provided with working areas used for operations when these programs are executed. Examples of the areas include: an area that stores counters for the number of games, the bet amount, the payout amount, the credit amount and the like; and an area that stores symbols (code numbers) randomly determined.

The communication interface 82 is for communicating with the external controller 200 such as a server, through the communication line 301. Further, the motherboard 70 is connected with a later-described door PCB (Printed Circuit Board) 90 and a main body PCB 110 by respective USBs. The motherboard 70 is also connected with a power supply unit 81. When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the main body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

For each of the buttons, the control panel 30 includes: a RESERVE switch 31S, a cashout switch 32S, a help switch 33S, a 1-BET switch 34S, a 2-BET switch 35S, a 3-BET switch 37S, a 5-BET switch 39S, a 10-BET switch 40S, a WAYS BET1 switch 43S, a WAYS BET2 switch 44S, a WAYS BET3 switch 45S, a WAYS BET4 switch 46S, a WAYS BET5 switch 47S, a GAMBLE switch 48S, and a spin switch 49S. Each of the switches outputs a signal to the main CPU 71 upon detection of press of the button corresponding thereto by the player.

The coin counter 92C checks whether a coin inserted into the coin receiving slot 36 is genuine in terms of the material, shape, or the like. When determining that the coin is genuine, the coin counter 92C outputs a signal to the main CPU 71. Non-genuine coins are ejected through a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face side of the upper image display panel 131 and the lower image display panel 141, and turns on based on a control signal outputted from the main CPU 71.

To the main body PCB 110 are connected the lamp 111, the speaker 112, a hopper 113, a coin detector 113S, the touch panel 114, the bill entry 115, a graphic board 130, a ticket printer 171, a card reader 172, a key switch 173S and the data display 174.

The lamp 111 turns on based on a control signal outputted from the main CPU 71. The speakers 112 output BGM sound or the like in accordance with a control signal output from the main CPU 71.

The hopper 113 operates based on a control signal outputted from the main CPU 71, and pays out a designated number of coins from the coin payout exit 15A to the coin tray 15. The coin detector 113S outputs a signal to the main CPU 71 upon detection of coins paid out by the hopper 113.

The touch panel 114 detects a position on the lower image display panel touched by a finger or the like of the player, and outputs a signal corresponding to the detected position to the main CPU 71. Upon acceptance of a valid bill, the bill entry 115 outputs to the main CPU 71 a signal corresponding to the face amount of the paper money.

The graphic board 130 controls image display executed by the respective upper image display panel 131 and lower image display panel 141, based on a control signal outputted from the main CPU 71. The symbol display area 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like.

The graphic board 130 is provided with the VDP (Video Display Processor) generating image data based on a control signal outputted from the main CPU 71, the video RAM temporarily storing the image data generated by the VDP, and the like. It is to be noted that the image data used for generating image data by the VDP is included in the game program that has been read from the memory card 54 and stored into the RAM 73.

Based on a control signal outputted from the main CPU 71, the ticket printer 171 prints on a ticket a barcode representing encoded data of the credit amount stored in the RAM 73, date and time, the identification number of the slot machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

Based on a control signal output from the main CPU 71, the data displayer 174 displays data read by the card reader 172, or data input through the keypad 173 by the player.

(Arrangement of Symbol Combination Table)

Now, symbol combination tables will be described with reference to FIG. 20. FIG. 20 shows a symbol combination table of the slot machine of the embodiment of the present invention.

The symbol combination tables of the present embodiment define the combinations of symbols (the number of symbols) with which a winning (WIN) is achieved and payout amounts. In the slot machine 1, winning is achieved when the scroll of the symbol array of each video reel 3 is stopped and symbols displayed in the symbol display area 4 forms a line which goes through the first column area to the fifth column area within the result determination area set to be the subject of the result determination by the WAYS BET. In accordance with the type of winning, a benefit will be given to the player in the form of awarding coin and the like.

Basically, winning is achieved when a predetermined number of symbols of a single kind are arranged linked to one another, as in a 3Kind, a 4Kind, or a 5Kind combination, through the first column area to the fifth column area, within the result determination area set as the subject to result determination, by the WAYS BET button. The above symbols of a single kind may be "MAN", "DRAGON", "FISH", "TURTLE", "GOURD", "ACE", "KING", "QUEEN", "JACK", "TEN", or "NINE". The symbol of "WILD" is substituted by any of the above symbols: "MAN", "DRAGON", "FISH", "TURTLE", "GOURD", "ACE", "KING", "QUEEN", "JACK", "TEN", or "NINE". Regarding the "FEATURE" symbol, a payout and the right to play the free game are awarded if "FEATURE" symbol occurs in three or more consecutive positions through the first column area to the fifth column area (when 3Kind or more combination of the "FEATURE" is formed), irrespective of the area turned active by the WAYS BET button. When the "FEATURE" symbol is displayed in the symbol display area 4 of the lower image display panel 141, jackpot random determination is triggered.

For example, when the "WAYS BET5" is selected, all the areas out of the symbol display area 4 are subjected to result determination (activated). When the scroll of the symbol arrays on the video reels 3 is stopped and the "DRAGON" symbol occurs in the lower stage of the first column area, the upper stage of the second column area, the upper stage of the third column area, the middle stage of the fourth column area, and the lower stage of the fifth column area, there is a winning in which the symbol occurs in five linked positions from the first column area to the fifth column area (LEFT TO RIGHT) (5Kind combination of "DRAGON" is formed). In this case, the symbol combination table shown in FIG. 20 is referred to, and a payout amount of "120" is determined. Based on the determined payout amount, coins are paid out. The coins are paid out in the form of: actual output of coins from the coin payout exit 15A; adding the number of coins to the credits; or issuance of a barcode ticket.

Further, for a winning related to "MAN", "DRAGON", "FISH", "TURTLE", "GOURD", "ACE", "KING", "QUEEN", "JACK", "TEN", or "NINE", a product of the value associated with the credit type of the unit game multiplied by the value defined in the symbol combination table is paid out. For example, when a winning related to three "DRAGON" symbols is achieved (when 3Kind combination of "DRAGON" is formed in a unit game where 10 bet is placed by the 10-BET button 40, the awarded credits will be 30×10=300. Further, for a winning related to "FEATURE", a product of all the bet amount in the unit game multiplied by the value defined in the symbol combination table is paid out. For example, when a winning related to three "FEATURE" symbols occurs in a case where a result determination area to be subjected to result determination is set by the WAYS BET5 button 47 (which requires 30 credits) and 10 credits are placed as a bet by the 10-BET button 40, 1500 credits (30×10×5=1500) and the right to play the free game are awarded.

(Jackpot Random Determination Table: Normal Game)

A normal game jackpot random determination table which is referred to in the normal game will be described with reference to FIG. 21. The normal game jackpot random determination table (equivalent to the bonus random determination table) is a table which is referred to in a later-described S20, and is stored in the RAM 73 (equivalent to a table storage area). The normal game jackpot random determination table defines probabilities of achieving jackpot (winning probabilities) in association with all bet amounts (total bet) in the normal game.

For example, when a result determination area for which result determination is carried out is determined by the WAYS BET5 button 47 (30 credits are required) and 10 credits are betted by the 10-BET button 40, the total bet is 30×10=300. As shown in FIG. 21, when the total bet is 300, the probability of achieving the jackpot (winning probability) is set at 300/5000. When a result determination area for which result determination is carried out is determined by the WAYS BET1 button 43 (1 credit is required) and 10 credits are betted by the 10-BET button 40, the total bet is 1×10=10. As shown in FIG. 21, when the total bet is 10, the probability of achieving the jackpot (winning probability) is set at 10/5000.

(Jackpot Random Determination Table: Free Game)

A free game jackpot random determination table (equivalent to the bonus random determination table) referred to in the free game will be described with reference to FIGS. 22 to 26. The free game jackpot random determination table is a table which is referred to in a later-described S113, and is stored in the RAM 73 (equivalent to the table storage area). Five types (MAN, DRAGON, FISH, TURTLE, and GOURD) of free game jackpot random determination tables are prepared to correspond to the types of the symbols selected in S103. In the free game jackpot random determination table, the probabilities of achieving the jackpot (winning probabilities) are defined in association with all bet amounts (total bet) in the normal game in which the shift to the free game occurs.

As shown in FIG. 22, in the free game (MAN) jackpot random determination table, provided that the total bet in the normal game in which the shift to the free game occurs is 300, the probability (winning probability) of achieving the jackpot is set at 64511316217800/100000000000000. As shown in FIG. 23, in the free game (DRAGON) jackpot random determination table, provided that the total bet in the normal game in which the shift to the free game occurs is 10, the probability (winning probability) of achieving the jackpot is set at 1536095549260/100000000000000.

(Jackpot Payout Determination Table)

The following describes the jackpot payout determination table with reference to FIG. 27. The jackpot payout determination table (equivalent to the bonus payout determination table) is a table referred to in later-described jackpot payout random determination in S132 and is stored in the RAM 73 (equivalent to the table storage area). This jackpot payout determination table defines random determination probabilities for five levels (GRAND, MAJOR, MINOR, MINI, and CREDIT AWARD) of the jackpot payout.

As shown in FIG. 27, for example a random determination probability of 1674/10000000 is associated with the GRAND jackpot payout, a random determination probability of 6696/10000000 is associated with the MAJOR jackpot payout, a random determination probability of 279012/10000000 is associated with the MINOR jackpot payout, a random determination probability of 3016342/10000000 is associated with the MINI jackpot payout, and a random determination probability of 6696276/10000000 is associated with the CREDIT AWARD.

(Jackpot: Increment)

With reference to FIG. 28, an increment rate when a part of a bet amount is accumulated as resource for a jackpot payout (bonus payout) will be described. The jackpot payout in the present embodiment is formed by adding, to an initial value, an accumulated value of a predetermined rate of gaming media betted each time the normal game is executed. In the CREDIT AWARD, 500 credits are awarded as a fixed payout.

To be more specific, the initial value is 200000 credits in GRAND, 25000 credits in MAJOR, 4000 credits in MINOR, and 1000 credits in MINI.

In the GRAND jackpot payout, as shown in FIG. 28, 0.12% of the gaming media betted in the normal game by the player is accumulated in an incremented manner, each time the normal game is executed. In the MAJOR jackpot payout, as shown in FIG. 28, 0.12% of the gaming media betted in the normal game by the player is accumulated in an incremented manner, each time the normal game is executed. In the MINOR jackpot payout, as shown in FIG. 28, 0.42% of the gaming media betted in the normal game by the player is accumulated in an incremented manner, each time the normal game is executed. In the MINI jackpot payout, as shown in FIG. 28, 0.84% of the gaming media betted in the normal game by the player is accumulated in an incremented manner, each time the normal game is executed.

[Contents of Program]

Now, the program to be executed by the slot machine 1 is described with reference to FIG. 30 to FIG. 34.

(Main Control Process)

Figure 30:
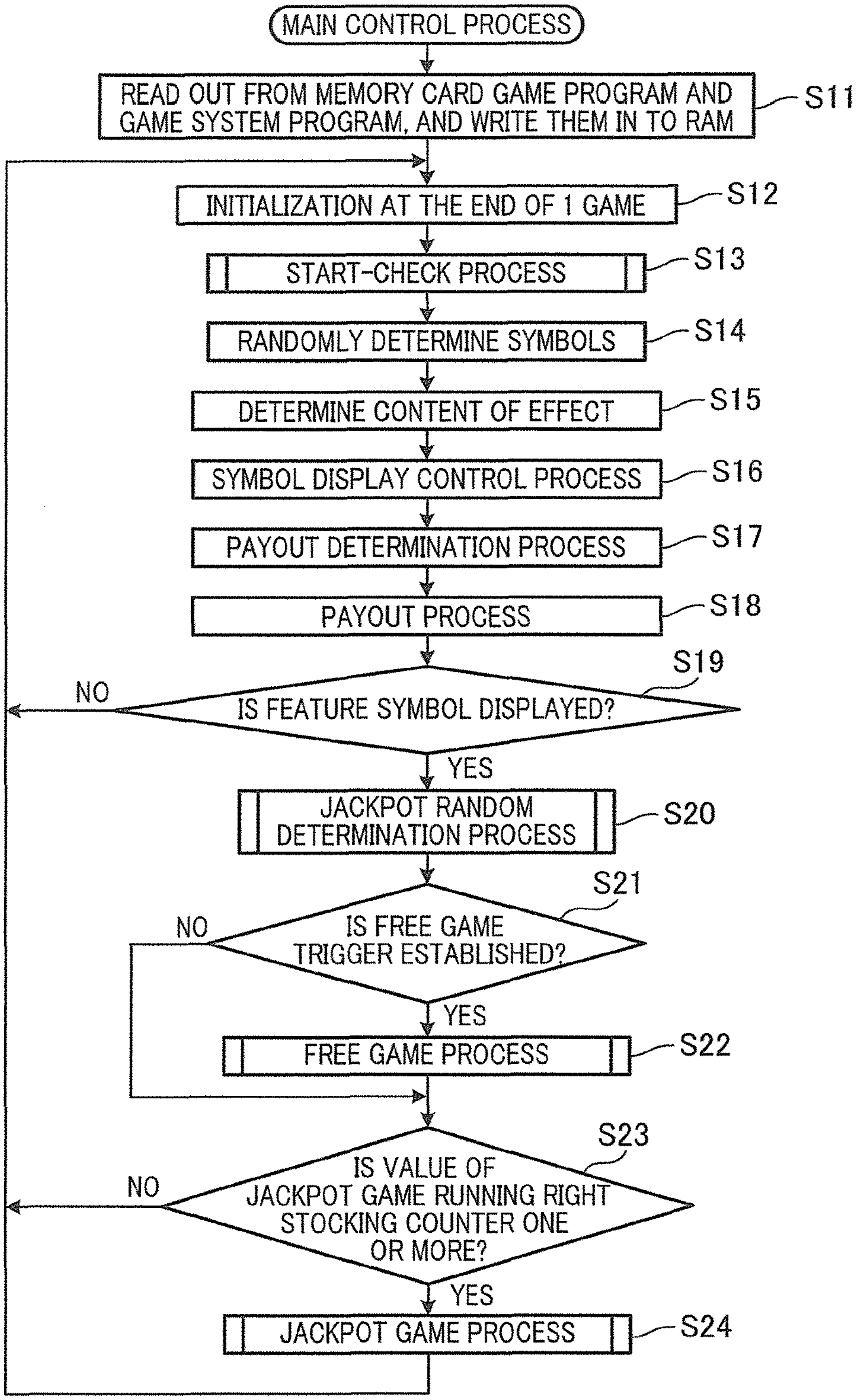
FIG. 30 is a flowchart of a main control process in the slot machine of the embodiment of the present invention.

First, with reference to FIG. 30, a main control process is described. It should be noted that the normal game is run in the main control process.

First, when the slot machine 1 is powered on, the main CPU 71 reads an authenticated game program and a game system program from a memory card 54 via a gaming board 50, and then write them in the RAM 73 (S11).

Next, the main CPU 71 executes an initializing process at the end of each round of the game (S12). This process clears data in a working area of the RAM 73, which becomes unnecessary at the end of each round of game, e.g., the amount of bet, symbols randomly determined, and the like.

Next, the main CPU 71 executes a start-check process described later with reference to FIG. 31(S13). In this process is carried out input checking and the like, to: the 1-BET switch 34S, the 2-BET switch 35S, the 3-BET switch 37S, the 5-BET switch 39S, 10-BET switch 40S, the WAYS BET1 switch 43S, the WAYS BET2 switch 44S, the WAYS BET3 switch 45S, the WAYS BET4 switch 46S, the WAYS BET5 switch 47S, the spin switch 49S, and the like.

Next, the main CPU 71 executes a symbol random determination process (S14). In this process, to-be-stopped symbols are determined based on random numbers for symbol determination.

Specifically, the main CPU 71 first samples random numbers for symbol determination. The main CPU 71 then randomly determines to-be-stopped symbols on the video reels 3 (3*a*, 3*b*, 3*c*, 3*d*, 3*e*). The main CPU 71 executes random determination for each of the video reels 3 (3*a*, 3*b*, 3*c*, 3*d*, 3*e*), and determines any one of the symbols as the to-be-stopped symbols. The symbols are determined at equal probabilities. The main CPU 71 stores the determined to-be-stopped symbols on each video reel 3 in a symbol storing area in the RAM 73.

The main CPU 71 then executes an effect contents determination process (S15). The main CPU 71 samples an effect-use random number and randomly determines any of a plurality of predetermined contents of effect.

Next, the main CPU 71 executes a symbol display control process (S16). In the process, the scroll of the symbol array on each video reel 3 is started, and the symbols determined as the symbols to stop in the symbol random determination process in the step S14 are stopped at a predetermined position (e.g. the middle stage in the symbol display area 4). That is, 15 symbols including the symbols to be stopped are displayed in the symbol display area 4. For example, the symbol with the code number "10" is to be stopped in the middle stage area, the symbols with the code numbers "9" and "11" are displayed in the upper stage and the lower stage of the symbol display area 4, respectively.

The main CPU 71 then executes a payout amount determination process (S17). In this process, a symbol combination table (see FIG. 20) stored in the RAM 73 is referred to, to determine whether the symbols stopped in the symbol display area 4 include symbols linked to one another through the first column area to the fifth column area in the WAYS BET set as the subject of the result determination area, thus achieving a winning. In accordance with the type of winning and the credit type used in betting, a benefit such as the payout or the right to play the free game is awarded to the player. The payout awarded is stored in a payout amount storage area of the RAM 73.

Then a payout process is executed (S18). The main CPU 71 adds a value stored in the payout amount storage area to a value stored in the credit counter stored in the credit amount storage area provided in the RAM 73.

Thereafter, the main CPU 71 determines whether the FEATURE symbol is displayed in the symbol display area 4 of the lower image display panel 141 (S19).

When the FEATURE symbol is displayed in the symbol display area 4 (S19: YES), a later-described jackpot random determination process is executed (S20). In the meanwhile, when the FEATURE symbol is not displayed in the symbol display area 4 (S19: NO), the routine proceeds to S12.

Figure 51:
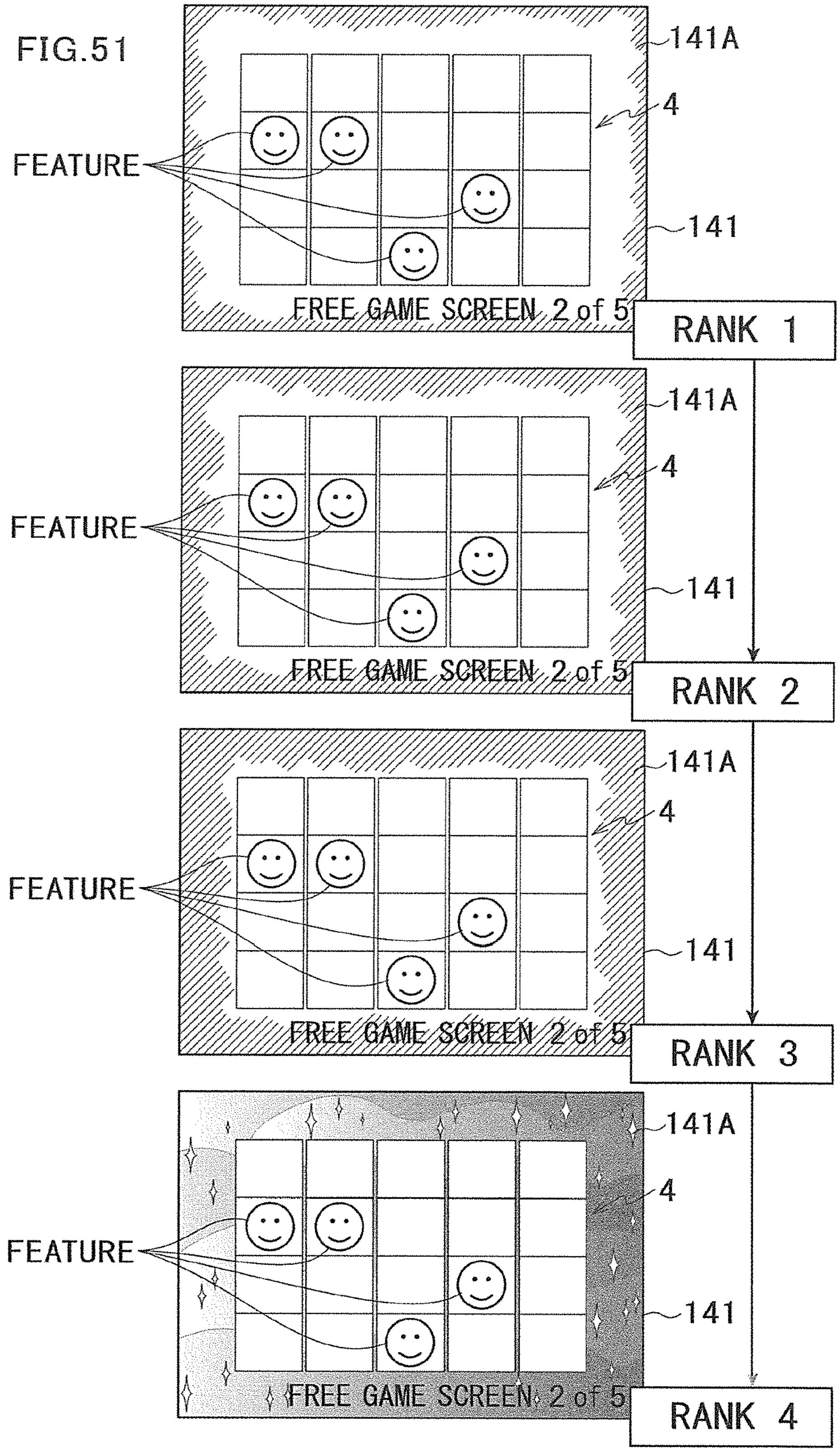
FIG. 51 shows a free game background effect in the slot machine related to the embodiment of the present invention.

When the FEATURE symbol stops in the symbol display area 4 of the lower image display panel 141 and winning is achieved in random determination as shown in FIG. 51, a step-up effect is executed so that ice is gradually formed toward the center of the screen at a frame 141A of the lower image display panel 141 (i.e., plural effect images from a minor effect to a major effect are displayed stepwise).

After S20, the main CPU 71 determines whether a free game trigger is established (i.e., whether the right to execute the free game is awarded) S21). In the present embodiment, the trigger for transition to the free game is that the FEATURE symbol occurs in three or more consecutive positions through the first column area to the fifth column area, irrespective of the area activated by WAYS BET. The main CPU 71, when determining that the free game trigger has been established (S21: YES), executes a later described free game process (S22)

After S22 or when the free game trigger is not established in S21 (S21: NO), the main CPU 71 determines whether a value of a jackpot game running right stocking counter (bonus game running right stocking counter) stored in the running right stocking area of the RAM 73 is at least one or not (S23). When the value of the jackpot game running right stocking counter is at least one (S23: YES), a later-described jackpot game process is executed (S24).

After S24 or when the value of the jackpot game running right stocking counter is less than one in S23 (S23: NO), the routine proceeds to S12.

According to the arrangement above, when three or more FEATURE symbols are rearranged in the symbol display area 4, the free game trigger is established so that the right to execute the free game is awarded, and jackpot random determination for a number of times corresponding to the number of the rearranged FEATURE symbols in the symbol display area 4 is triggered. With this arrangement, the jackpot random determination is executed when the free game trigger is established, but the result of the jackpot random determination is unknown until the end of a free game period. As a result, it is possible to keep the player's expectation on the jackpot game (bonus game) awarded as a result of the jackpot random determination during the free game period.

(Start-Check Process)

Figure 31:
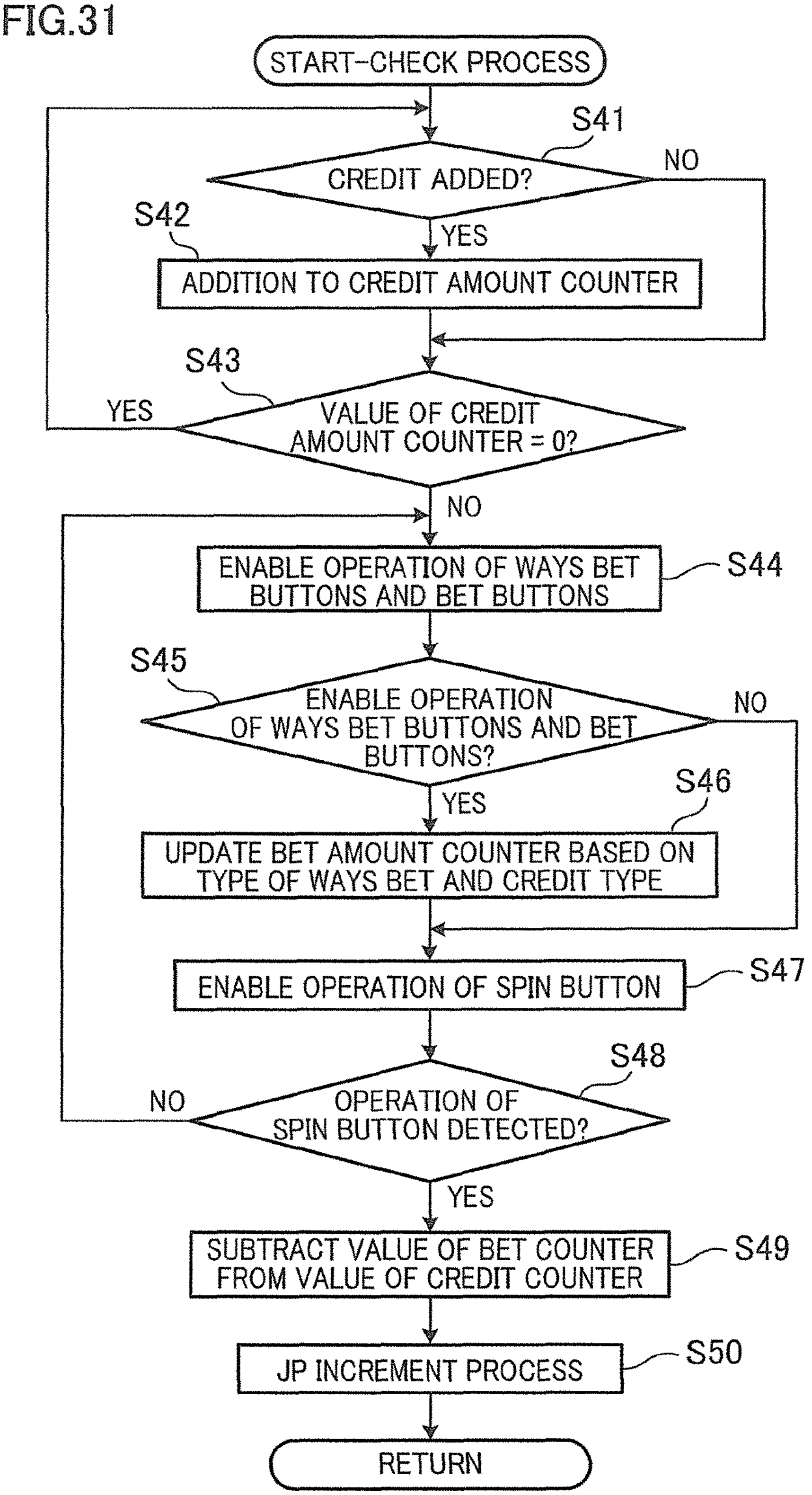
FIG. 31 is a flowchart of a start-check process of the slot machine related to the embodiment of the present invention.

Next, the start-check process is described reference to FIG. 31.

First, the main CPU 71 reads a barcode attached ticket 175 through the bill entry 115, and determines if there is an addition of a credit (S41). When determining that there is addition of a credit (S41: YES), the main CPU 71 adds the specified amount of credits to the value stored in the credit counter stored in the credit amount storage area of the RAM 73 (S42). It should be noted that the subject to be read by the bill entry 115 includes paper money, an IC card and the like, in addition to the barcode attached ticket 175.

After the step S42 or when determining in the step S41 that there is no addition of credits (S41: NO), the main CPU 71 determines whether or not the value stored in the credit counter stored in the credit amount storage area is 0 (S43). The process then transits to S41, if the value stored in the credit counter stored in the credit amount storage area is 0 (S43: YES).

On the other hand, when the main CPU 71 determines that the value stored in the credit counter stored in the credit amount storage area is not 0 (S43: NO), the main CPU 71 enables operation of the WAYS BET buttons (WAYS BET1 button 43, WAYS BET2 button 44, WAYS BET3 button 45, WAYS BET4 button 46, WAYS BET5 button 47, feature boost button 47) and the bet buttons (1-BET button 34, 2-BET button 35, 3-BET button 37, 5-BET button 39, 10-BET button 40) (S44). By selecting any of the five stages of WAYS BET buttons, a result determination area to be subjected to result determination is selected out of 15 areas of the 5 by 3 matrix of the symbol display area 4 (see FIG. 6).

Next, the main CPU 71 determines if an operation of the WAYS BET button or the bet button is detected (S45). When the main CPU 71 detects pressing of the WAYS BET button by the player through the WAYS BET switch (WAYS BET1 switch 43S, WAYS BET2 switch 44S, WAYS BET3 switch 45S, WAYS BET4 switch 46S, WAYS BET5 switch 47S) and detects pressing of the bet button by the player through the bet switch (1-BET switch 34S, 2-BET switch 35S, 3-BET switch 37S, 5-BET switch 39S, 10-BET switch 40S), the main CPU 71 updates the value of the bet counter stored in the bet amount storage area provided in the RAM 73, based on the product of the amount of credit necessary for the selected WAYS BET (1 credit for WAYS BET1, 3 credits for WAYS BET2, 7 credits for WAYS BET3, 15 credits for WAYS BET 4, and 30 credits for WAYS BET5) multiplied by the amount of credit corresponding to the bet button operated (S46).

After S46 or when no operation of the WAYS BET button or the bet button is detected in S45 (S45: NO), the main CPU 71 enables operation of the spin button 49 (S47).

After S47, the main CPU 71 determines whether or not an operation of the spin button 49 is detected (S48). When the main CPU 71 determines that an operation of the spin button 49 is not detected (S48: NO), the process moves to S44.

In the meanwhile, when an operation of the spin button 49 is detected (S48: YES), the main CPU 71 subtracts the value on the bet counter calculated in the step S46 from the value stored in the credit counter stored in the credit amount storage area (S49).

The main CPU 71 then executes a JP increment process (S50). In the JP increment process, as a resource for each jackpot payout, the jackpot storage area (bonus storage area) in the RAM 73 is incremented by a value calculated by multiplying the value on the bet counter calculated in S46 by an increment rate at each level of the jackpot payout shown in FIG. 28. For example, with reference to FIG. 28, when the value of the bet counter calculated in S46 is 100, 100×0.0012=0.12 credit is added to the resource of the "GRAND" jackpot payout, 100×0.0012=0.12 credit is added to the resource of the "MAJOR" jackpot payout, 100×0.0042=0.42 credit is added to the resource of the "MINOR" jackpot payout, and 100×0.0084=0.84 credit is added to the resource of the "MINI" jackpot payout. Then, the start-check process is terminated.

(Jackpot Random Determination Process)

Figure 32:
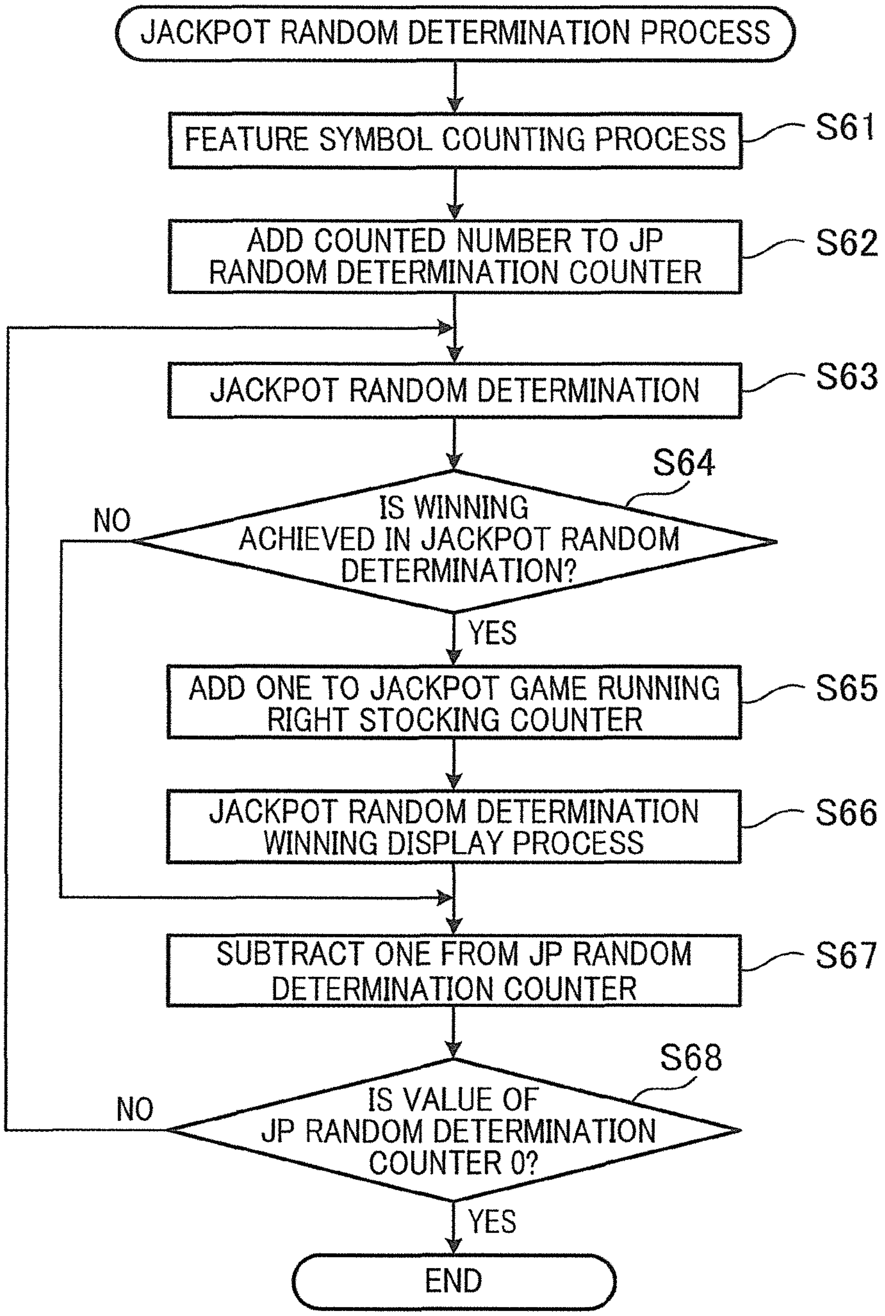
FIG. 32 is a flowchart of a jackpot random determination process in the slot machine of the embodiment of the present invention.

Now, a jackpot random determination process will be described with reference to FIG. 32. The jackpot random determination process is executed in S20 of the above-described main control process.

To begin with, the main CPU 71 counts the number of the "FEATURE" symbols displayed on the symbol display area 4 (S61).

Then the main CPU 71 adds the number of the "FEATURE" symbols determined in S61 to a JP random determination counter in the RAM 73 (S62).

The main CPU 71 then executes jackpot random determination (equivalent to the bonus random determination) (S63). In the jackpot random determination, winning (ON) or losing (OFF) is randomly selected based on winning probabilities in jackpot random determination tables shown in FIGS. 21 to 26. In the jackpot random determination executed during the normal game (S20), the normal game jackpot random determination table shown in FIG. 21 is referred to. In the jackpot random determination (S113) executed during the later-described free game process (S22), free game jackpot random determination tables shown in FIGS. 22 to 26 are referred to. One of five types (MAN, DRAGON, FISH, TURTLE, and GOURD) of free game jackpot random determination table corresponding to the types of the symbols selected in S103 is referred to.

Figure 29:
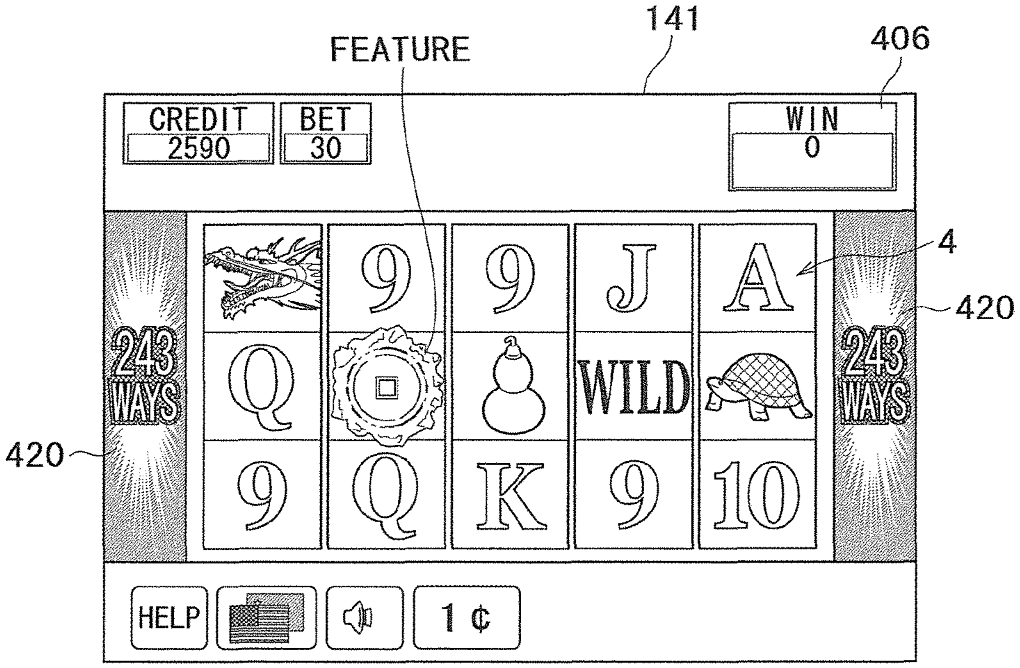
FIG. 29 is an explanatory diagram of a lower image display panel of the slot machine related to the embodiment of the present invention.

In the present embodiment, when executing the jackpot random determination, the main CPU 71 executes an image effect (equivalent to a change to a different display state) of freezing the "FEATURE" symbol (specific symbol) displayed on the symbol display area 4, as shown in FIG. 29. This arrangement allows the player to know that the jackpot random determination is executed each time the "FEATURE" symbol is rearranged on the symbol display area 4, by means of the image effect of freezing the "FEATURE" symbol.

The main CPU 71 then determines whether winning is achieved in the jackpot random determination (S64). When winning is achieved in the jackpot random determination (S64: YES), the main CPU 71 adds 1 to the jackpot game running right stocking counter stored in the running right stocking area of the RAM 73 (S65).

Figure 63:
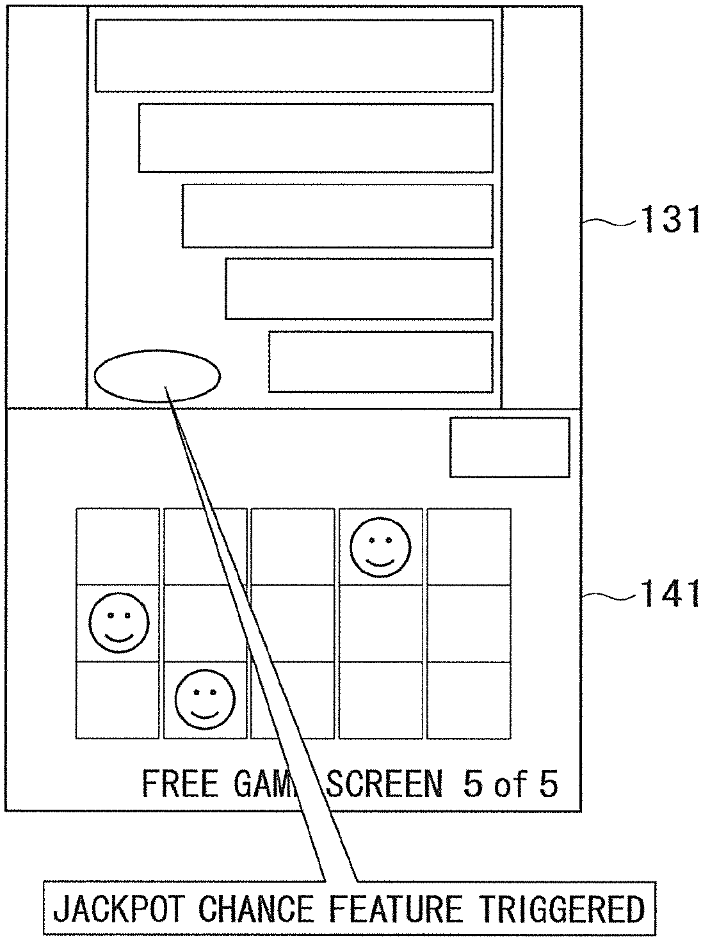
FIG. 63 shows jackpot random determination winning display in the slot machine related to the embodiment of the present invention.

The main CPU 71 then executes a jackpot random determination winning display process (S66). In this jackpot random determination winning display process, as shown in FIG. 63, a message "JACKPOT CHANCE FEATURE TRIGGERED" is displayed at a lower left part of the upper image display panel 131 to notify the winning in the jackpot random determination. This message is displayed until the end of the normal game when the normal game is being played, or is displayed until the end of all free games when the free game is being played. This arrangement allows the player to know the awarding of the right to run the jackpot game (right to run the bonus game).

When achieving winning in the jackpot random determination, confirmation effect random determination is executed to determine whether to execute a jackpot confirmation effect (bonus game confirmation effect). When the jackpot confirmation effect is to be executed as a result of the confirmation effect random determination, as shown in FIG. 51, the jackpot confirmation effect is executed so that rainbow is displayed in the frame 141A of the lower image display panel 141 to indicate winning in the jackpot random determination.

After S66 or when winning is not achieved in the jackpot random determination in S64 (S64: NO), the main CPU 71 subtracts 1 from the JP random determination counter in the RAM 73 (S67).

Thereafter, the main CPU 71 determines whether the JP random determination counter in the RAM 73 indicates 0 (S68). When the value of the JP random determination counter is not 0 (S68: NO), the routine proceeds to S63. When the value of the JP random determination counter is 0, the jackpot random determination process ends.

(Free Game Process)

Figure 33:
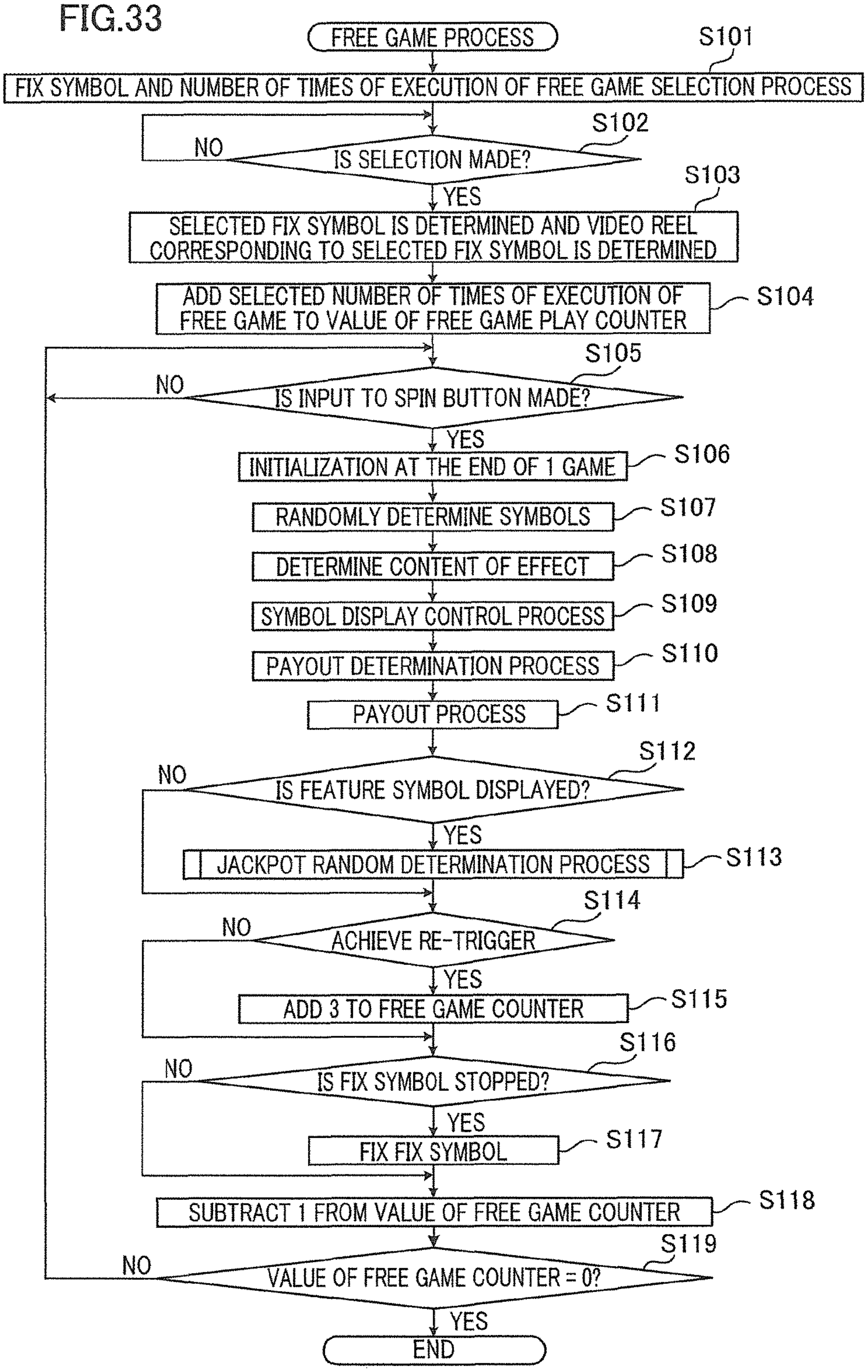
FIG. 33 is a flowchart of a free game process of the slot machine related to the embodiment of the present invention.

The following describes a free game process with reference to FIG. 33. The free game process is executed in S22 of the main control process.

Figure 48:
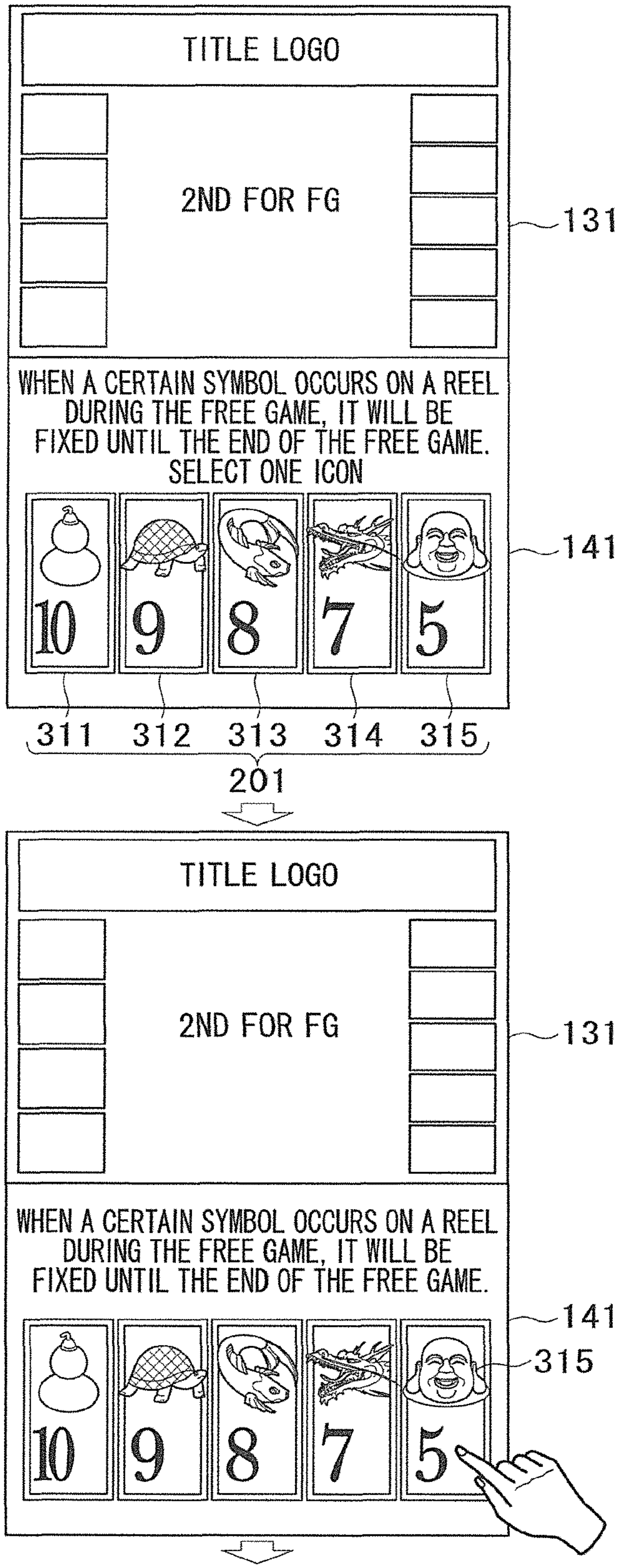
FIG. 48 shows a free game introduction effect in the slot machine related to the embodiment of the present invention.

To begin with, the main CPU 71 executes a fix symbol and number of times of execution of free game selection process (S101). Specifically, in the fix symbol and number of times of execution of free game selection process, as shown in FIG. 48, five icons 310 (a GOURD icon 311, a TURTLE icon 312, a FISH icon 313, a DRAGON icon 314, and a MAN icon 315) corresponding to the five types of symbol pictures are displayed on the lower image display panel 141. These five icons 310 are associated with the types of fix symbols indicating that symbols having stopped in the symbol display area 4 during the free game are fixed one by one in the symbol display area 4 and are associated with the number of times of execution of the free game.

As shown in FIG. 48, to be more specific, the GOURD icon 311 is associated with the GOURD symbol as the fix symbol and associated with ten times as the number of times of execution of the free game. The TURTLE icon 312 is associated with the TURTLE symbol as the fix symbol and associated with nine times as the number of times of execution of the free game. The FISH icon 313 is associated with the FISH symbol as the fix symbol and associated with eight times as the number of times of execution of the free game. The DRAGON icon 314 is associated with the DRAGON symbol as the fix symbol and associated with seven times as the number of times of execution of the free game. The MAN icon 315 is associated with the MAN symbol as the fix symbol and associated with five times as the number of times of execution of the free game.

As shown in FIG. 48, then the player is encouraged to select one of the five icons 310, and the main CPU 71 determines whether one of the five icons 310 has been selected (S102). If no icon is selected (S102: NO), an input of a selection is waited.

When selected (S102: YES), the main CPU 71 selects the symbol corresponding to the selected icon 310 as the fix symbol, and sets a free game video reel (one of five types: for MAN, for DRAGON, for FISH, for TURTLE, and for GOURD) (see FIG. 9 to FIG. 18) corresponding to the selected symbol as a video reel 3 used in the free game (S103).

Furthermore, the main CPU 71 adds the number of times of execution of the free game corresponding to the icon 310 selected in S102 to the value of the free game play counter in the RAM 73 (S104).

Then the main CPU 71 determines whether an input to the spin switch 49S has been done (S105). If no input has been done (S105: NO), an input is waited.

When there is an input to the spin switch 49S (S105: YES), the main CPU 71 executes an initializing process at the end of each round of the game as in the step S12 (S106). Then the main CPU 71 executes a symbol random determination process as in S14 (S107).

The main CPU 71 then executes an effect contents determination process as in S15 (S108). The main CPU 71 then executes a symbol display control process as in S16 (S109). The main CPU 71 then executes a payout amount determination process as in S17 (S110).

The main CPU 71 then executes a payout process (S111). In this payout process, the main CPU 71 adds the value stored in a payout counter in the payout amount determination process of S110 to the value stored in a free game payout counter. The free game payout counter is an area where the total payout amount determined during the free game is stored. When the free game process ends, the main CPU 71 adds the value stored in the free game payout counter to a credit amount counter provided in the RAM 73. In other words, the total payout amount determined in the free game is awarded at once. The payout may be awarded by ejecting coins from the coin payout exit 15A or by issuing a ticket with a barcode.

It should be noted that in the free game, the WAYS BET and the credit type in the normal game in which the right to play the free game is awarded is inherited.

Thereafter, the main CPU 71 determines whether the FEATURE symbol is displayed in the symbol display area 4 of the lower image display panel 141 (S112).

When the FEATURE symbol is displayed in the symbol display area 4 (S112: YES), the aforesaid jackpot random determination process is executed (S113).

When the FEATURE symbol stops in the symbol display area 4 of the lower image display panel 141 and winning is achieved in random determination as shown in FIG. 51, a step-up effect is executed so that ice is gradually formed toward the center of the screen at a frame 141A of the lower image display panel 141 (i.e., plural effect images from a minor effect to a major effect are displayed stepwise).

After S113 or when it is determined in S112 that no FEATURE symbol is displayed in the symbol display area 4 (S112: NO), the main CPU 71 determines whether re-trigger is established (S114). In the present embodiment, the re-trigger occurs when the symbol of "FEATURE" occurs in three or more consecutive positions through the first column area to the fifth column area, irrespective of the result determination area activated by the WAYS BET. When determining that the re-trigger has been established (S114: YES), the main CPU 71 adds 3 to the free game play counter in the RAM 73 (S115). In other words, the number of times of execution of the free game is increased by three.

Subsequently, after S115 or when the main CPU 71 determines in S114 that the re-trigger is not established (S114: NO), the main CPU 71 determines whether the fix symbol determined in S103 is stopped at the result determination area activated by WAYS BET (S116).

Figure 49:
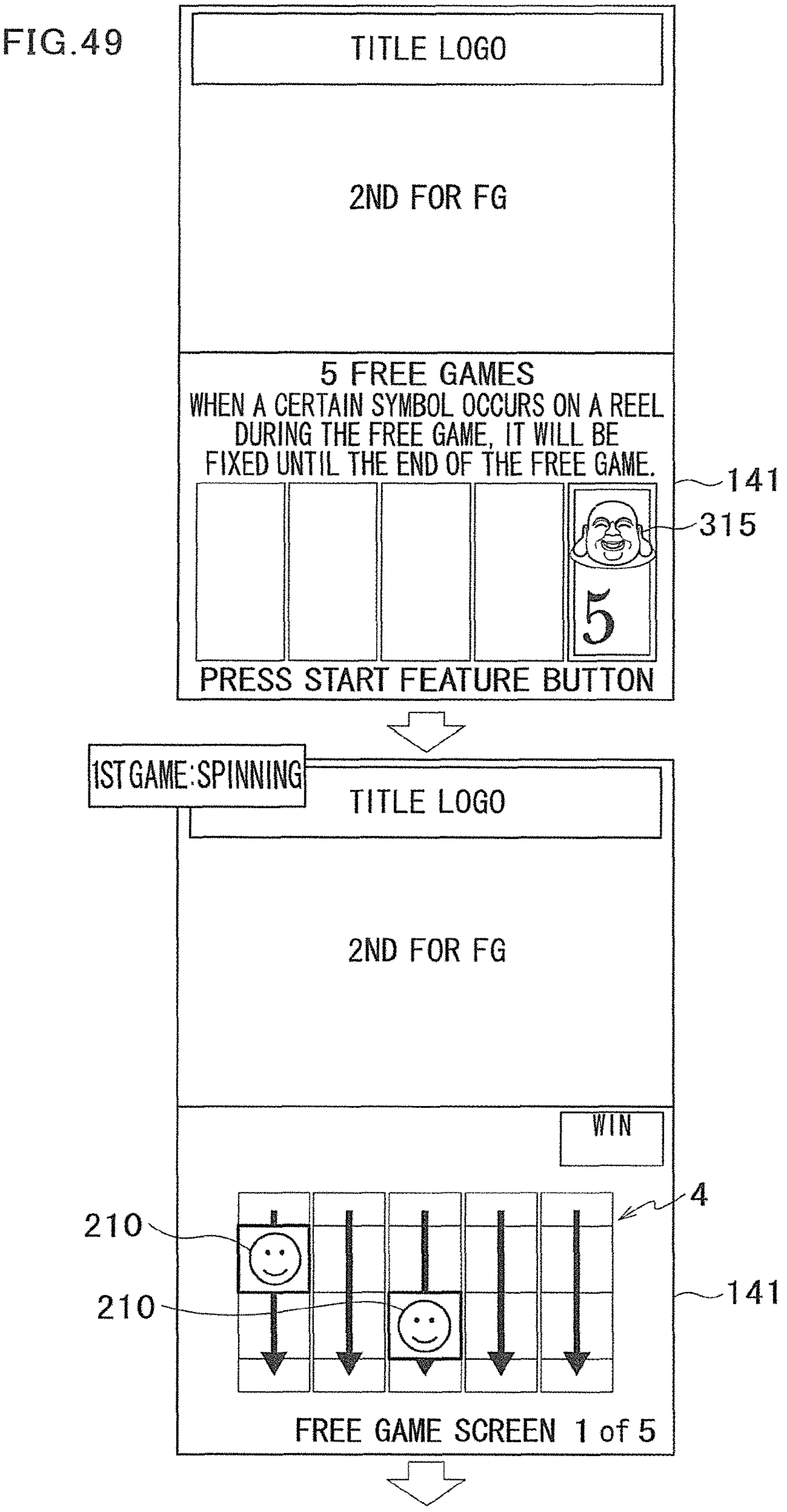
FIG. 49 shows a free game introduction effect in the slot machine related to the embodiment of the present invention.

When the fix symbol is stopped (S116: YES), the fix symbol is fixed to the result determination area where the fix symbol is stopped (S117). For example, as shown in FIG. 49, the fix symbol 210 is maintained to be stopped in the result determination area of the symbol display area 4.

Next, if it is determined that the fix symbol 210 is not stopped in S116 (S116: NO), or after S117, the main CPU 71 subtracts 1 from the value stored in the free game play counter of the RAM 73 (S118).

The main CPU 71 then determines whether the value of the free game play counter is 0 (S119). When determining that the value on the free game play counter is not 0 (S119: NO), the main CPU 71 proceeds to S105.

In the meanwhile, when the value on the free game play counter is 0 (S119: YES), the free game process is terminated.

According to the arrangement above, because the fix symbols 210 are accumulatively stored in the result determination area through the execution of the free game plural times, a combination including the fix symbol 210 is more likely to be established. Further, although the fix symbol 210 is fixed in the result determination area, a symbol to be rearranged in the first place in the position where the fix symbol 210 is fixed, as the result of rearranging a plurality of types of symbols aligned on the plurality of video reels 3, will be regarded as a symbol forming a combination of symbols subjected to awarding of a payout.

With the above structure, the fix symbols 210 selected in the fix symbol random selection process are accumulatively fixed only in the selected WAYS BET (result determination area). This facilitates, according to the WAYS BET (result determination area) selected, formation of a combination including the one or more randomly selected fix symbols 210.

(Jackpot Game Process)

Figure 34:
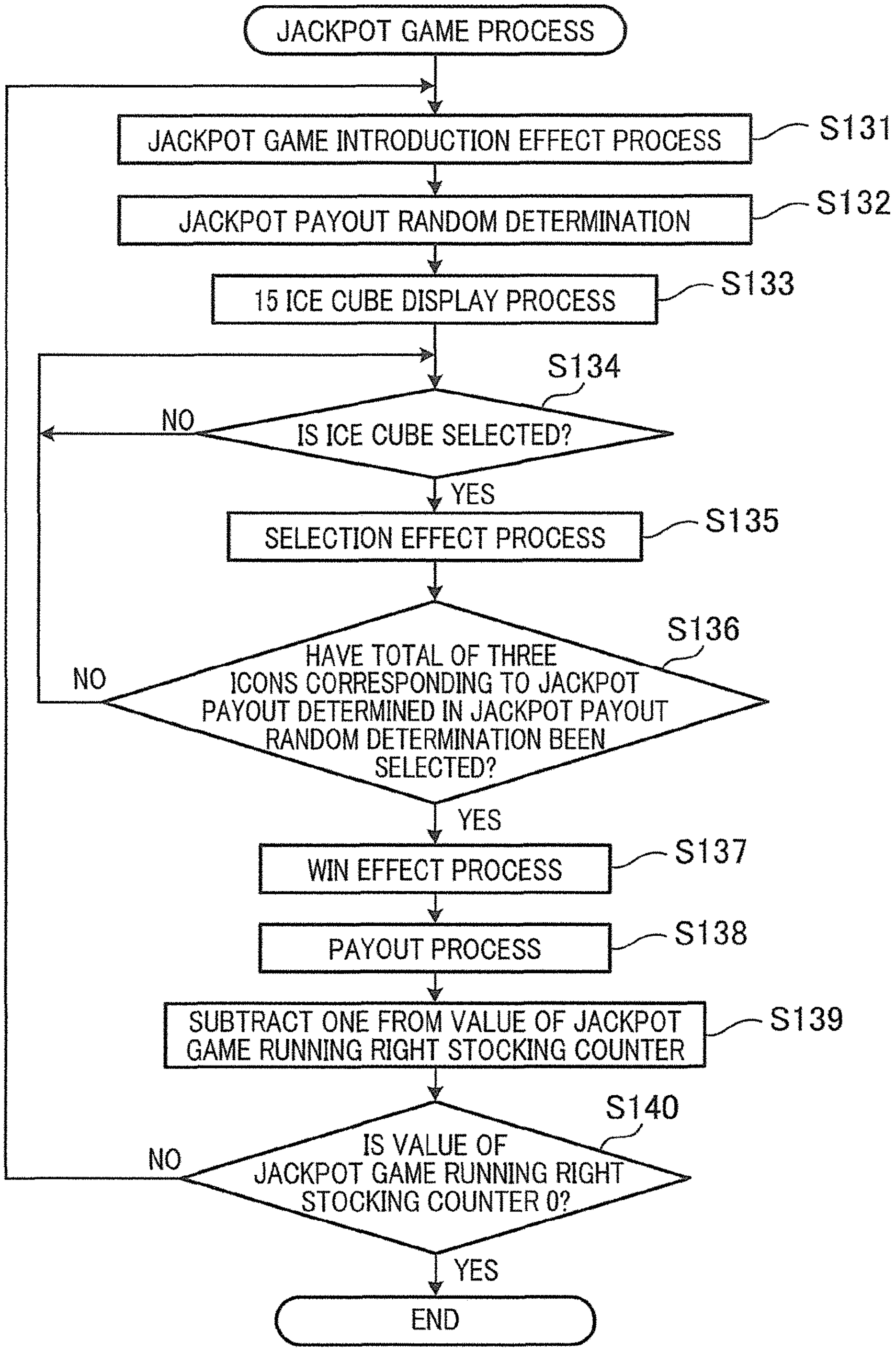
FIG. 34 is a flowchart of a jackpot game process in the slot machine of the embodiment of the present invention.

The following will describe a jackpot game process with reference to FIG. 34. In the jackpot game process, a jackpot game (equivalent to the bonus game) is executed based on the awarded right to run the jackpot game.

Figure 64:
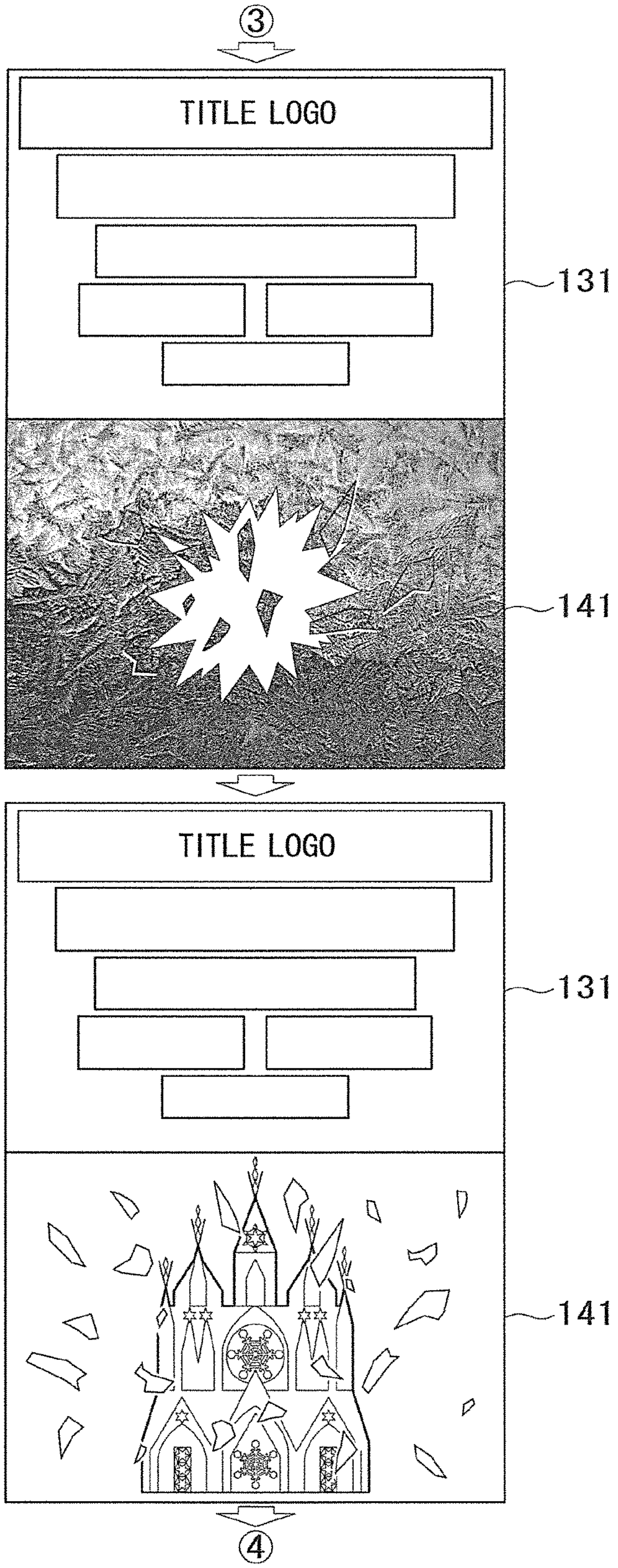
FIG. 64 is an explanatory diagram of a jackpot game introduction effect in the slot machine of the embodiment of the present invention.

To begin with, the main CPU 71 executes a jackpot game introduction effect process (S131). In this jackpot game introduction effect process, as shown in FIG. 64, an effect image of braking ice and animation of appearing an ice palace are displayed on the lower image display panel 141. Furthermore, a signboard notifying the shift to the jackpot game is displayed.

Then the main CPU 71 executes the jackpot payout random determination (S132). In this jackpot payout random determination, one of the GRAND jackpot payout, the MAJOR jackpot payout, the MINOR jackpot payout, the MINI jackpot payout, and the CREDIT AWARD is randomly selected based on the winning probabilities in the jackpot payout determination table shown in FIG. 27.

Figure 65:
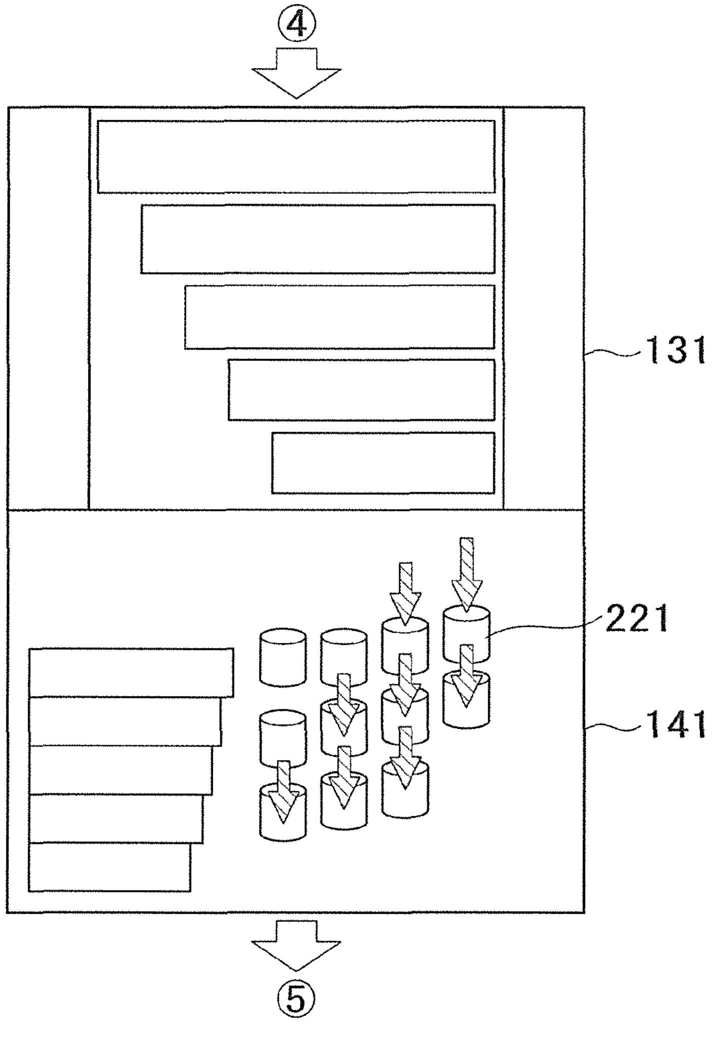
FIG. 65 is an explanatory diagram of a jackpot game introduction effect in the slot machine of the embodiment of the present invention.
Figure 66:
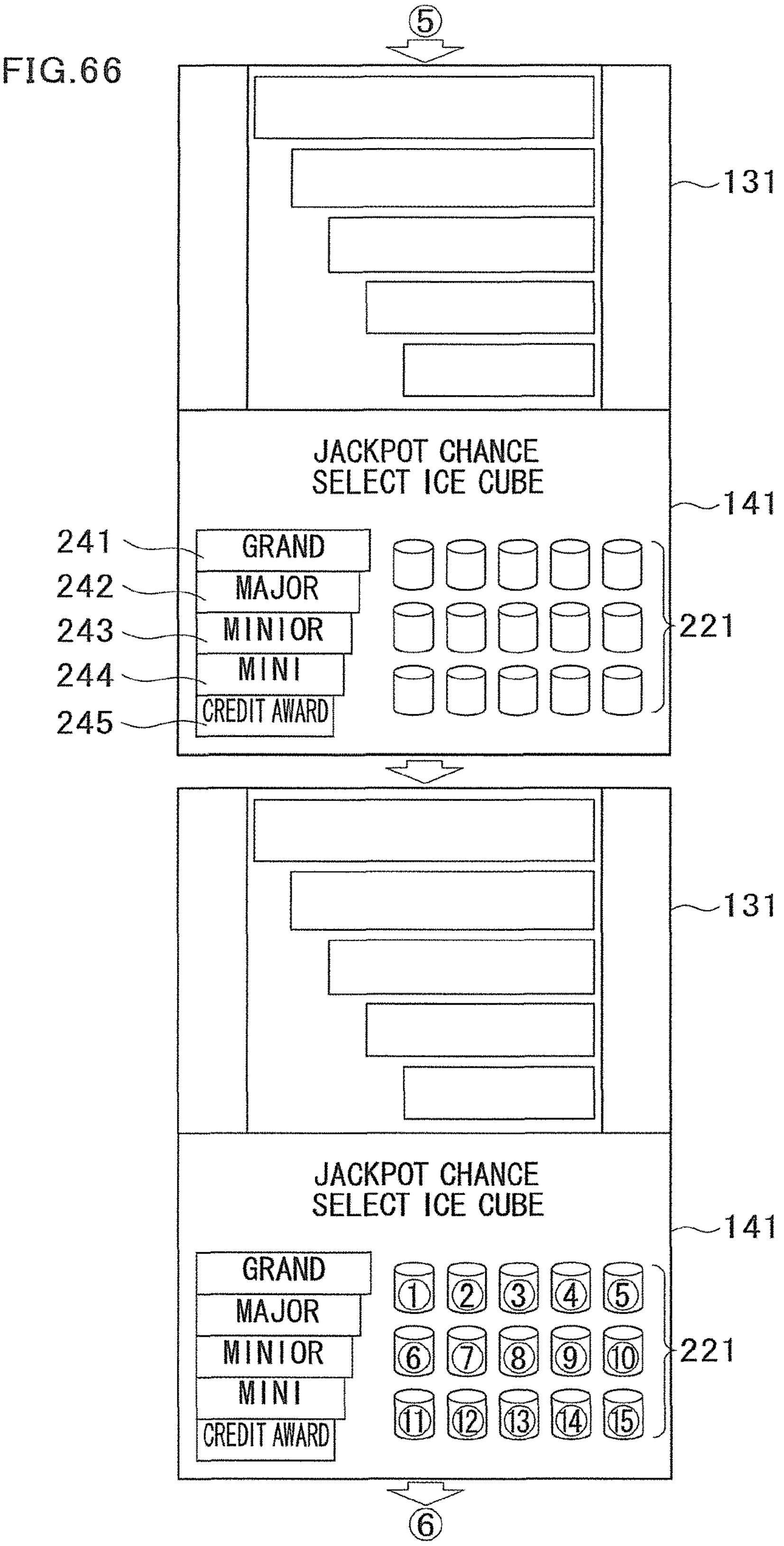
FIG. 66 is an explanatory diagram of a jackpot game introduction effect in the slot machine of the embodiment of the present invention.

The main CPU 71 then executes an ice cube display process (S133). As shown in FIG. 65 and FIG. 66, in this ice cube display process, 15 ice cubes 221 are displayed on the lower image display panel 141. Furthermore, as shown in FIG. 66, a signboard encouraging the player to select one of the ice cubes 221 is displayed on the lower image display panel 141.

Then the main CPU 71 determines which one of the 15 ice cubes 221 displayed on the lower image display panel 141 is selected (S134). If no ice cube is selected (S134: NO), an input of a selection is waited.

Figure 67:
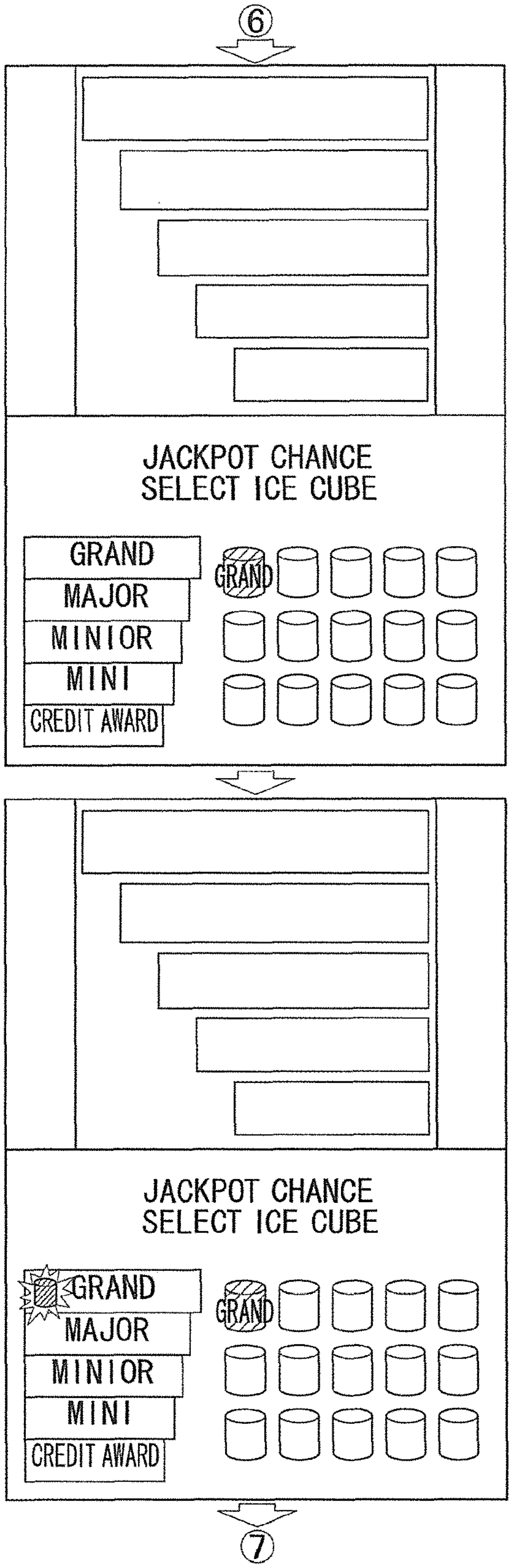
FIG. 67 is an explanatory diagram of a jackpot game introduction effect in the slot machine of the embodiment of the present invention.
Figure 68:
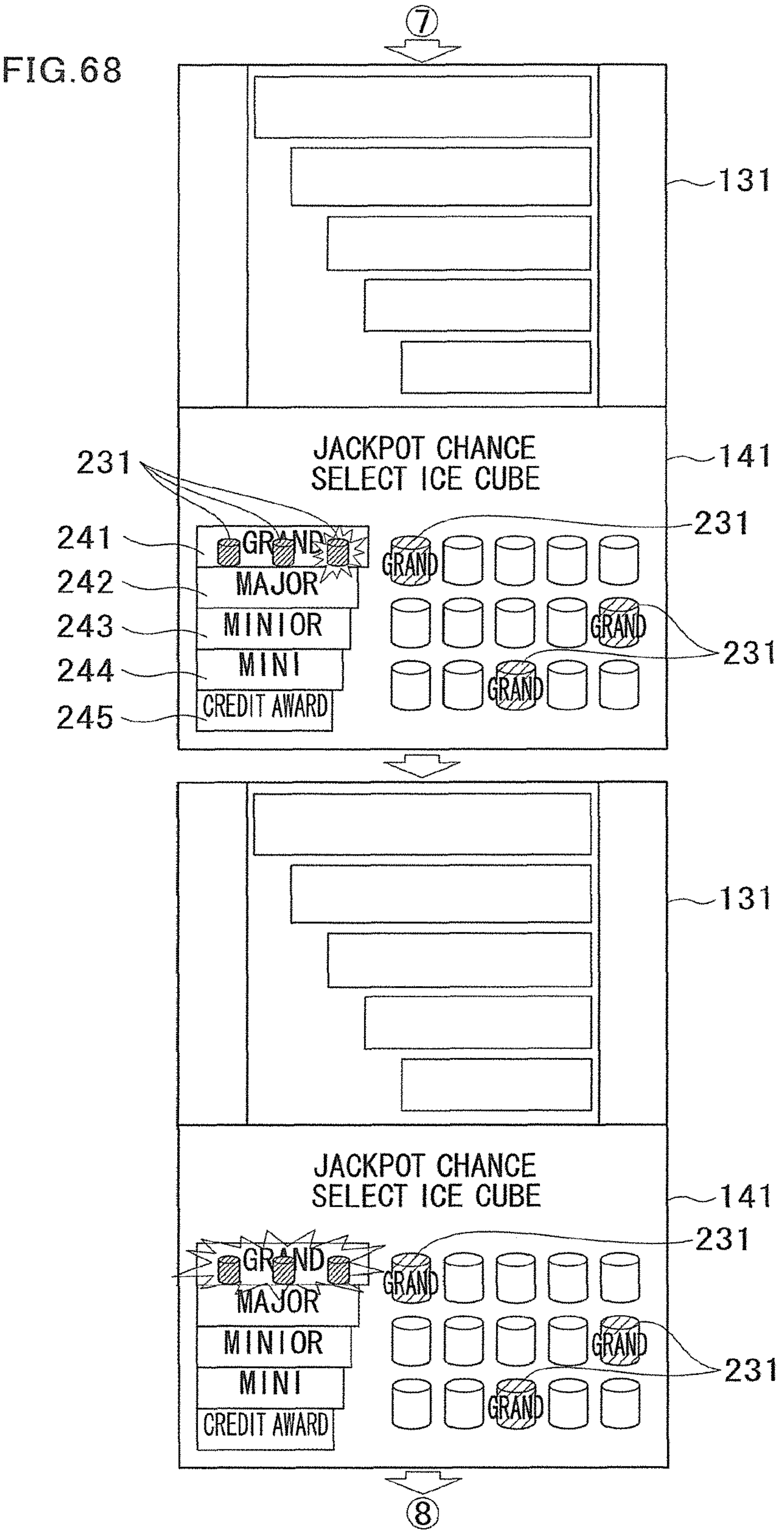
FIG. 68 is an explanatory diagram of a jackpot game introduction effect in the slot machine of the embodiment of the present invention.

When one of the 15 ice cubes 221 is selected (S134: YES), a selection effect process is executed (S135). In the selection effect process, a level icon of the jackpot payout corresponding to the selected one of the 15 ice cubes 221 is displayed. For example, as shown in FIG. 67, when the player selects the No. 1 ice cube 221, the GRAND icon 231 associated with the No. 1 ice cube 221 is displayed. Thereafter, as shown in FIG. 67, an effect of moving the displayed GRAND icon 231 to a GRAND indicator 241 is displayed. It should be noted that the same kind of level icons of the jackpot payout are accumulated up to the total of three on the corresponding one of indicators 241 to 245, as shown in FIG. 68.

The main CPU 71 then determines whether the total of three level icons of the jackpot payout corresponding to the level of the jackpot payout (the GRAND jackpot payout, the MAJOR jackpot payout, the MINOR jackpot payout, the MINI jackpot payout, and the CREDIT AWARD) determined in the jackpot payout random determination in S132 have been selected (S136). When the total of three level icons have not been selected (S136: NO), the routine goes back to S134.

The present embodiment is arranged such that three level icons of the jackpot payout corresponding to the level of the jackpot payout determined in the jackpot payout random determination appear first. Furthermore, which selection of the ice cube 221 corresponds to the appearance of the third level icon of the jackpot payout is randomly determined. For example, when the GRAND jackpot payout is selected in the jackpot payout random determination, provided that the eighth selection of the ice cube 221 corresponds to the first appearance of three GRAND icons 231 as a result of internal random determination, three GRAND icons 231 appear first by the eight selection of the ice cube 221, no matter which ice cubes 221 are selected by the player.

Figure 69:
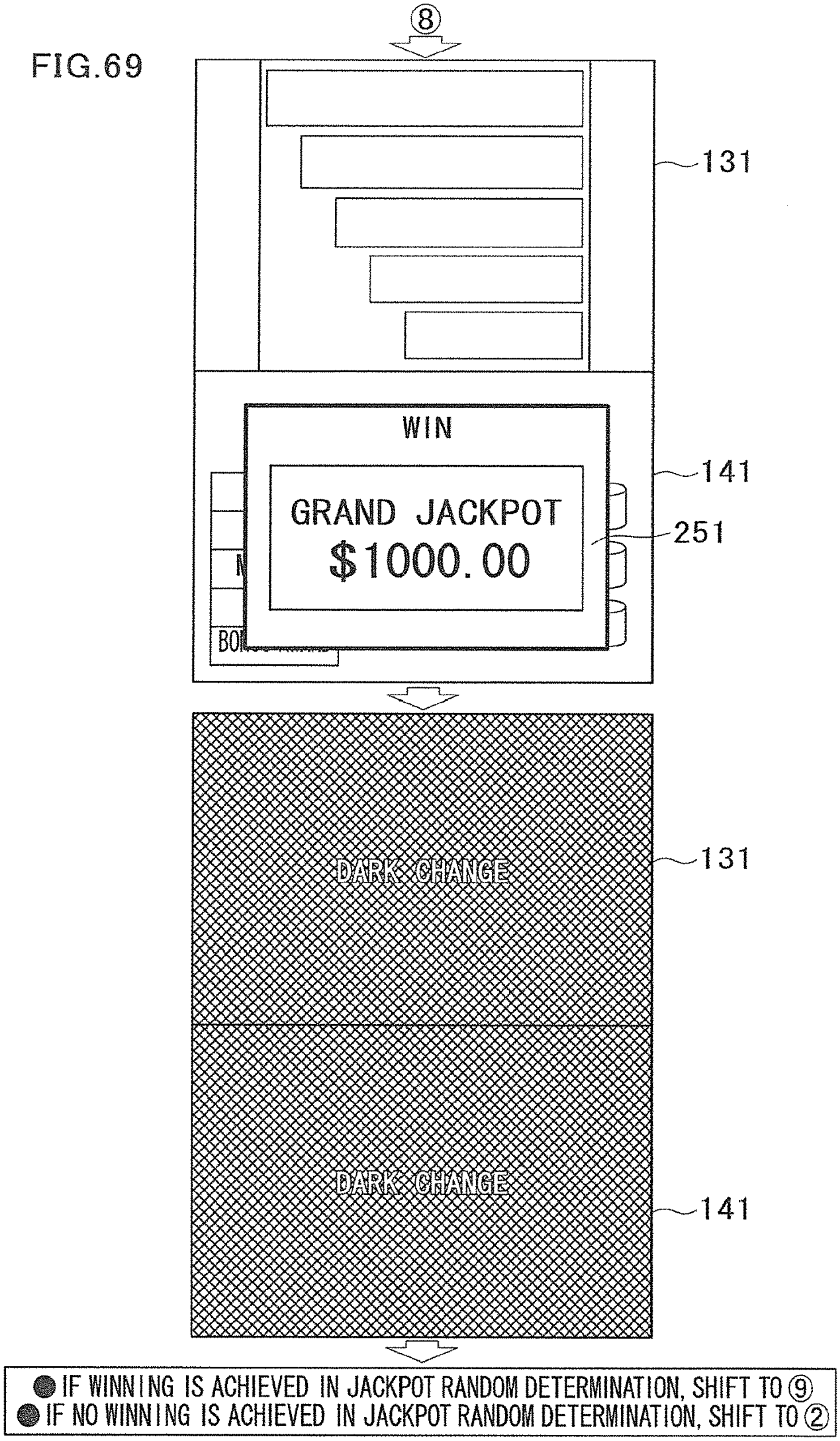
FIG. 69 is an explanatory diagram of a jackpot game introduction effect in the slot machine of the embodiment of the present invention.

When the total of three icons are selected (S136: YES), a win effect process is executed (S137). In this win effect process, the frame of one of the indicators 241 to 245 corresponding to the selected three level icons of the jackpot payout emits light to emphasize the level of the obtained jackpot payout. For example, as shown in FIG. 68, when the total of three GRAND icons 231 are selected, the frame of the GRAND indicator 241 emits light to emphasize that the GRAND jackpot payout is obtained. Then, as shown in FIG. 69, the win signboard 251 is displayed on the lower image display panel 141.

The main CPU 71 then executes a payout process (S138). In this payout process, the jackpot payout determined in S132 is awarded based on the resource of each jackpot payout stored in a jackpot storage area (bonus storage area) of the RAM 73. For example, when the GRAND jackpot payout is obtained, all credits accumulated in the resource of the GRAND jackpot payout are paid out. In other words, the value of the credits accumulated in the resource of the GRAND jackpot payout in the RAM 73 is added to the value of the credit counter in the RAM 73.

The main CPU 71 then subtracts 1 from the jackpot game running right stocking counter in the running right stocking area of the RAM 73 (S139).

The main CPU 71 then determines whether the value of the jackpot game running right stocking counter stored in the running right stocking area of the RAM 73 is 0 (S140).

When the value of the jackpot game running right stocking counter is not 0 (S140: NO), the routine proceeds to S131. In the meanwhile, when the value of the jackpot game running right stocking counter is 0 (S140: YES), the process is terminated.

According to the arrangement above, when the free game trigger is established in the normal game, the jackpot random determination is executed for a number of times corresponding to the number of the FEATURE symbols rearranged in the symbol display area 4, each time the free game is executed, and the right to run the jackpot game obtained as a result of the jackpot random determination is stocked in the running right stocking area. After the execution of the free game for the awarded number of times ends, the jackpot game is successively executed for the number of times stocked in the running right stocking area.

On this account, the player recognizes that the jackpot random determination is executed each time the FEATURE symbol is displayed in the symbol display area 4 during the free game period in which the free game is executed for the awarded number of times, but the result of the jackpot random determination is unknown until the execution of the free game for the awarded number of times ends. This makes it possible to maintain, during the free game period, the player's expectation on the jackpot game executed for a number of times which is proportional to the number of FEATURE symbols displayed in the symbol display area 4.

In addition to the above, a part of credits betted to execute the normal game is accumulatively stored in the jackpot storage area of the RAM 73, and in the jackpot game, random determination is executed based on the jackpot payout determination table to determine the payout amount based on the accumulatively-stored resource. This makes it possible to maintain, during the free game period, the player's expectation on the jackpot game executed for a number of times proportional to the number of FEATURE symbols displayed in the symbol display area 4, i.e., the jackpot game with which a payout based on the accumulatively-stored resource may be awarded.

[Screen Display Specification]

Now, the screen display specification of the slot machine 1 will be described with reference to FIG. 35 and FIG. 36.

<Screen Display Specification in Normal State>

To begin with, screen display specification in the normal game will be described with reference to FIG. 35.

Figure 35:
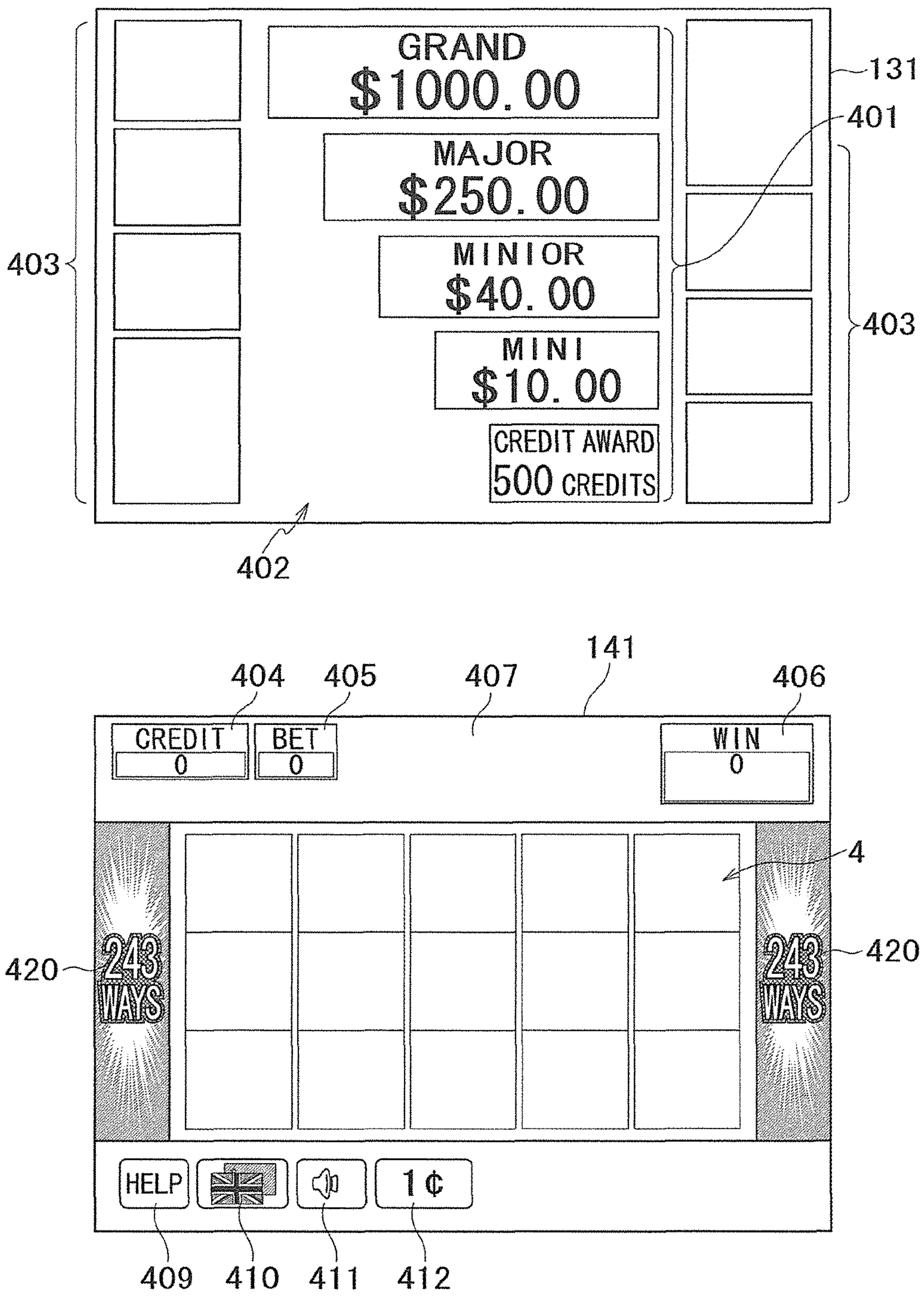
FIG. 35 shows the screen display specification in the normal game in the slot machine related to the embodiment of the present invention.

As shown in FIG. 35, the upper image display panel 131 in the normal game is provided with a jackpot payout display area 401, an image area 402, and an information area 403. In the jackpot payout display area 401, the current amount of the jackpot payout of each level (the GRAND jackpot payout, the MAJOR jackpot payout, the MINOR jackpot payout, the MINI jackpot payout, and the payout of the CREDIT AWARD) is displayed. In the image area 402 is displayed a main image of the game. In the information area 403 are displayed a simple explanation of game rules and payout amount and the like in relation to the symbols.

On the lower image display panel 141 in the normal game, in addition to the above-described symbol display area 4, a credit meter 404, a bet meter 405, a win meter 406, a display area 407 for WAYS BET information, bet information and the game state, a help touch button 409, a language switching touch button 410, a sound volume switching touch button 411, and a denomination indicator 412 are provided. In the credit meter 404 is displayed a remaining credit amount. The default value is 0. In other words, a credit amount stored in the RAM 73 is displayed. The bet meter 405 displays the total bet amount of the current game (or the final game). The win meter 406 displays the total credit amount of win and the detail of the win.

The display area 407 for the WAYS BET information, bet information and the game state displays the WAYS BET information and the bet information of the currently played game (or the final play of the game). Specifically, the area displays which type of the 5 staged WAYS BET (i.e., WAYS BET1, WAYS BET2, WAYS BET3, WAYS BET4, and WAYS BET5) is currently selected. Further, the display area 407 displays the state of the currently played game. The area is hidden while the current play of the game is played. When the current game state is game over, "GAME OVER" is displayed. When the current game state is waiting for gamble, "PLAY ON, GAMBLE or TAKE WIN" is displayed.

When the player touches the help touch button 409, the first page of the HELP screen is displayed on the lower image display panel 141. The help touch button 409 is darkened when it is inactive, e.g., during the rotation of the video reels 3.

As the language switching touch button 410 is touched by the player, the language is switched to English or Chinese. The language switching touch button 410 is activated only during the advertisement, and is darkened when it is inactive, e.g., during the rotation of the video reels 3. Furthermore, on the language switching touch button 410, the displayed national flags are changed to "U.K./China" or "U.S.A./China" in accordance with the setting of the AUDIT. When the language switching is set at "DISABLE", the language switching touch button 410 is changed to a paytable button with which a payout table is displayed on the HELP screen.

The sound volume switching touch button 411 is used for switching the game sound volume in three stages. Each time the sound volume switching touch button 411 is touched by the player, the game sound volume is switched such that, for example, from low to middle to high to small to middle. The denomination indicator 412 displays current denomination.

<HELP Screen Display Specification>

Figure 36:
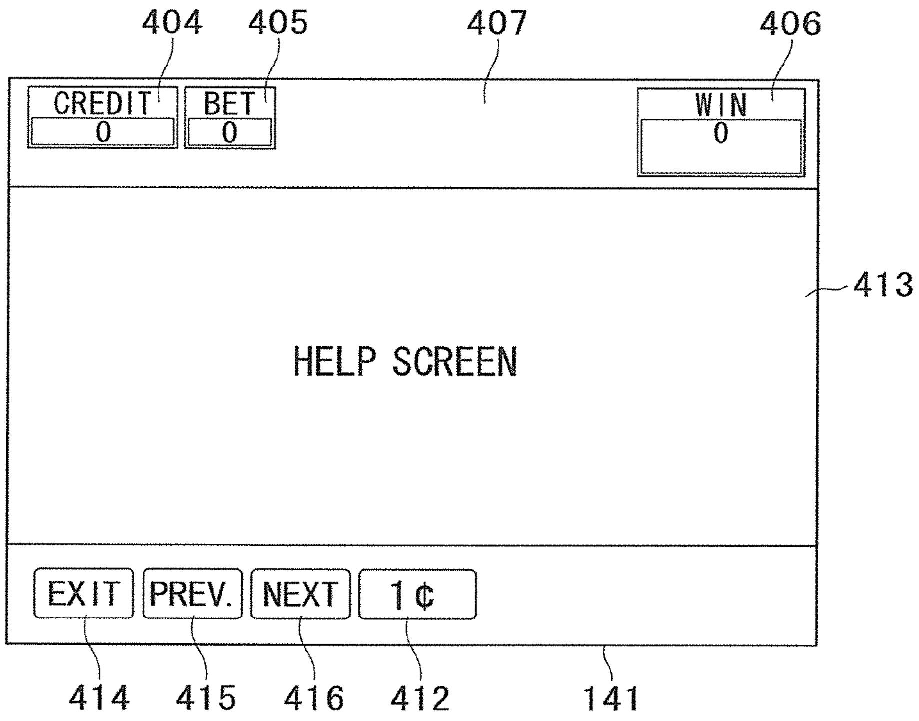
FIG. 36 shows HELP screen display specification on the slot machine of the embodiment of the present invention in the normal state.

Next, the following describes HELP screen display specification, with reference to FIG. 36.

As the lower image display panel 141 shown in FIG. 36, the HELP screen display specification is such that: the credit meter 404, the bet meter 405, the win meter 406, the display area 407 for the WAYS BET information, bet information, and the game state are displayed. Further, the lower image display panel 141, while ensuring the HELP screen 413, displays an exit touch button 414, a PREV, touch button 415, a NEXT touch button 416, and a denomination indicator 412.

When the player touches the exit touch button 414, the HELP screen 413 disappears from the lower image display panel 141 and a normal game screen (see FIG. 23) comes back. When the player touches the PREV, touch button 415, the directly preceding page is displayed on the HELP screen 413. When the player touches the NEXT touch button 416, the next page is displayed on the HELP screen 413.

<Screen Display Specification in Free Game>

Figure 37:
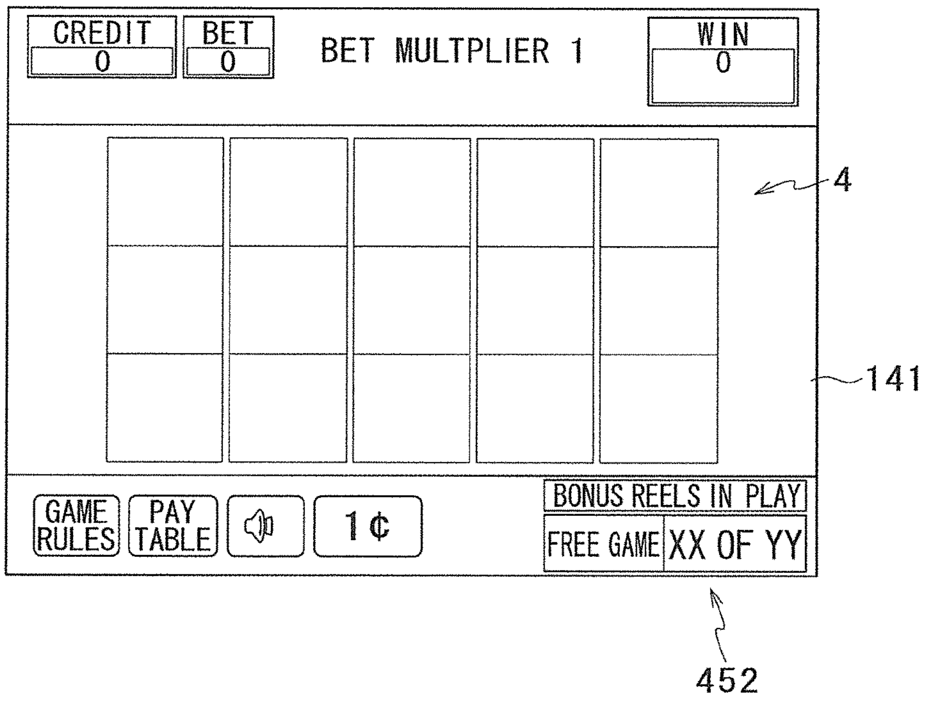
FIG. 37 shows the screen display specification in the free game in the slot machine related to the embodiment of the present invention.

Now, screen display specification in the free game will be described with reference to FIG. 37. As shown in FIG. 37, in the free game, a free game counter 452 is displayed at a lower right part of the lower image display panel 141. The free game counter 452 displays the current number of times of execution of the free game as compared to the total number of times of execution of the free game awarded. For example, when the total number of times of execution of the free game awarded is five and the current execution of the free game is the second time, the free game counter 452 displays "2 OF 5". Furthermore, the free game counter 452 displays a message "FREE GAME" to indicate that the free game is currently executed. In addition to this, a message "BONUS REELS IN PLAY" is also displayed to indicate that the bonus reel is being played.

[Win Effect]

Now, a win effect in the slot machine 1 will be described with reference to FIG. 38 to FIG. 42.

The win effect is an effect executed when winning is achieved in the normal game or the free game. In other words, the effect is executed when symbols stopped in the result determination area subjected to result determination by WAYS BET forms a combination of a predetermined number of symbols which are linked within the first column area to the fifth column area in the symbol display area 4, the combination matching with a symbol combination on a symbol combination table (see FIG. 20).

<Flow of Win Effect>

Figure 38:
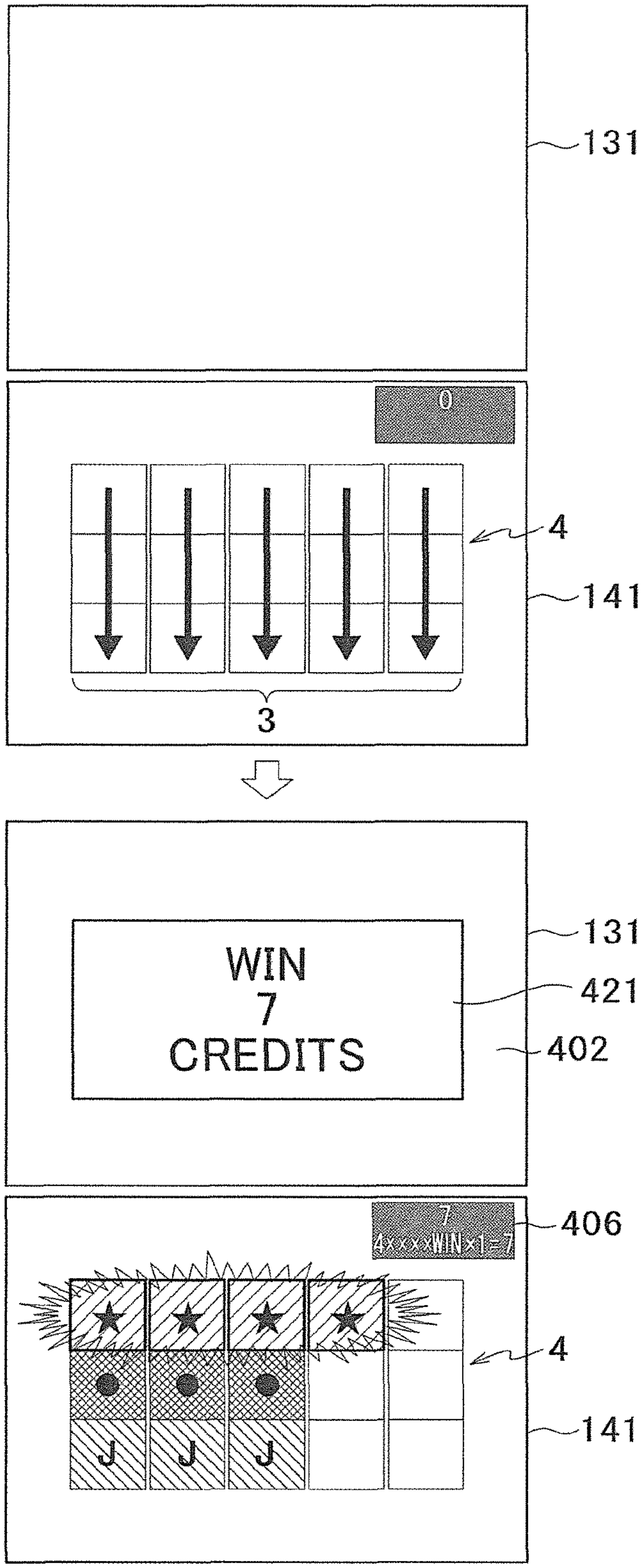
FIG. 38 shows the flow of a win effect of the slot machine related to the embodiment of the present invention.

To begin with, as shown in FIG. 38, all video reels 3 in the symbol display area 4 on the lower image display panel 141 stop. When all video reels 3 stop, as shown in FIG. 38, a gold signboard 421 is displayed in the image area 402 of the upper image display panel 131. In the gold signboard 421, an obtained credit is displayed in an increment manner. The increment display of the obtained credit on the gold signboard 421 is linked to the image display on the win meter 406 of the lower image display panel 141.

On the lower image display panel 141, the win effect is performed for the achieved win. The win effect is provided when the feature symbol occurs to three or more consecutive positions through the first column area to the fifth column area, followed by a win effect associated with a winning related to the other symbols are executed. In this regard, for symbols for each of which a win animation is prepared, an animation effect is carried out. The symbols which do not relate to any winning are darkened to be less noticeable.

Figure 39:
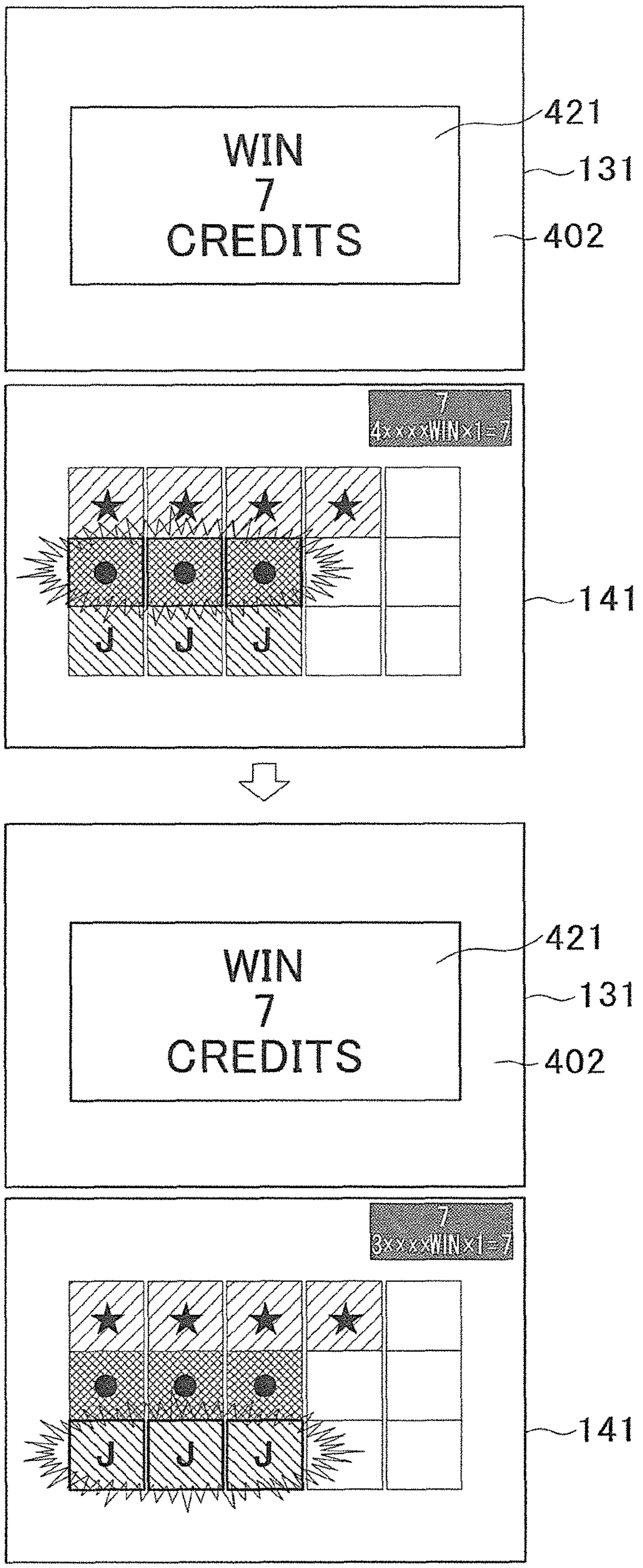
FIG. 39 shows the flow of a win effect of the slot machine related to the embodiment of the present invention.

For example, as shown in FIG. 38, a win effect is provided (light is turned on) for star symbols. Subsequently, as shown in FIG. 39, on the gold signboard 421 displayed on the image area 402 of the upper image display panel 131, the increment display of the obtained credit is continued. On the lower image display panel 141, the display of the win effect proceeds to next. In this case, the display of the win effect proceeds from the star symbols to the black circle symbols. When win animations are prepared for both the star symbols and black circle symbols, animation effects are performed. In the meanwhile, the "J" symbols are kept in the stop state because the time to display the win effect has not come and no win animation is prepared therefor. In this case, the display of the win effect (turning on of the lights) proceeds from the black circle symbols to the J symbols, as shown in FIG. 39.

Figure 40:
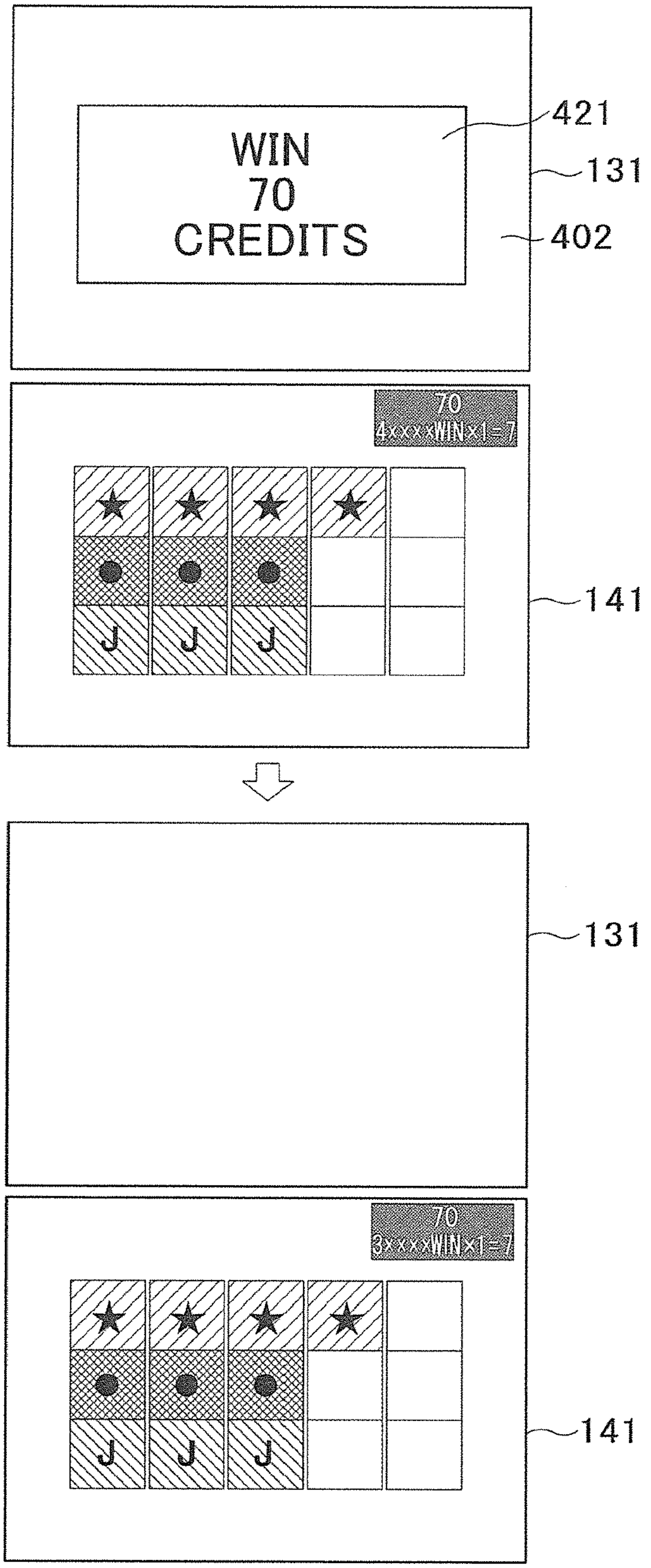
FIG. 40 shows the flow of a win effect of the slot machine related to the embodiment of the present invention.

Subsequently, as shown in FIG. 40, the total win is displayed on the gold signboard 421 displayed in the image area 402 of the upper image display panel 131. The increment display of the obtained credit is terminated. On the lower image display panel 141, as all of the winning symbols are displayed for once, the gold signboard 421 is hidden, and the symbols are displayed in a looped manner in a descending order of the payout, as shown in FIG. 40.

Figure 41:
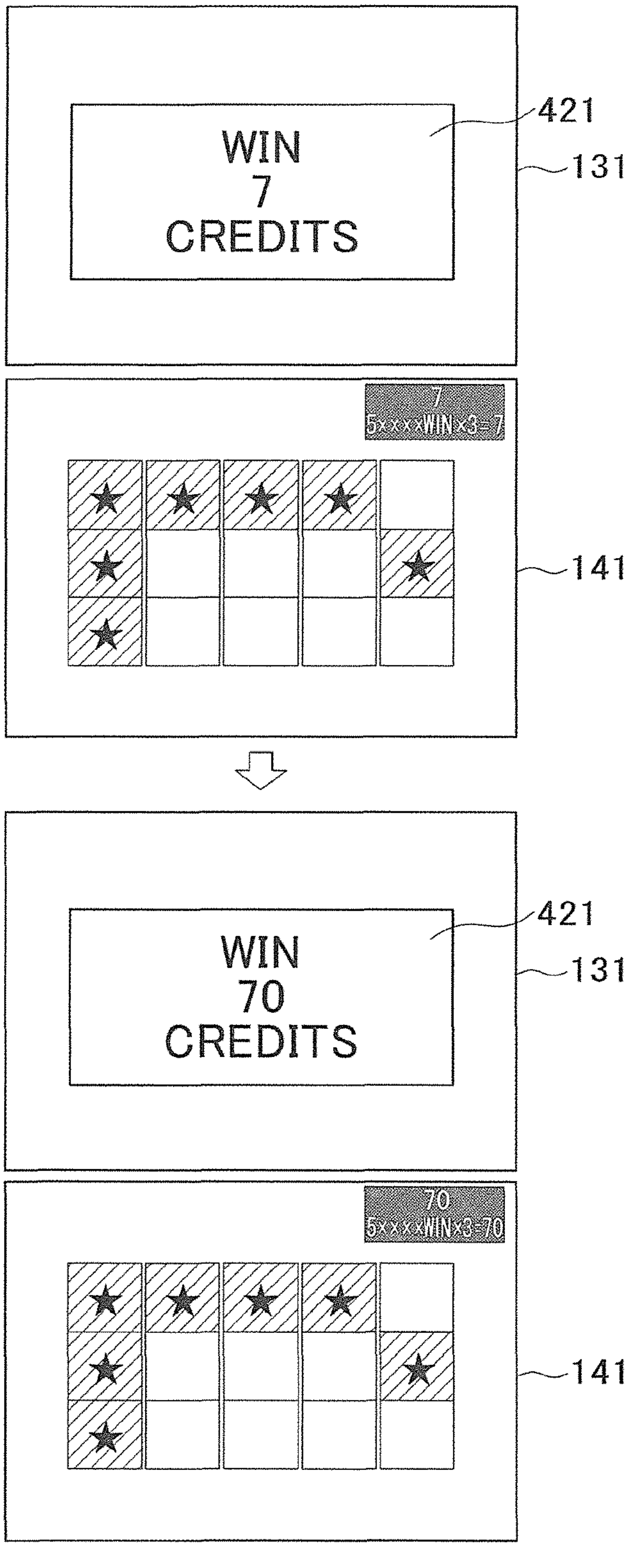
FIG. 41 shows the flow of a win effect of the slot machine related to the embodiment of the present invention.
Figure 42:
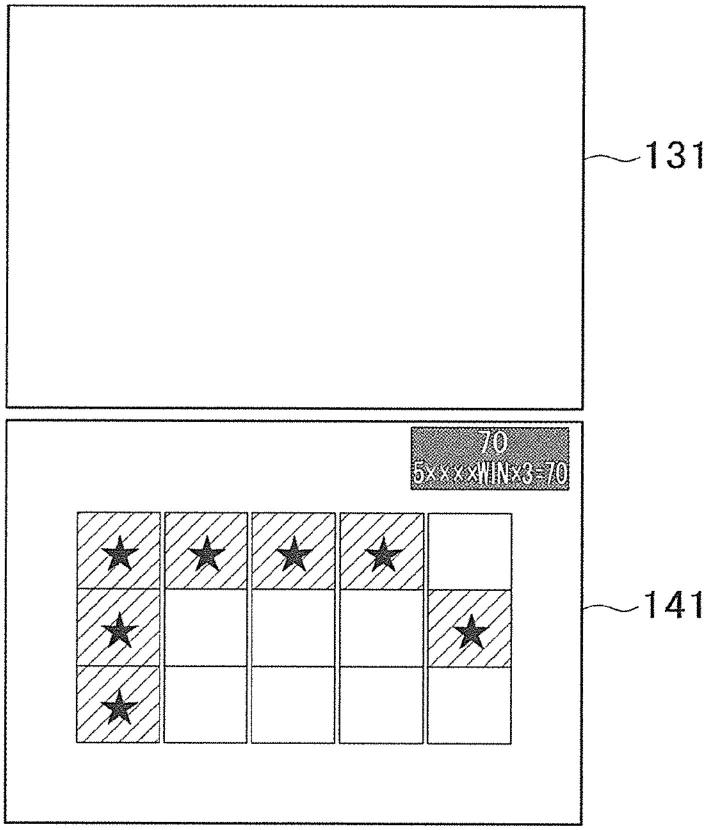
FIG. 42 shows the flow of a win effect of the slot machine related to the embodiment of the present invention.

When symbols of one kind successively appear, as shown in FIG. 41 and FIG. 42, animation effect is performed for all of the symbols. The symbols which do not relate to any winning are darkened to be less noticeable.

<Win Signboard>

Now, the win signboard will be described with reference to FIG. 43.

Figure 43:
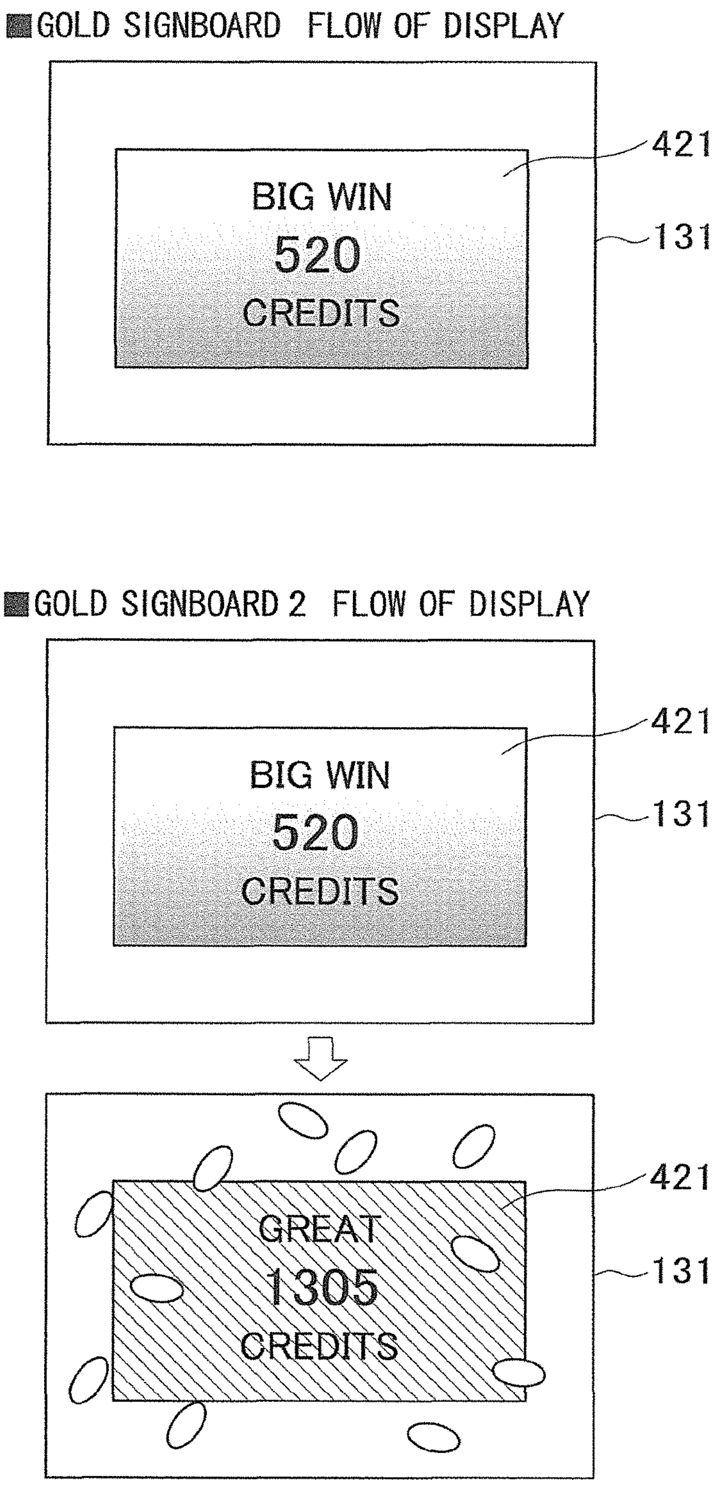
FIG. 43 shows a gold signboard of the slot machine of the embodiment of the present invention.

The gold signboard 421 shown in the upper stage of FIG. 43 is displayed on the upper image display panel 131 when the total win amount in the current play of the game is less than 30 times as much as the bet amount.

On the other hand, when the increment amount becomes more than 30 times as much as the bet amount, the gold signboard 421 shown in the upper image display panel 131 is changed to a gold signboard 421 shown in the lower stage of FIG. 43, with an effect of falling coins (see the gold signboard 2 in FIG. 43). In other words, on the upper image display panel 131, the effect of falling coins is performed after the display of the the gold signboard 421. Subsequently, in sync with the increment display on the win meter 406, the obtained credit is incremented with the gold signboard 421.

<Effect Sound when Three or More "FEATURE" Symbols Appear>

Figure 44:
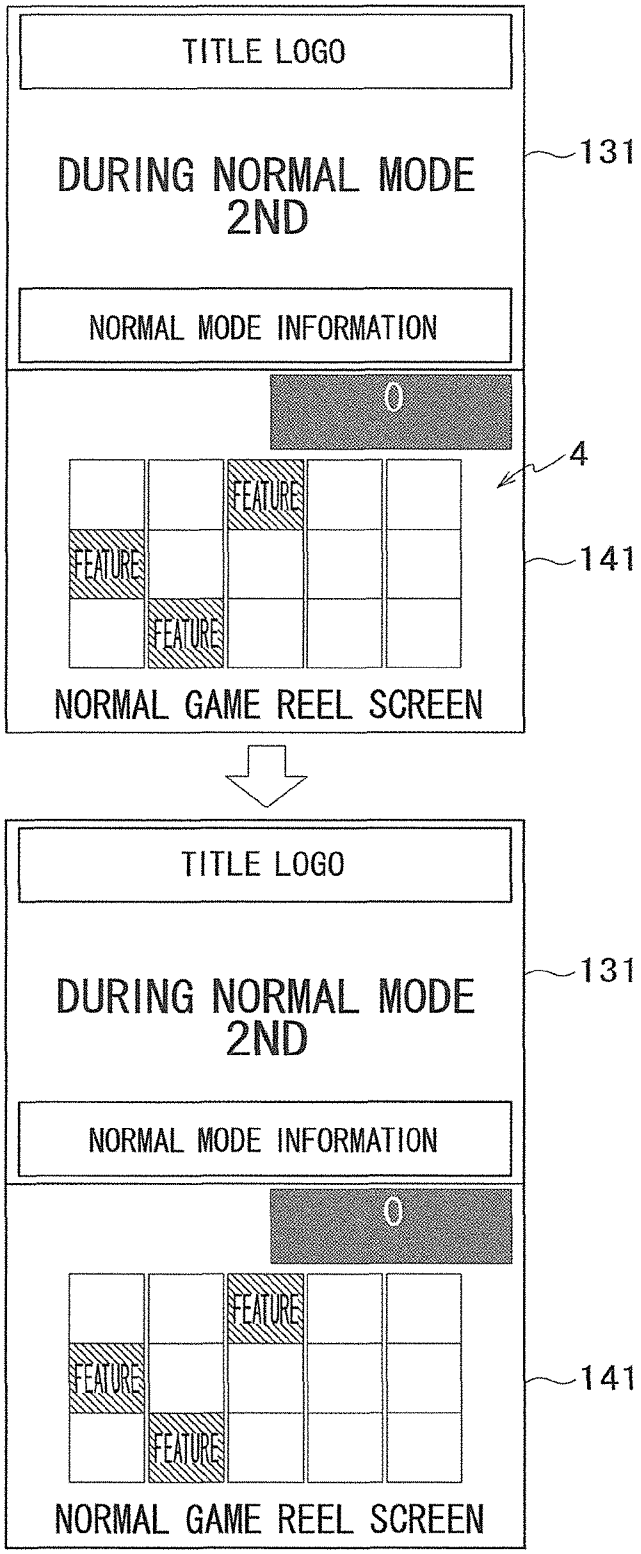
FIG. 44 explains an effect sound output when three feature symbols appear on the slot machine related to the embodiment of the present invention.
Figure 45:
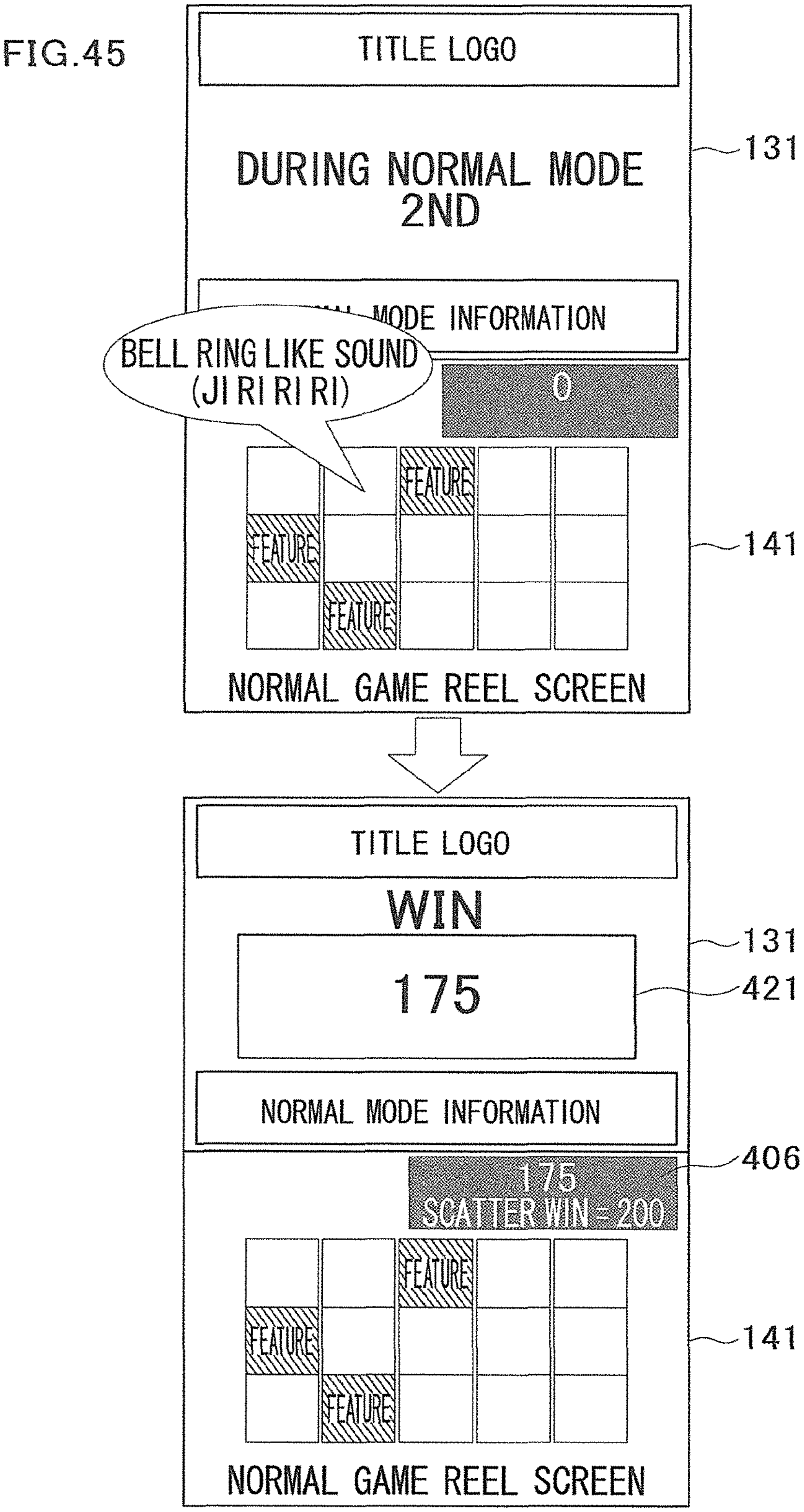
FIG. 45 explains an effect sound output when three feature symbols appear on the slot machine related to the embodiment of the present invention.

Now, effect sound when three or more "FEATURE" symbols appear will be described with reference to FIG. 44 and FIG. 45. FIG. 44 and FIG. 45 show the effect sound of the slot machine of the embodiment of the present invention when three or more "FEATURE" symbols appear.

When three or more "FEATURE" symbols appear in the symbol display area 4, dedicated "Jilililili" sound (bell-ring like sound) is reproduced as a sound effect. The sound reproduction starts when all reels stop, and lasts three seconds until the increment starts after 30 frames elapse. During the reproduction of the bleep sound, the symbol animation, the display of the LINE WIN, and the increment display are not performed.

According to the embodiment of the present invention, as shown in FIG. 44, in the symbol display area 4 on the lower image display panel 141, a waiting time as long as 30 frames starts when three or more "FEATURE" symbols appear in the symbol display area 4 at the time of the stop of all reels. After the waiting time as long as 30 frames, as shown in FIG. 45, the "jilililili" sound indicated by a balloon 441 is reproduced for three seconds as the effect sound when three or more "FEATURE" symbols appear.

After the three seconds, as shown in FIG. 45, the effect of WIN starts in the symbol display area 4 on the lower image display panel 141, and the symbol animation starts. Furthermore, the gold signboard 421 is displayed in the image area 402 of the upper image display panel 131. On the gold signboard 421, the increment display starts. Simultaneously, the increment display starts on the win meter 406 of the lower image display panel 141. Furthermore, the reproduction of increment sound starts. Then the processing shifts to the above-described flow of the win effect.

[Jackpot Payout Obtaining Effect]

Figure 46:
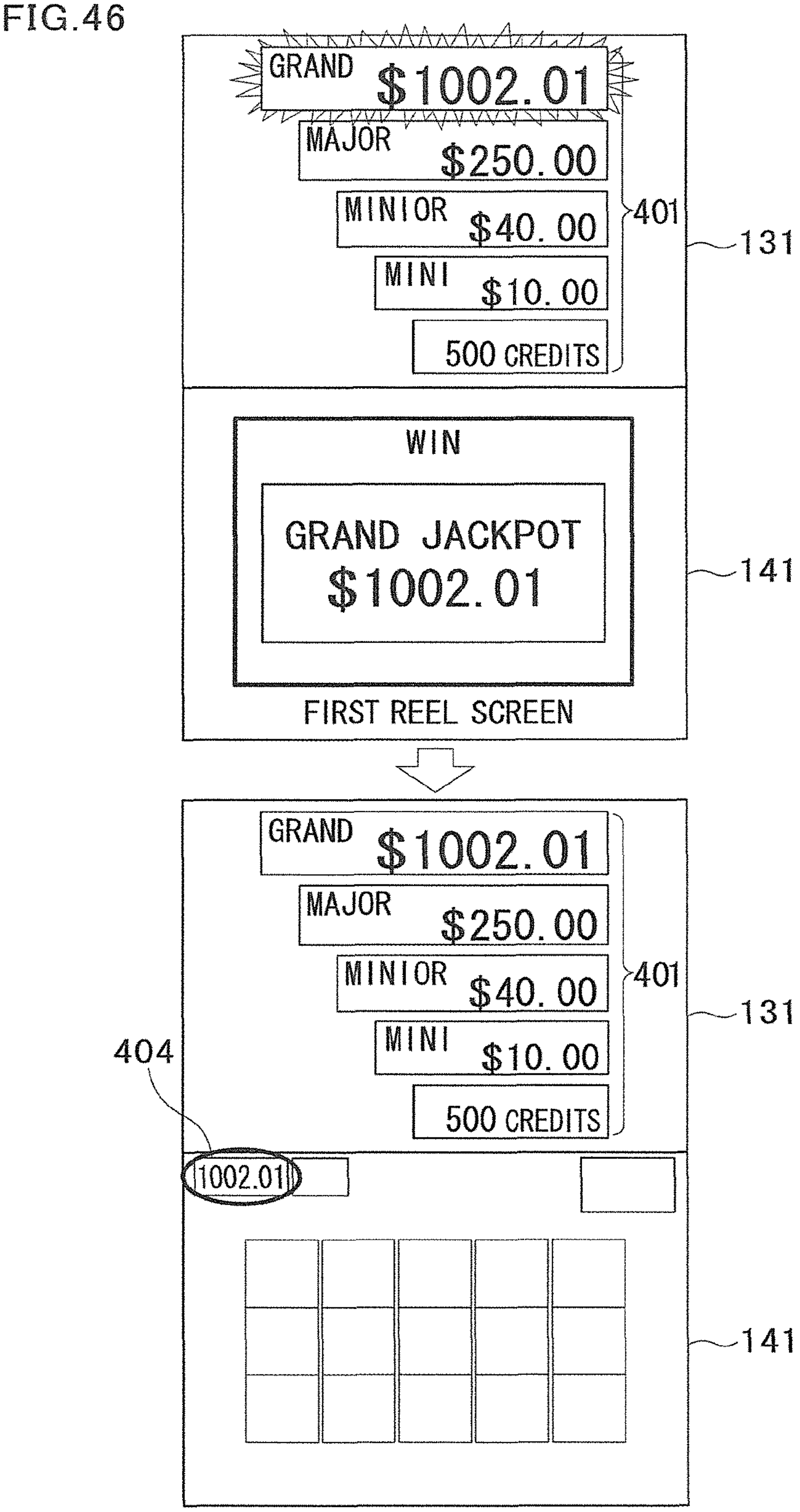
FIG. 46 shows an effect executed when a jackpot payout is obtained in the embodiment of the present invention.

Now, an effect executed when a jackpot payout is obtained will be described with reference to FIG. 46.

When a jackpot payout is obtained in the jackpot game, a jackpot payout item corresponding to the obtained level blinks in the jackpot payout display area 401 of the upper image display panel 131. For example, when the GRAND jackpot payout is obtained, the GRAND jackpot payout item blinks as shown in FIG. 46. Furthermore, as shown in FIG. 46, the awarded jackpot payout amount is displayed on the lower image display panel 141. The awarded jackpot payout amount is added to the credit meter 404. The awarded payout amount in the jackpot payout item in the jackpot payout display area 401 is then initialized.

[Free Game Introduction Effect]

Now, referring to FIG. 47 to FIG. 49, an effect at the time of making a transition to the free game of the slot machine 1 will be described.

Figure 47:
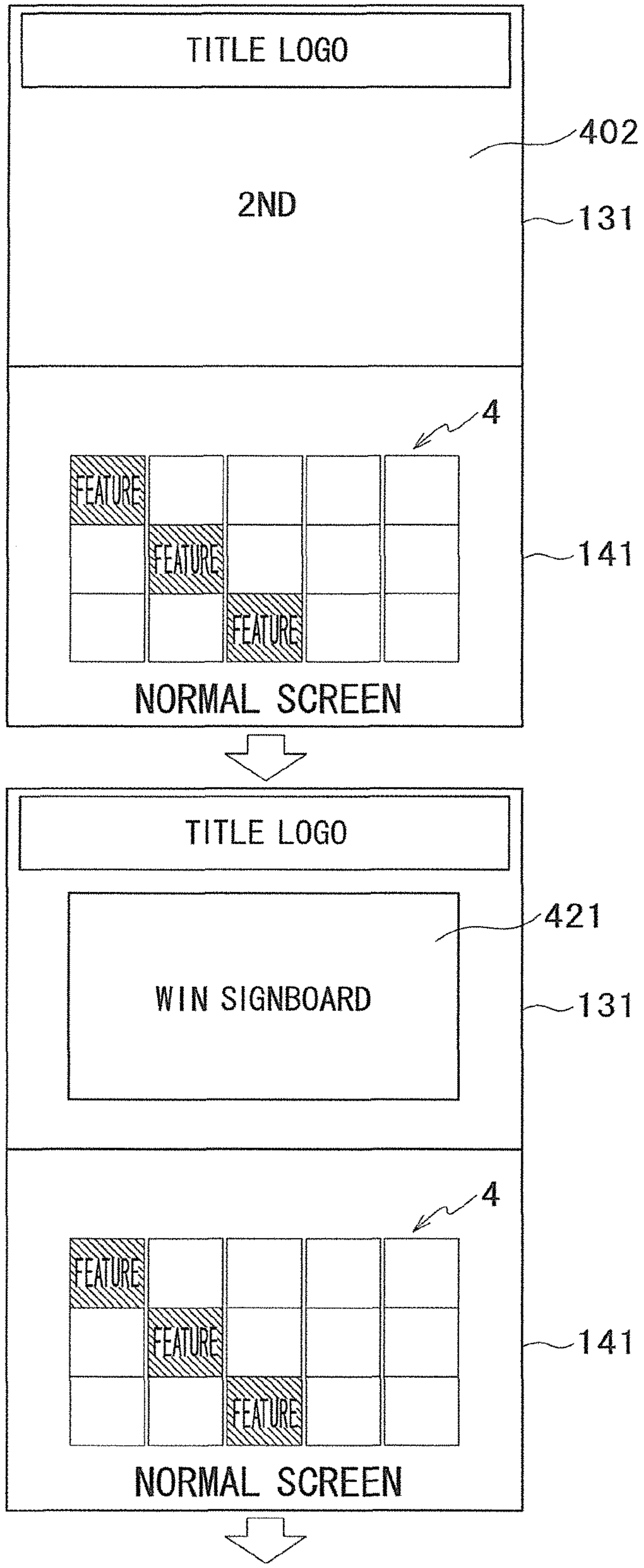
FIG. 47 shows a free game introduction effect in the slot machine related to the embodiment of the present invention.

As shown in FIG. 47, when three or more "FEATURE" symbols appear in the symbol display area 4 on the lower image display panel 141, as described above, the "jilililili" sound (bell-ring like sound) which is effect sound is reproduced. Subsequently, as shown in FIG. 47, the gold signboard 421 is displayed in the image area 402 of the upper image display panel 131.

Then the effect executed in the above-described fix symbol and number of times of execution of free game selection process in S101 is displayed on the lower image display panel 141. Specifically, in the fix symbol and number of times of execution of free game selection process, as shown in FIG. 48, five icons 310 (a GOURD icon 311, a TURTLE icon 312, a FISH icon 313, a DRAGON icon 314, and a MAN icon 315) corresponding to the five types of symbol pictures are displayed on the lower image display panel 141. These five icons 310 are associated with the types of fix symbols indicating that symbols having stopped in the symbol display area 4 during the free game are fixed one by one in the symbol display area 4 and are associated with the number of times of execution of the free game. Then, on the lower image display panel 141, the following messages are displayed for the player: "Select one of icons 310." "During free game, when a selected symbol appears, the symbol is fixed until the end of the free game." When the player picks an icon 310 out of those displayed on the lower image display panel 141 through the touch panel 114, the symbol associated with the selected icon 310 is lighted to make it noticeable as a fix symbol 210, as shown in FIG. 48. It should be noted that symbols associated with the non-selected icons 310 are darkened and displayed in gray. Then, as shown in FIG. 49, the number of execution of the free game (5 FREE GAMES) is indicated on the lower image display panel 141 as shown in FIG. 49, and an operation of the spin button 49 is waited with displaying of a message "PRESS THE BUTTON".

[Fix Effect of Fix Symbol in Free Game]

Figure 50:
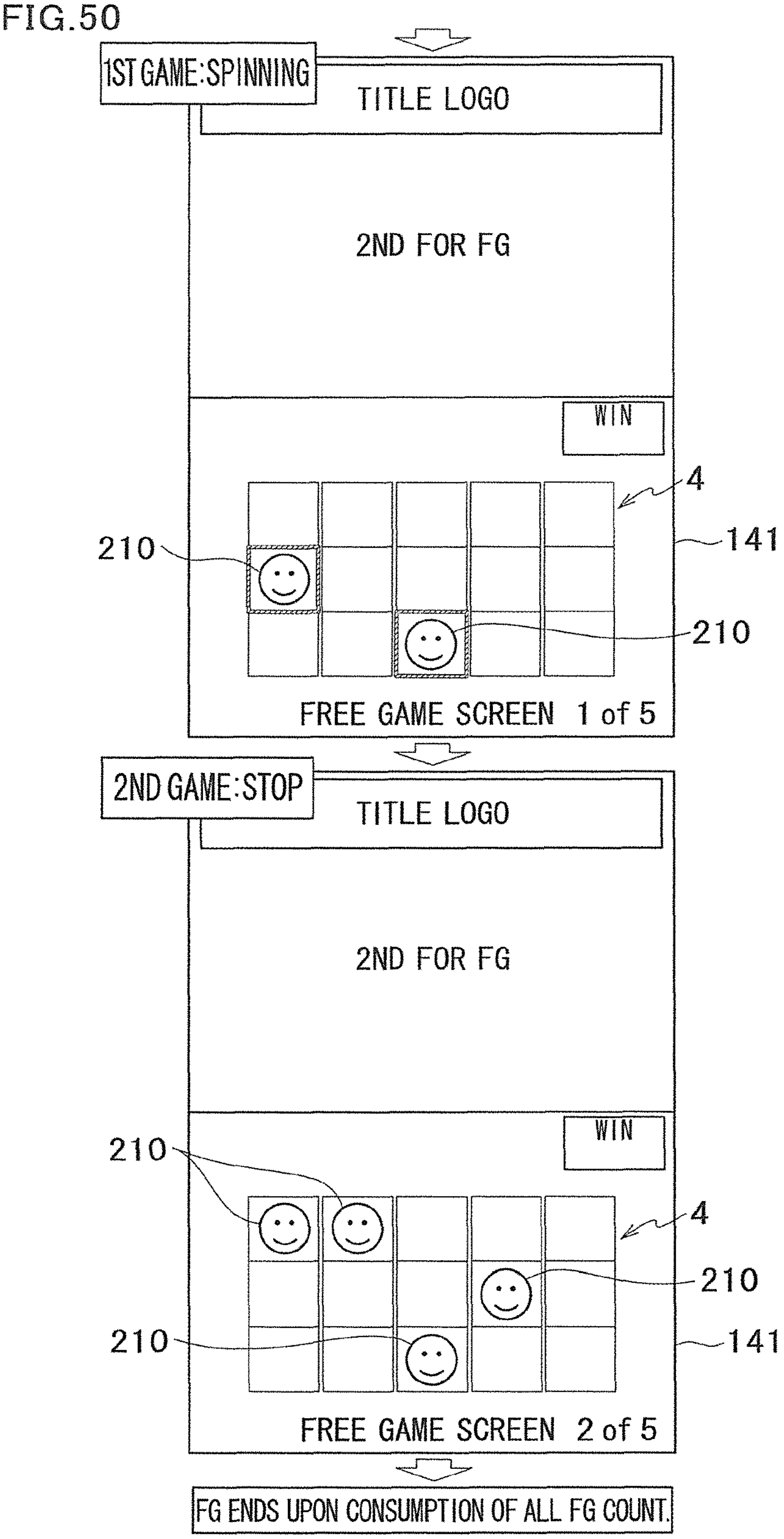
FIG. 50 shows a symbol fix effect for fix symbols during the free game, in the slot machine related to the embodiment of the present invention.

Now, referring to FIG. 49 to FIG. 50, a fix effect of a fix symbol 210 in the free game of the slot machine 1 will be described.

As shown in FIG. 49, a fix symbol 210 is selected through the above-described fix symbol and number of times of execution of free game selection process of the S101 and the free game is started. In the free game, the video reels 3 are scroll displayed, and during the scroll, the fix symbol 210 is given an effect so it is easily visible (see FIG. 49). After that, as shown in FIG. 50, symbols are rearranged in the symbol display area 4. In this case, when a fix symbol 210 is stopped in the result determination area activated by a WAYS BET button, the fix symbol 210 is fixed in that result determination area until the free game ends. Then, while the fix symbol 210 is fixed in the result determination area where it is stopped, the subsequent play of the free game is run, and symbols are rearranged in the symbol display area 4. In this case, when another fix symbol 210 is stopped as shown in FIG. 50, that other fix symbol 210 is further fixed in that result determination area until the free game ends. As described, when a fix symbol 210 is stopped in the result determination area activated by WAYS BET, another fix symbol 210 may be accumulatively stopped in the result determination area in the free game repetitively run (until the free game is executed for the awarded total number of times). This facilitates establishing of a winning (payout) by a combination including the fix symbol(s) 210.

[Background Effect During Free Game]

Now, a background effect executed during the free game will be described with reference to FIG. 51.

When, during the free game, the FEATURE symbol stops in the symbol display area 4 of the lower image display panel 141 and winning is achieved in random determination as shown in FIG. 51, a step-up effect is executed so that ice is gradually formed toward the center of the screen at a frame 141A of the lower image display panel 141 (i.e., plural effect images from a minor effect to a major effect are displayed stepwise). At this stage, an effect of blizzard is added to enhance the expectation on the shift to the jackpot game. This step-up effect may be performed such that effect images from a minor effect to a major effect are displayed stepwise in accordance with the number of the "FEATURE" symbols stopped in the free game or may be performed irrespective of the number of the "FEATURE" symbols stopped in the free game. The step-up effect indicates the overall degree of expectation. This increases the player's expectation on the awarding of the right to run the jackpot game as a result of the jackpot random determination. To be more specific, because the step-up effect of displaying plural effect images stepwise may be carried out in accordance with the jackpot random determination, the player watching the effect feels that the jackpot random determination is being performed right now, and expects that the winning in the jackpot random determination may have already been achieved (i.e., the right to run the jackpot game has been awarded).

The indication of the overall degree of expectation displayed by the above-described step-up effect of freezing from the frame 141A of the lower image display panel 141 toward the center is different from the above-described indication by the freezing of the "FEATURE" symbol shown in FIG. 29, in the following point. That is to say, the freezing of the "FEATURE" symbol indicates that, by freezing the "FEATURE" symbol (specific symbol) displayed in the symbol display area 4, the jackpot random determination is correctly executed based on that "FEATURE" symbol, i.e., indicates the execution of the random determination. In the meanwhile, the indication of the overall degree of expectation displayed by the above-described step-up effect of stepwise freezing is indication that the ultimate display of the jackpot winning, which is display of rainbow in the present embodiment, is approaching. In the present embodiment, as shown in FIG. 51, the display of rainbow is performed at RANK4 through RANK1 to RANK3 by using only the frame part in order not to cover the symbol display area. In this regard, whether the rank of the frozen area utilizing the frame part is increased when the freezing of the "FEATURE" symbol is displayed, i.e., whether the frozen area enlarges is randomly determined. In other words, the display of the freezing of the "FEATURE" symbol does not always result in the increase in the rank of the frozen area. Such an effect is employed because the rank-up effect aims at indicating the degree of overall expectation regarding a game result.

In addition to the above, in the present embodiment, the frozen area gradually enlarges, and the rainbow display which indicates ultimate winning of the jackpot is displayed stepwise. In this regard, not limited to this effect, an effect using any types of images may be carried out as long as the effect is continuous and indicates that the winning of the jackpot is approaching. For example, provided that differently-ranked winning types with different payouts are set in advance for jackpot winning, the rank-up effect may be arranged such that the text of the winning type of a particular rank gradually appears, or a particular character gets close to the goal each time the rank-up is achieved.

[Confirmation Effect]

When achieving winning in the jackpot random determination, confirmation effect random determination is executed to determine whether to execute a jackpot confirmation effect (bonus game confirmation effect). When the jackpot confirmation effect is to be executed as a result of the confirmation effect random determination, as shown in FIG. 51, the jackpot confirmation effect is executed so that rainbow is displayed in the frame 141A of the lower image display panel 141 to indicate winning in the jackpot random determination. The timing to execute the jackpot game confirmation effect is a timing in a period ranging from the determination of the execution of the jackpot game confirmation effect to the emphasis of the level of the obtained jackpot payout by the light emission from the frame of one of the indicators 241 to 245 corresponding to the selected three level icons of the jackpot payout in the win effect process (S137) of the later-described jackpot game process.

According to the arrangement above, the jackpot game confirmation effect of emphasizing that the right to run the jackpot game is awarded is performed on the lower image display panel 141 at a timing during a period ranging from the determination of the execution of the jackpot game confirmation effect as a result of the confirmation effect random determination executed when the right to run the jackpot game is awarded to a timing at which the player knows a specific payout amount as the payout amount consequently awarded in the jackpot game is displayed on the lower image display panel 141.

This allows the player to know that the right to run the jackpot game has been awarded, at a stage before knowing the payout amount consequently awarded in the jackpot game. With this arrangement, when the jackpot game confirmation effect is executed, the player's expectation is changed from the expectation on whether the right to run the jackpot game is awarded to the expectation on a specific payout amount awarded in the jackpot game.

[Effect when Free Game Ends]

The following describes an effect at the end of the free game in the slot machine 1, with reference to FIG. 52 to FIG. 55.

Figure 52:
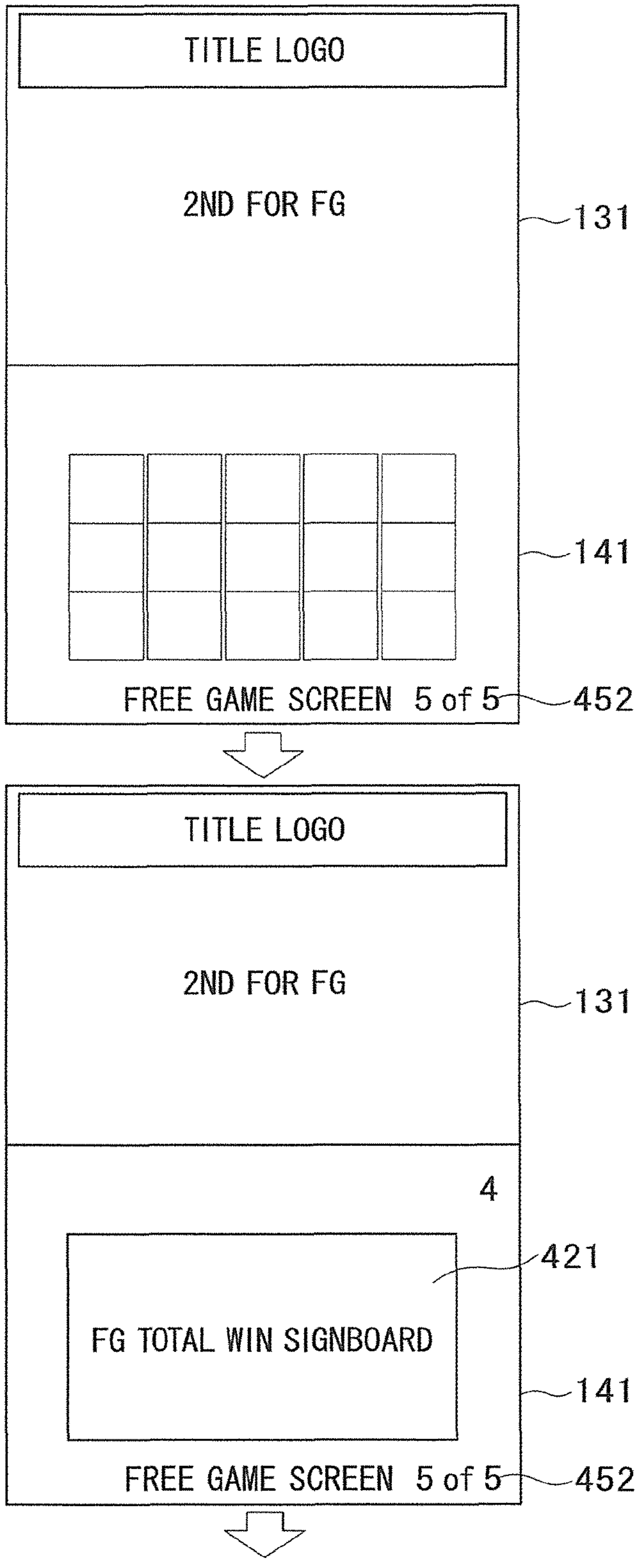
FIG. 52 shows an effect at the end of the free game in the slot machine related to the embodiment of the present invention.

As shown in FIG. 52, when the last spinning finishes in the symbol display area 4 on the lower image display panel 141, the free game counter 452 on the lower image display panel 141 displays "5 of 5" which indicates that the free game has ended. Furthermore, the gold signboard 421 is displayed on the lower image display panel 141. When the obtained credit is zero, the gold signboard 421 is not displayed.

Figure 53:
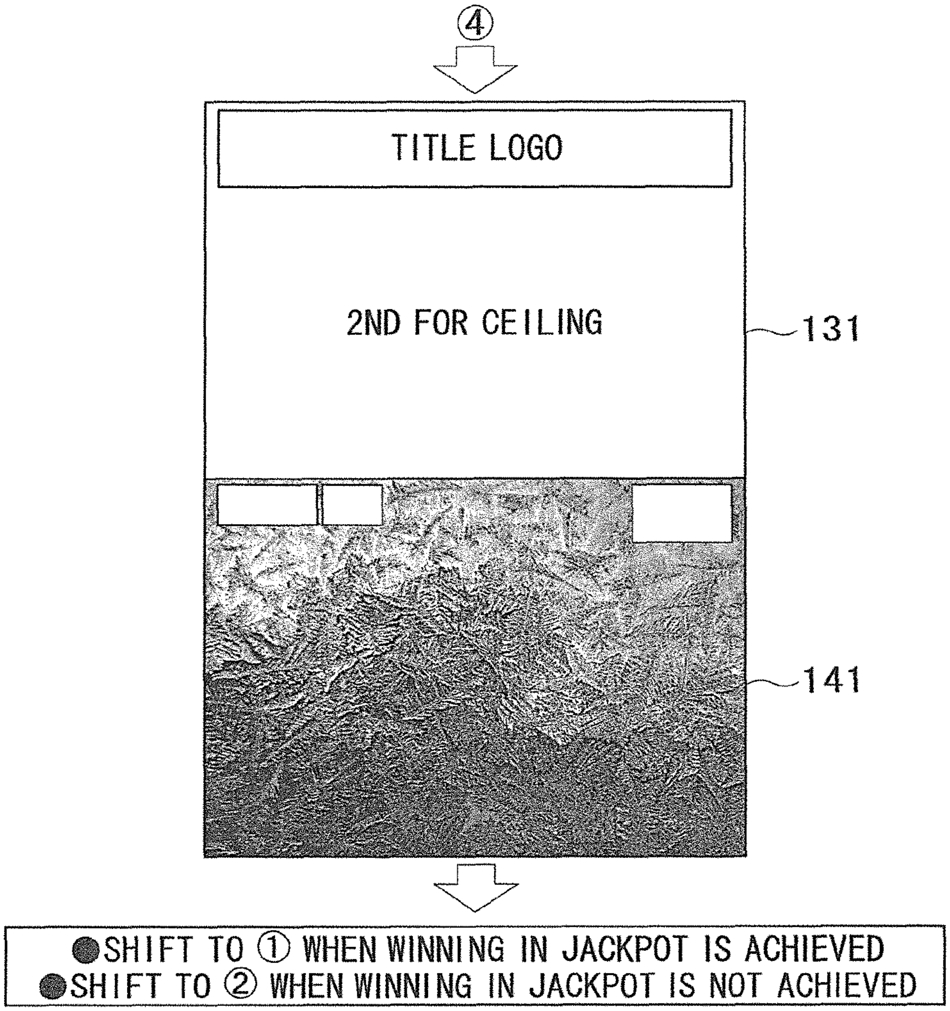
FIG. 53 shows an effect at the end of the free game in the slot machine related to the embodiment of the present invention.
Figure 54:
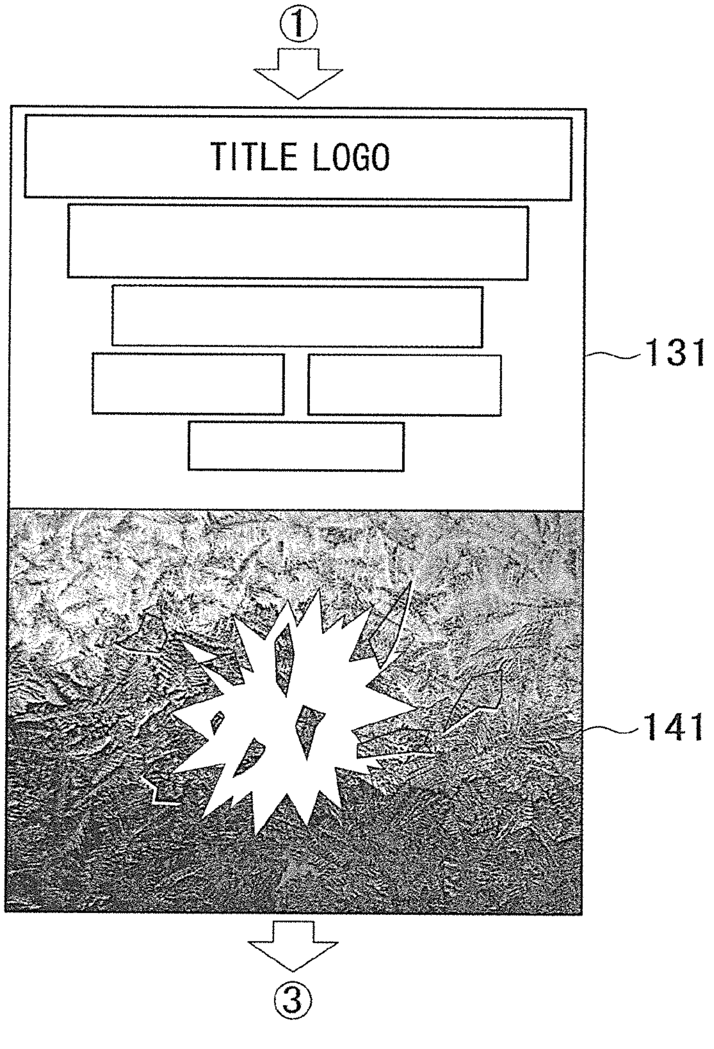
FIG. 54 shows an effect at the end of the free game in the slot machine related to the embodiment of the present invention.
Figure 55:
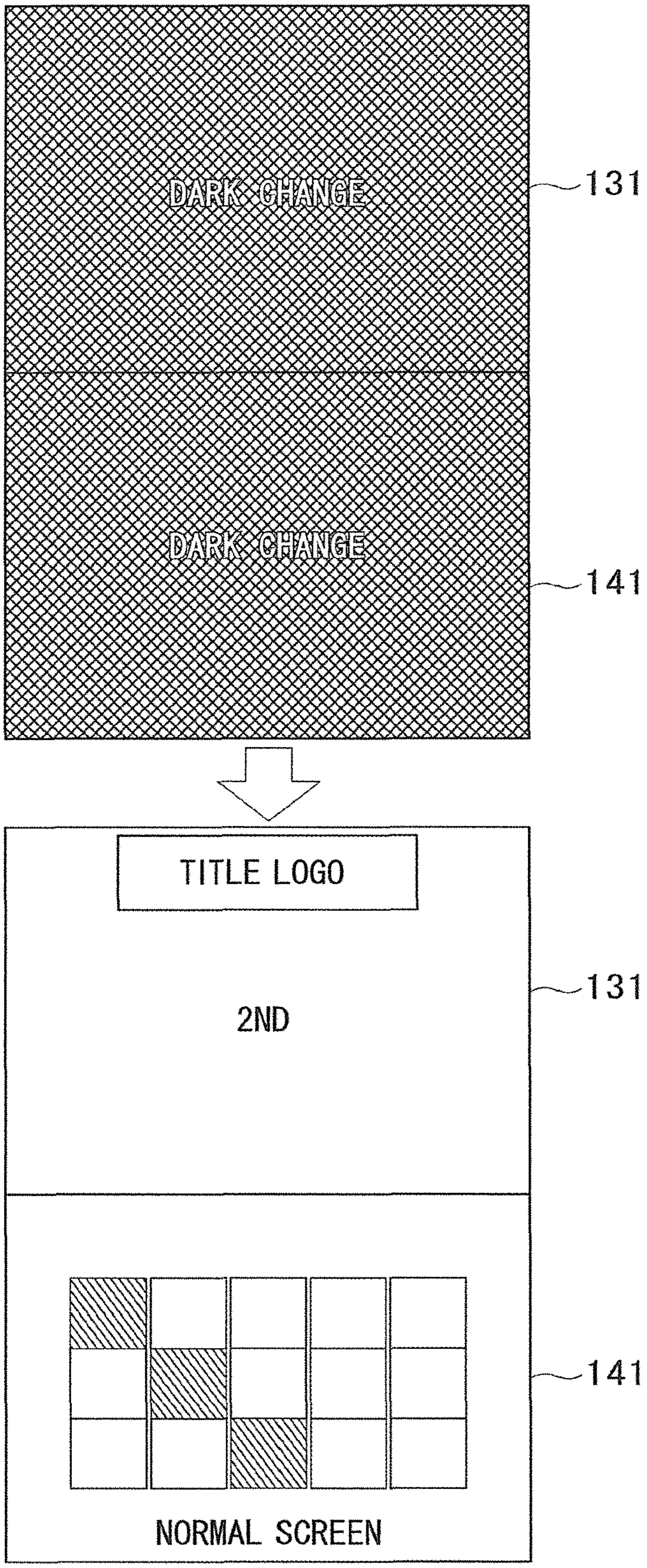
FIG. 55 shows an effect at the end of the free game in the slot machine related to the embodiment of the present invention.

Then an effect of being covered with ice is executed on the lower image display panel 141 as shown in FIG. 53. When winning is achieved in the jackpot random determination, an effect of breaking the ice from the center is executed as shown in FIG. 54. When winning is not achieved in the jackpot random determination, a dark change image is displayed on the lower image display panel 141 as shown in FIG. 55. When the gold signboard 421 disappears from the symbol display area 4 on the lower image display panel 141, the routine proceeds to the normal game screen.

[Re-Trigger Effect]

Now, the re-trigger effect executed when the re-trigger is established in S114 will be described with reference to FIG. 56 to FIG. 58.

Figure 56:
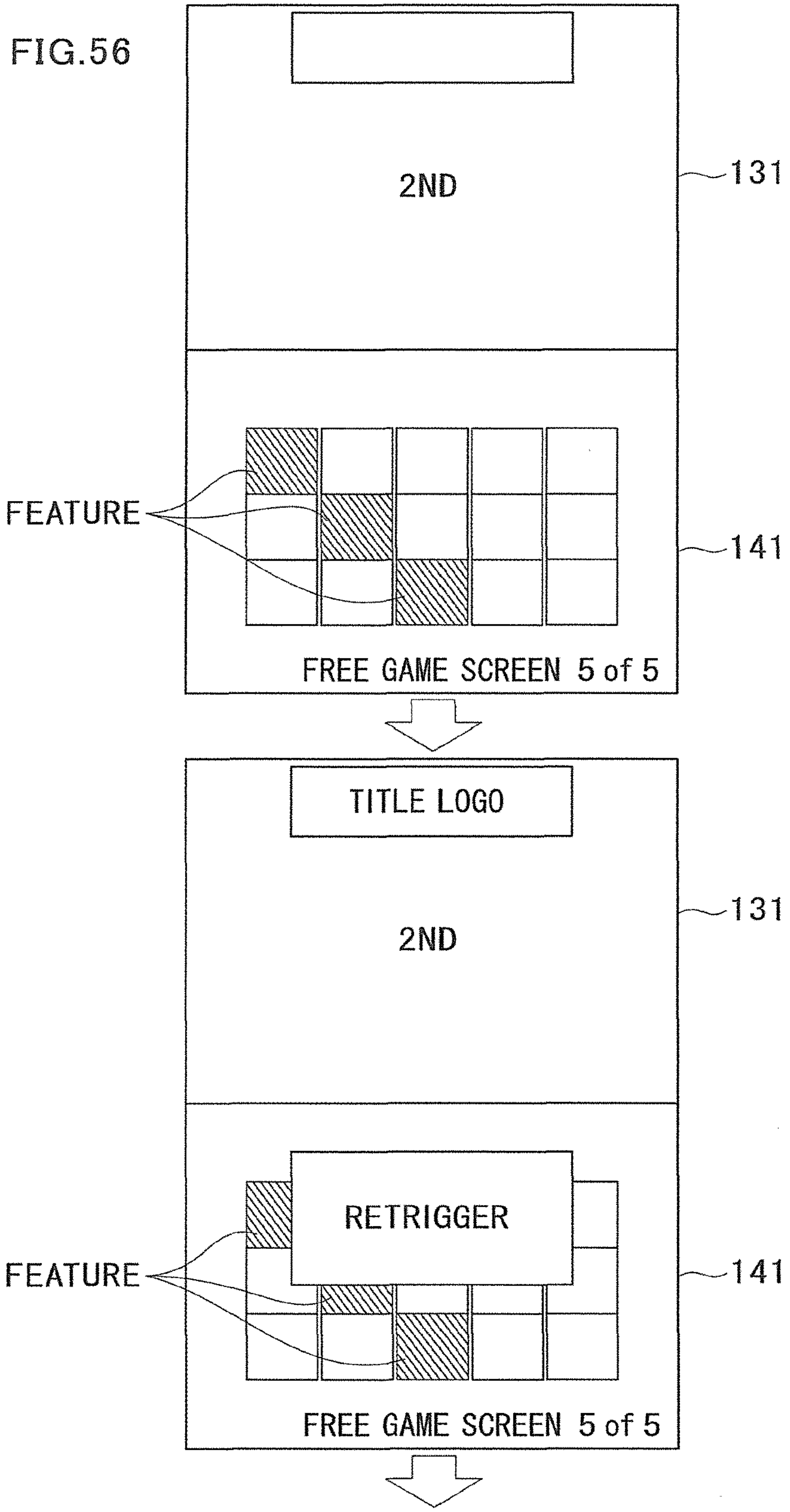
FIG. 56 shows a re-trigger effect in the slot machine related to the embodiment of the present invention.
Figure 57:
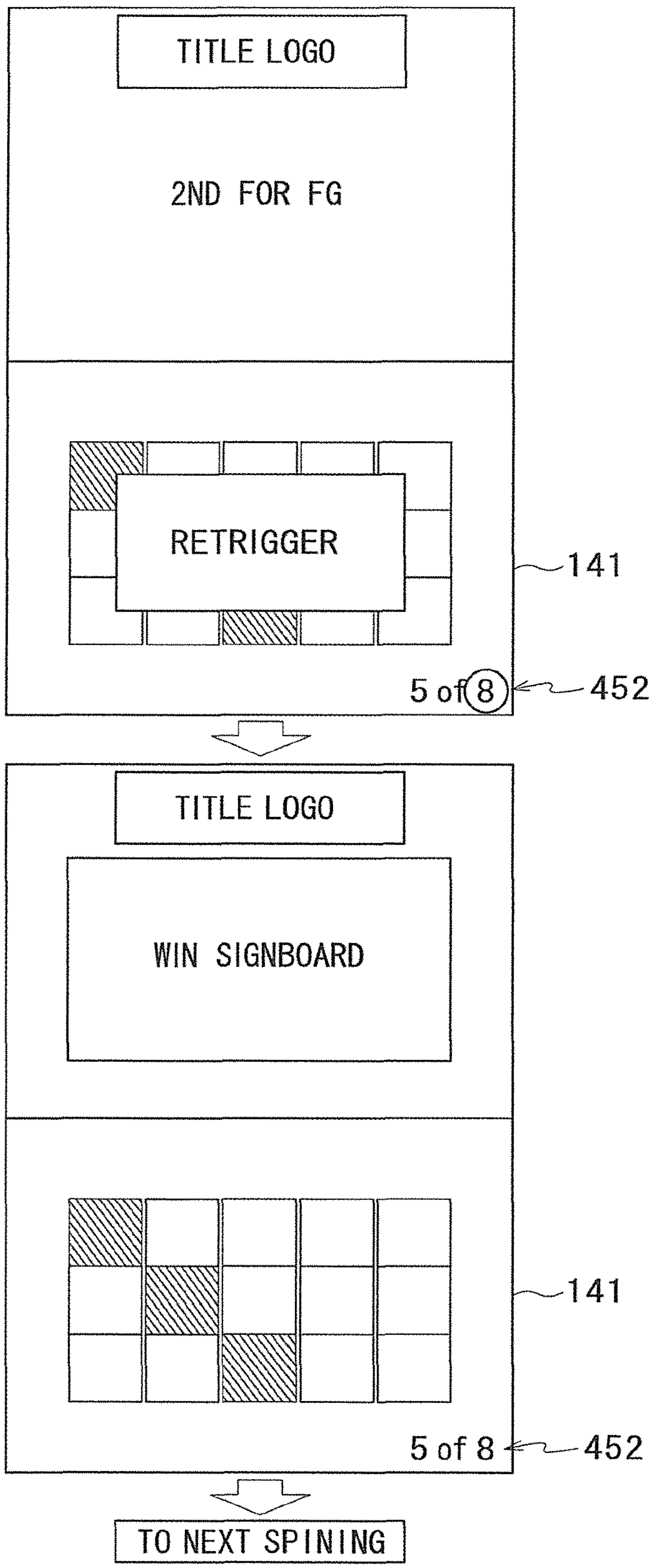
FIG. 57 shows a re-trigger effect in the slot machine related to the embodiment of the present invention.

During the free game, when the "FEATURE" symbol occurs in three or more consecutive positions through the first column area to the fifth column area, irrespective of the area activated by WAYS BET, a message reading "RETRIGGER" is displayed on the lower image display panel 141, as shown in FIG. 56. Thereafter, as shown in FIG. 57, the number of times of execution of the free game (three in the present embodiment) added at the time of the re-trigger is added to the free game counter 452 in the lower image display panel 141. For example, as shown in FIG. 57, when the re-trigger occurs during the free game and when the value on the free game counter 452 is "5 OF 5", three times is added as the number of times of execution of the free game and "5 OF 8" is displayed.

Figure 58:
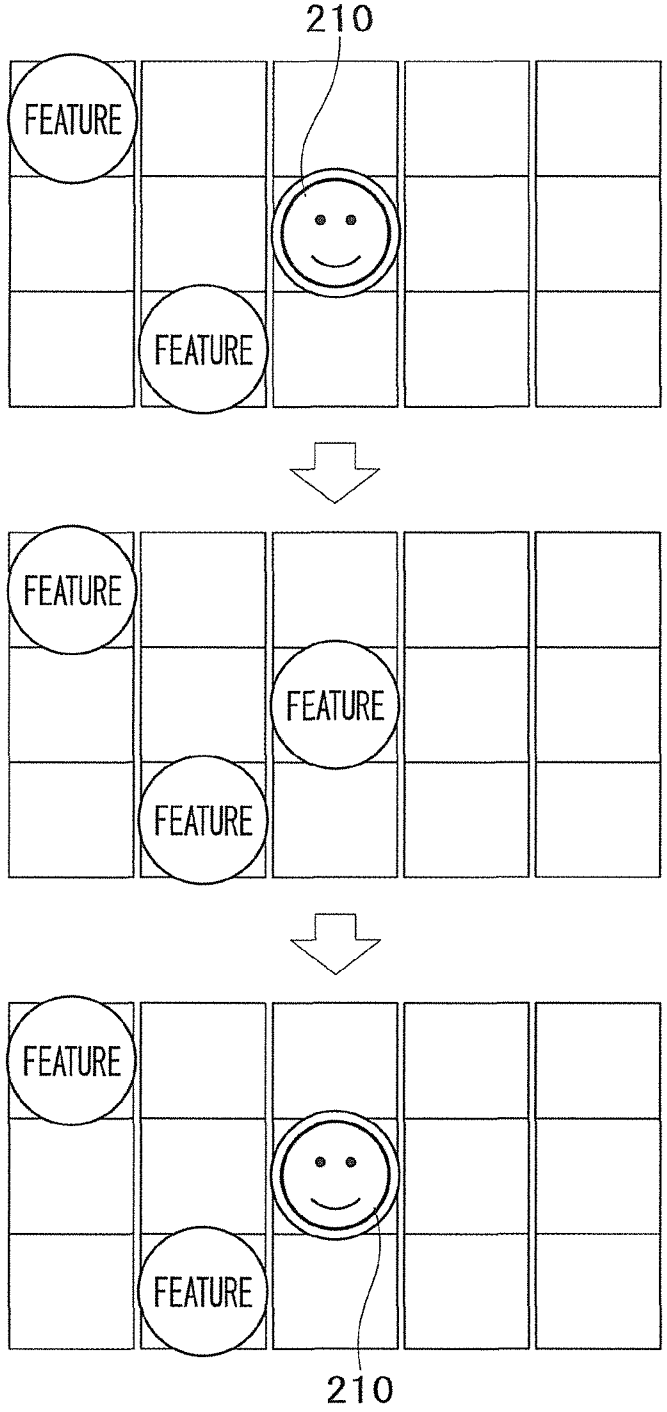
FIG. 58 shows a re-trigger effect in the slot machine related to the embodiment of the present invention.

It should be noted that, as shown in FIG. 58, if the "FEATURE" symbol stops under the fix symbol 210 and the re-trigger occurs, an effect sound is output and at the same time, the "FEATURE" symbol rearranged behind the fix symbol 210 is displayed in front of the fix symbol 210, and there is provided an animation effect associated with rearrangement of three or more "FEATURE" symbols. Then, the fix symbol 210 is again displayed in front of the "FEATURE" symbol. If a combination with the fix symbol 210 is formed at this point, a win effect is provided. After the above, the effect of displaying the "FEATURE" symbol in front of the fix symbol 210 and the effect of displaying the fix symbol 210 in front of the "FEATURE" symbol are repeated for a predetermined period.

[Win Effect: When Fix Symbol is Involved]

Figure 59:
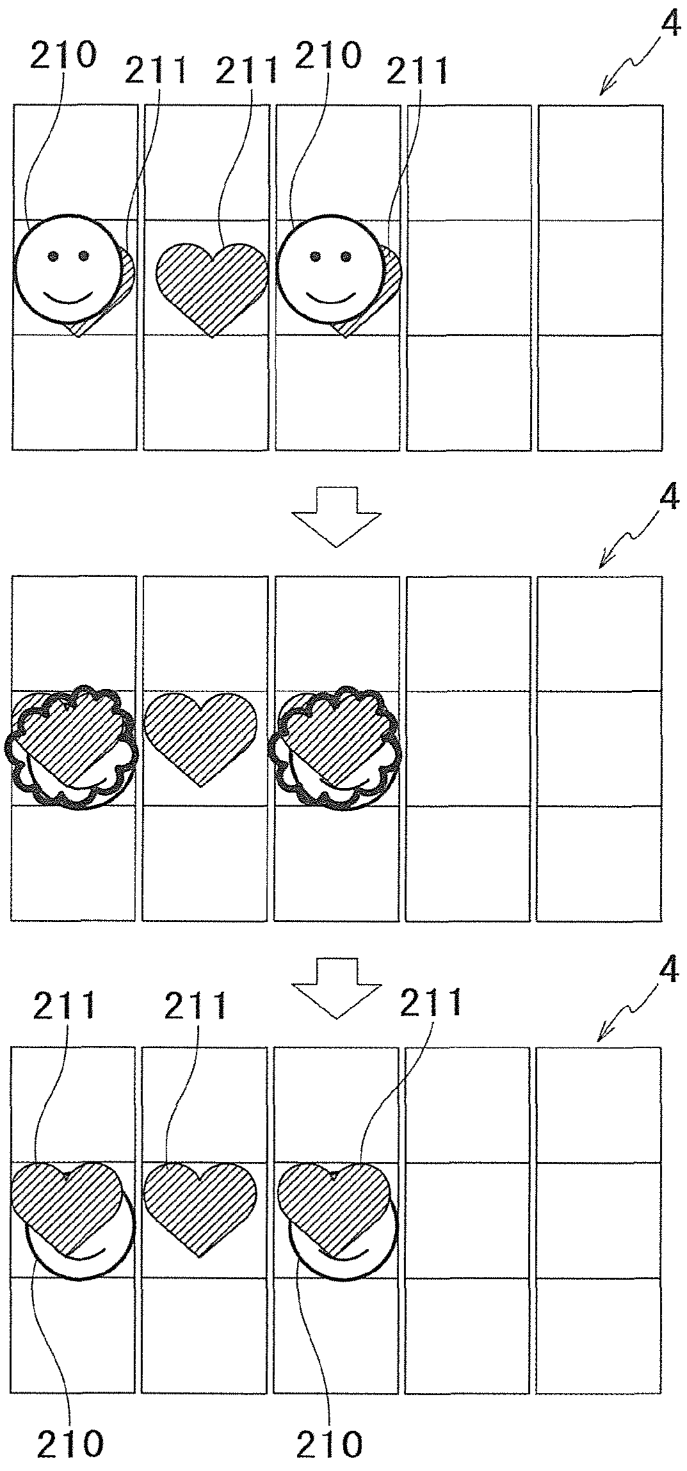
FIG. 59 is an explanatory diagram of a win effect at occasions involving a fix symbol, in the slot machine related to the embodiment of the present invention.

As shown in FIG. 59, in the free game, if there is no payout (no win) for a combination including the fix symbol 210 and there is a payout (win) for a combination with a symbol 211 rearranged behind the fix symbol 210, as the result of rearranging a plurality of symbols in the symbol display area 4, the symbol 211 rearranged behind the fix symbol 210 is displayed in front of the fix symbol 210 with a switching effect, and a win effect is executed. It should be noted that the fix symbol 210 for which no payout is awarded is kept behind the symbol 211 until the end of the win effect.

Figure 60:
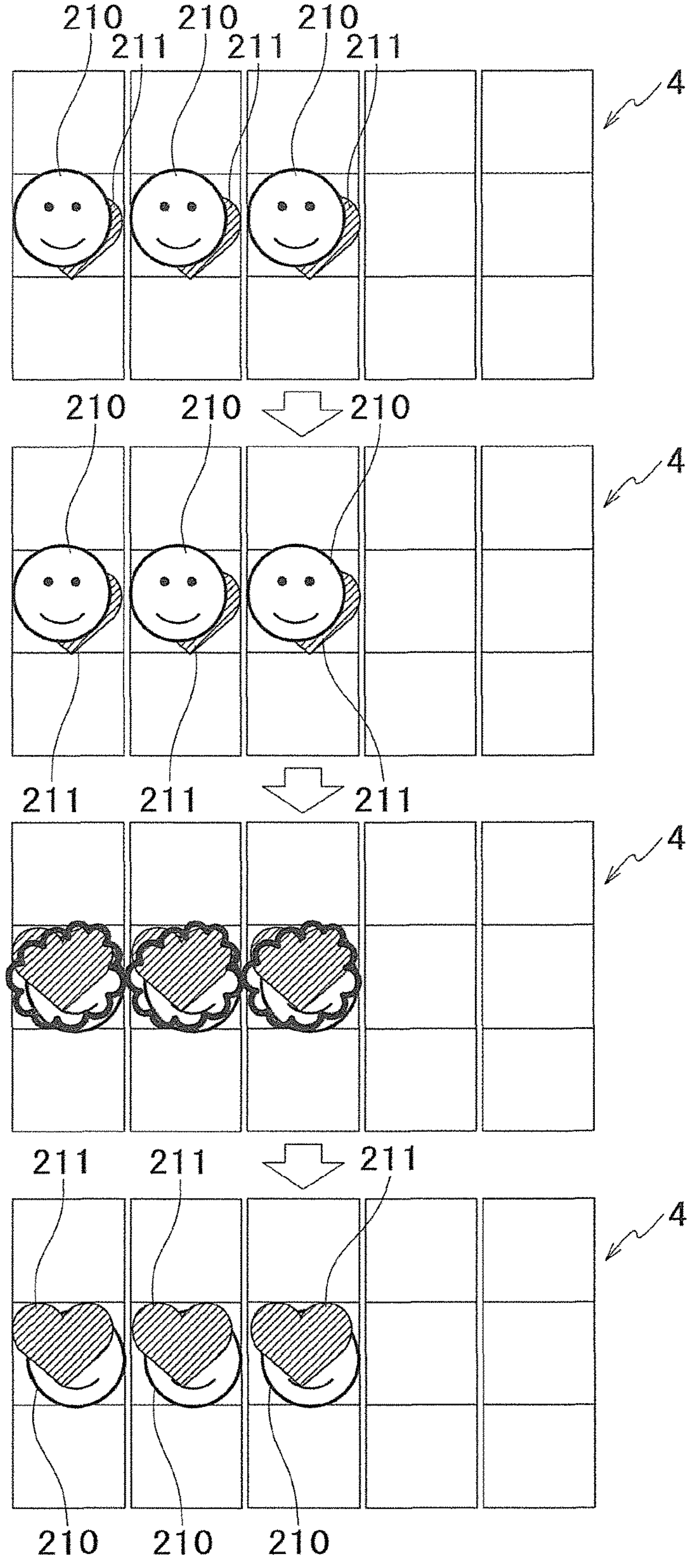
FIG. 60 is an explanatory diagram of a win effect at occasions involving a fix symbol, in the slot machine related to the embodiment of the present invention.

As shown in FIG. 60, in the free game, if there is a payout (win) for a combination including the fix symbol 210 and there is also a payout (win) for a combination with a symbol 211 rearranged behind the fix symbol 210, as the result of rearranging a plurality of symbols in the symbol display area 4, win effects are provided in a descending order of the payout amount. For example, if the win based on the combination including the fix symbol 210 results in a higher payout than that resulted by the combination including the symbol 211, the win effect for the combination with the fix symbol 210 is provided first, and then with the effect of switching over, the symbol 211 rearranged behind the fix symbol 210 is displayed in front of the fix symbol 210, and a win effect for the combination with the symbol 211 is executed.

Figure 61:
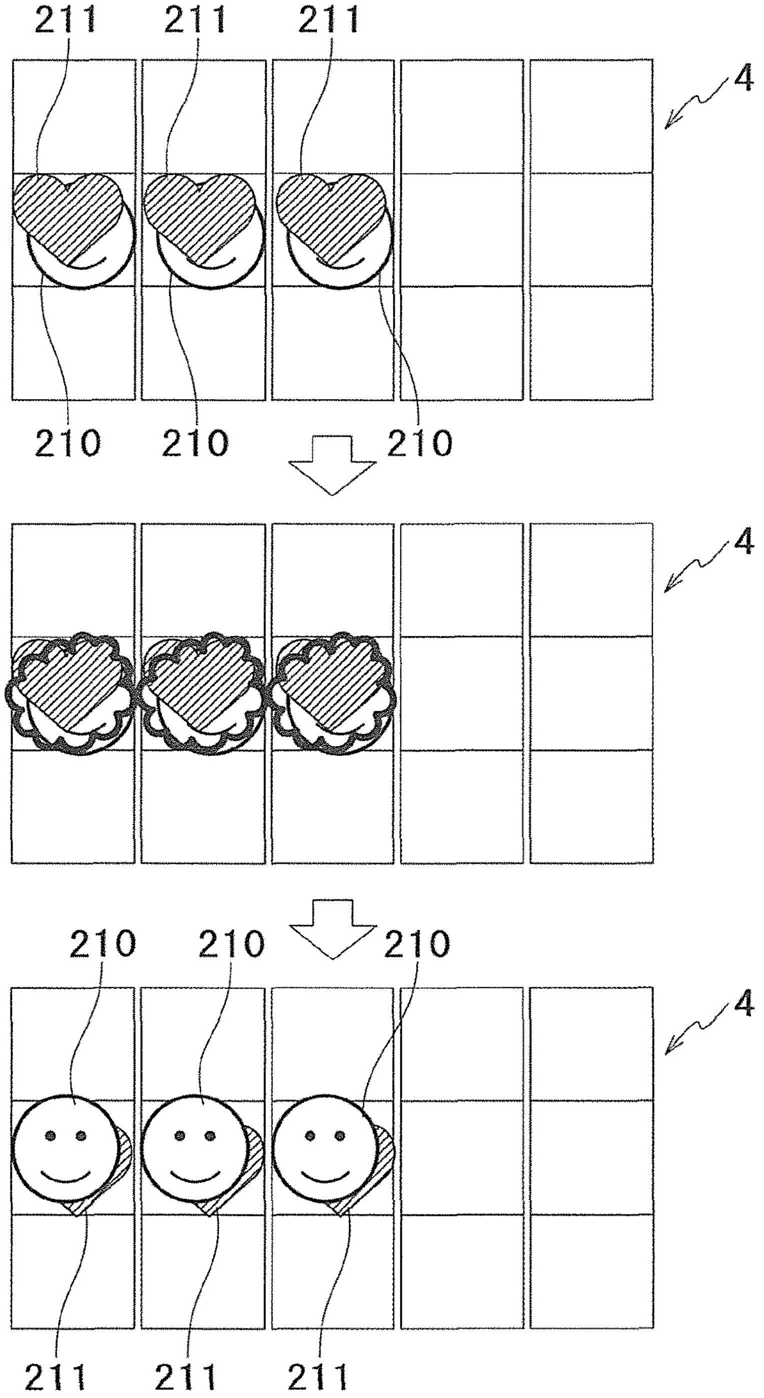
FIG. 61 is an explanatory diagram of a win effect at occasions involving a fix symbol, in the slot machine related to the embodiment of the present invention.

As shown in FIG. 61, in the free game, if there is a payout (win) for a combination including the fix symbol 210 and there is also a payout (win) for a combination with a symbol 211 rearranged behind the fix symbol 210, as the result of rearranging a plurality of symbols in the symbol display area 4, win effects are provided in a descending order of the payout amount. For example, if the win based on the combination including the fix symbol 210 results in a lower payout than that resulted by the combination including the symbol 211, the win effect for the combination with the symbol 211 is provided first, and then with the effect of switching over, the fix symbol 210 rearranged behind the symbol 211 is displayed in front of the symbol 211, and a win effect for the combination with the fix symbol 210 is executed.

Figure 62:
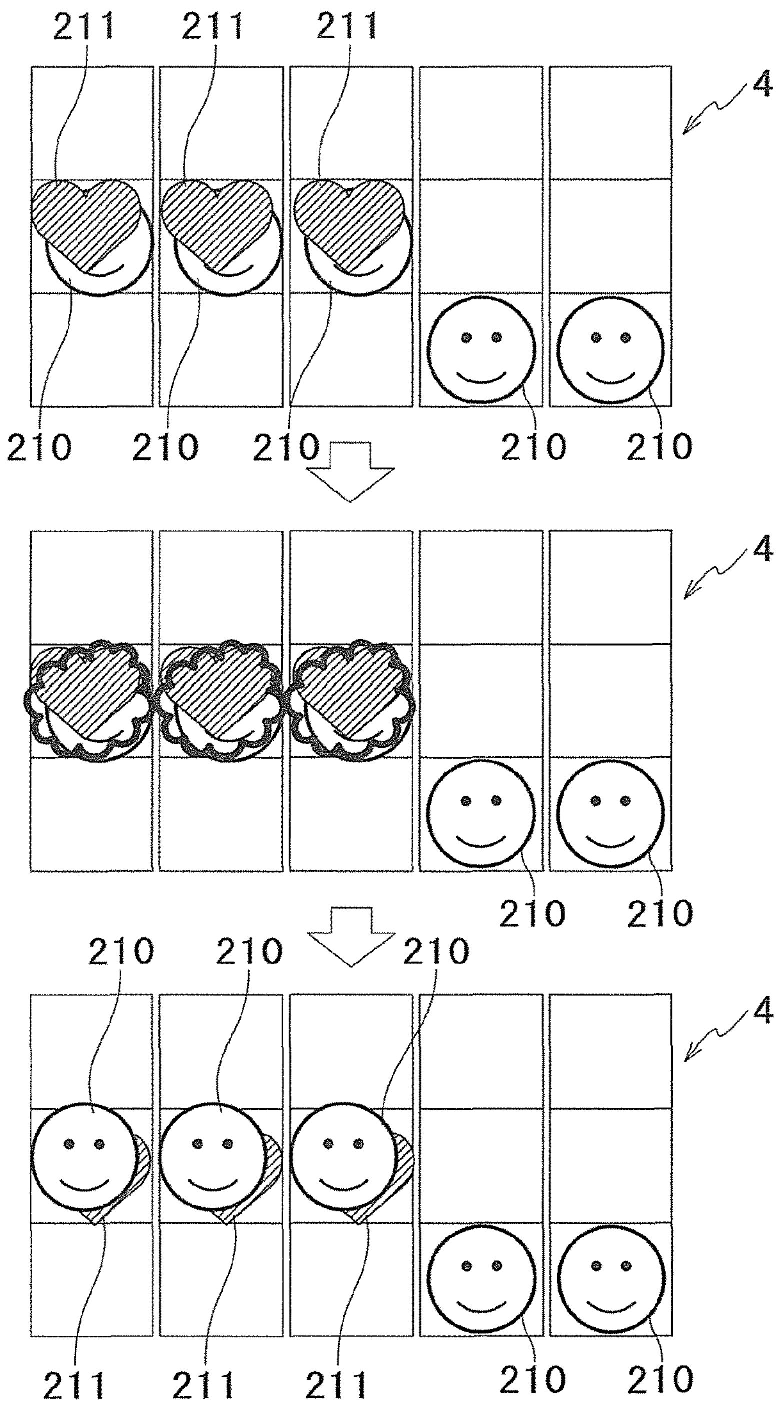
FIG. 62 is an explanatory diagram of a win effect at occasions involving a fix symbol, in the slot machine related to the embodiment of the present invention.

As shown in FIG. 62, in the free game, if there is a payout (win) for a combination including the fix symbol 210 and there is also a payout (win) for a combination with a symbol 211 rearranged behind the fix symbol 210, as the result of rearranging a plurality of symbols in the symbol display area 4, win effects are provided in a descending order of the payout amount. For example, if the win based on the combination including the fix symbol 210 results in a higher payout than that resulted by the combination including the symbol 211, the symbol 211 rearranged behind the fix symbol 210 is displayed in front of the fix symbol 210, and a win effect for the combination with the symbol 211 is executed. Then, with the switching over effect, the symbol 210 rearranged behind the fix symbol 211 is displayed in front of the fix symbol 211, and a win effect for the combination with the symbol 210 is executed.

As described, even if the fix symbol 210 is fixed, a combination for which a payout is awarded is preferentially displayed in the symbol display area 4.

Further, if a combination of symbols including the fix symbol 210 is a combination for which a payout is to be awarded, and if a combination of symbols including a symbol 211 rearranged in the position of the fix symbol 210 is a combination for which a payout is to be awarded, both of symbol combinations are displayed.

[Jackpot Random Determination Winning Display]

As shown in FIG. 63, when winning is achieved in the jackpot random determination during the normal game or during the free game, a message "JACKPOT CHANCE FEATURE TRIGGERED" is displayed at a lower left part of the upper image display panel 131 to notify the winning in the jackpot random determination. This message is displayed until the end of the normal game when the normal game is being played, or is displayed until the end of all free games when the free game is being played. This arrangement allows the player to know the awarding of the right to run the jackpot game.

[Jackpot Game Introduction Effect]

The following will describe an effect in the jackpot game process with reference to FIGS. 64 to 71.

To begin with, as shown in FIG. 64, an effect of braking ice from the center is executed and an animation of appearing an ice palace is displayed on the lower image display panel 141. Furthermore, a signboard notifying the shift to the jackpot game is displayed.

Subsequently, as shown in FIG. 65, 15 ice cubes 221 are displayed on the lower image display panel 141.

Subsequently, as shown in FIG. 66, a signboard encouraging the player to select one of the ice cubes 221 is displayed on the lower image display panel 141. In the GRAND indicator 241, the MAJOR indicator 242, the MINOR indicator 243, the MINI indicator 244, and the CREDIT AWARD indicator 245, current jackpot payouts of the respective levels are displayed.

As shown in FIG. 66, operating the buttons on the control panel 30 allows displaying of a selection cursor for selecting the ice cube 221 and moving of the selection cursor from a ice cube 221 to another, sequentially from the number 1 to 15.

As shown in FIG. 67, when the player selects one ice cube 221, a level icon corresponding to the selected ice cube 221 is displayed. For example, as shown in FIG. 67, when the player selects the No. 1 ice cube 221, the GRAND icon 231 associated with the No. 1 ice cube 221 is displayed. Thereafter, as shown in FIG. 67, an effect of moving the displayed GRAND icon 231 to a GRAND indicator 241 is displayed.

As shown in FIG. 68, the above-described selection of the ice cube 221 is repeated, and the level icon corresponding to the ice cube 221 is stored in one of the indicators 241 to 245 corresponding to that level icon. It should be noted that the same kind of level icons of the jackpot payout are accumulated up to the total of three on the corresponding one of indicators 241 to 245, as shown in FIG. 68.

As shown in FIG. 68, when the same kind of level icons of the jackpot payout are on the corresponding one of indicators 241 to 245 so that the number of the accumulated level icons becomes three in total, the frame of one of the indicators 241 to 245 corresponding to the selected three level icons of the jackpot payout emits light to emphasize the level of the obtained jackpot payout. For example, as shown in FIG. 68, when the total of three GRAND icons 231 are selected, the frame of the GRAND indicator 241 emits light to emphasize that the GRAND jackpot payout is obtained. Then, as shown in FIG. 69, the win signboard 251 is displayed on the lower image display panel 141.

Thereafter, a dark change image is displayed as shown in FIG. 69. When winning is not achieved in the jackpot random determination, the routine proceeds to the screen of the normal game.

Figure 70:
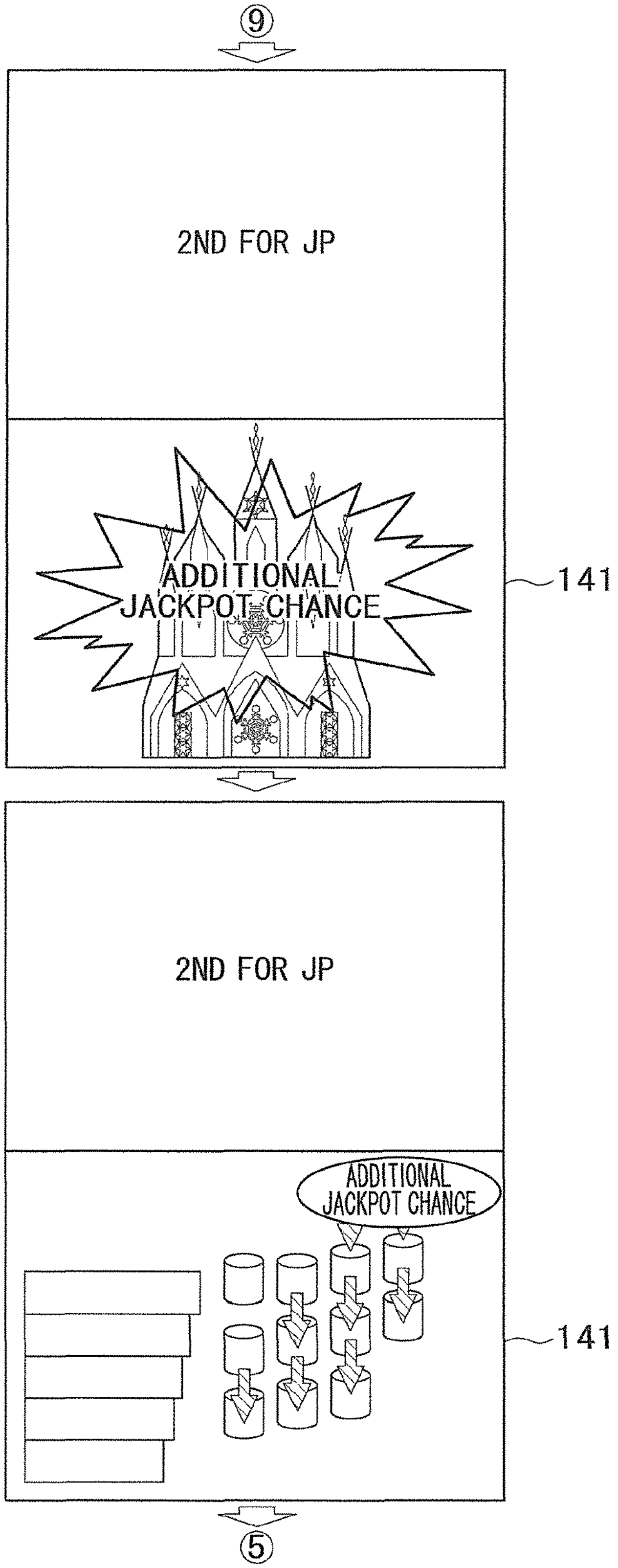
FIG. 70 is an explanatory diagram of a jackpot game introduction effect in the slot machine of the embodiment of the present invention.
Figure 71:
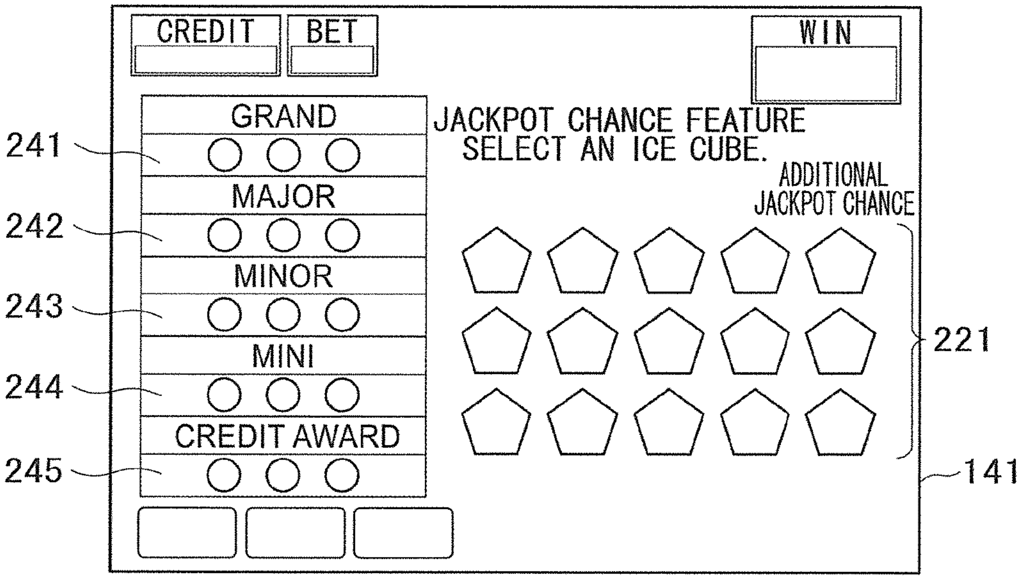
FIG. 71 is an explanatory diagram of a jackpot game introduction effect in the slot machine of the embodiment of the present invention.

In the meanwhile, when winning is achieved in the jackpot random determination, as shown in FIG. 70, an effect of braking ice from the center is executed and an animation of appearing the ice palace again is displayed. At this stage, a message "ADDITIONAL JACKPOT CHANCE" is displayed on the lower image display panel 141 to notify that the jackpot game is successively executed. Then 15 ice cubes 221 are displayed on the lower image display panel 141 and the jackpot game introduction effect is executed after being shifted to FIG. 66. At this stage, a message "ADDITIONAL JACKPOT CHANCE" is kept displayed on the lower image display panel 141 (see FIG. 71).

[Button Prereading]

Now, button prereading in the slot machine 1 will be described with reference to FIG. 72. The button prereading is a function in the normal game to receive an input to a spin/max bet button for the next game even immediately before the end of the rotation of the reels, in order to smoothly start the next game.

Figure 72:
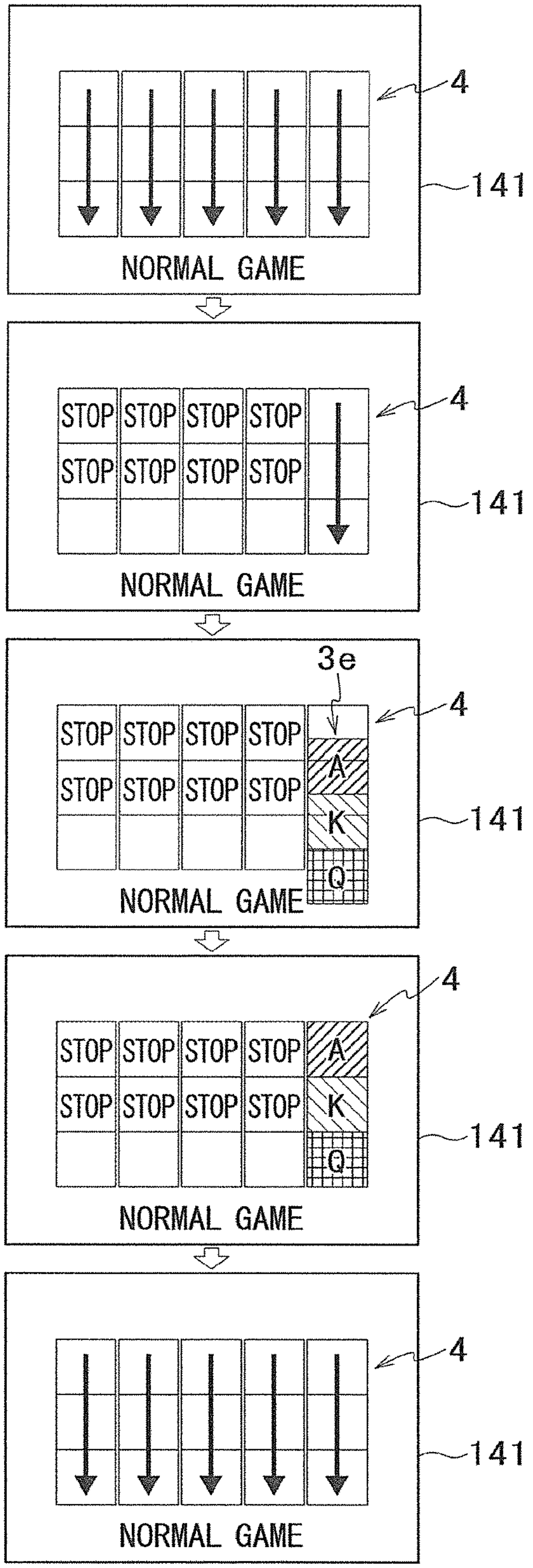
FIG. 72 shows button prereading specification in the slot machine related to the embodiment of the present invention.

To be more specific, as shown in FIG. 72, the rotation of the 4th reel stops. Thereafter, when the spin button 49 is continuously pressed while the 5th reel sinks at the maximum and rises to the surface, the spinning in the next game starts immediately after the stop of the 5th reel. It is noted that, while the spinning in the next game immediately starts, other effects and processes are not skipped.

The prereading function of prereading the pressing of the button is active only in a normal game in which no winning occurs. The prereading function is inactive in a game in which WIN occurs. By setting the AUDIT, the prereading function is activated or disabled. In other words, the priority is arranged as Setting>Hardware setting>Control panel. The prereading function is usually activated. The function is disabled in USA.

The button prereading function is active only when the remaining credit amount is sufficient to start the next game. For example, when a currently-selected bet is 50 whereas the remaining credit amount is 25, the spin prereading function is disabled. In the meanwhile, when a currently-selected bet is 50 whereas the remaining credit amount is 100, the spin prereading function is activated.

When the prereading is active, a corresponding button LED is turned on. When the prereading of the spinning is active, the spin button is illuminated.

(Button Prereading Process: Coexistence with Reel Skip Function)

Figure 73:
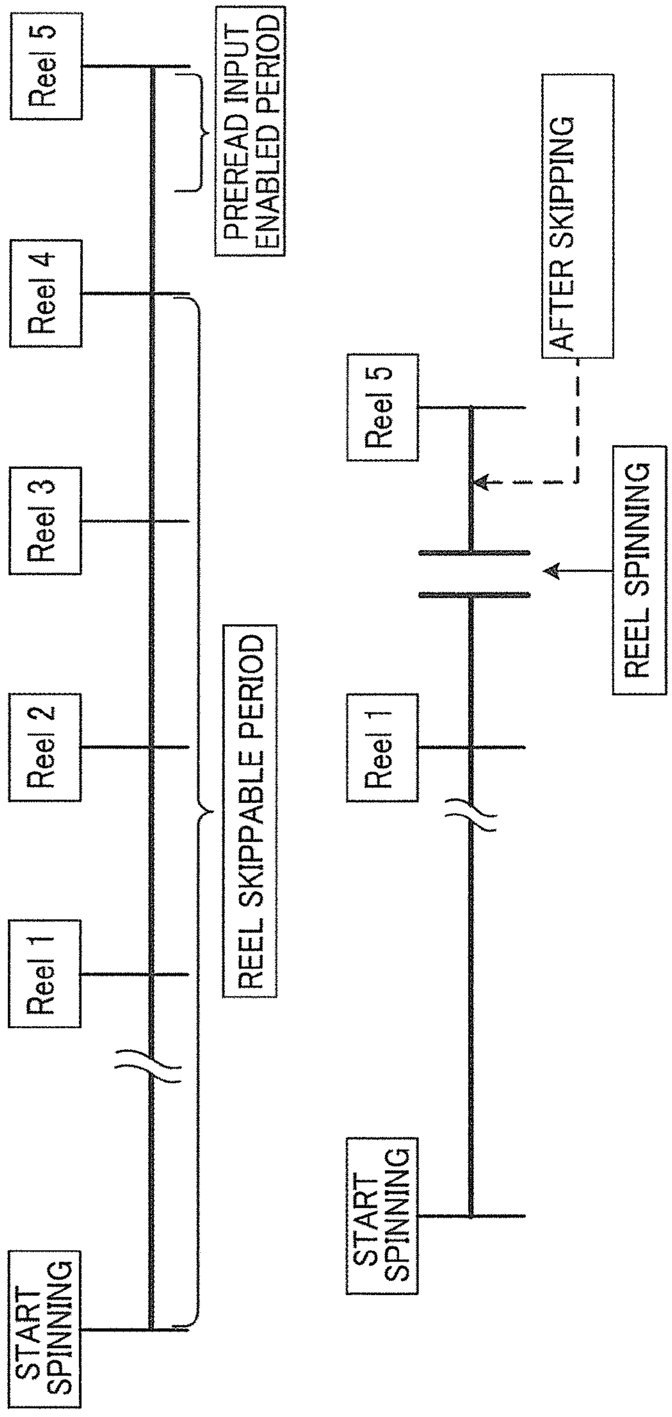
FIG. 73 shows button prereading specification in the slot machine related to the embodiment of the present invention.

As shown in FIG. 73, the button for the prereading function is used also for the reel skip. For this reason, a reel skippable time and a prereading input available time are independently provided. In the reel skippable time, the reel skip function is active. In the input available time, the prereading of the next game is active. As shown in FIG. 60, when the reel skip is executed in a game, the prereading function is disabled in that game. With this arrangement, even if the button mistakenly pressed twice to execute the skip function, the next game does not unexpectedly starts due to the execution of the spin button prereading function.

(Display Screen: RESERVE Screen)

Figure 74:
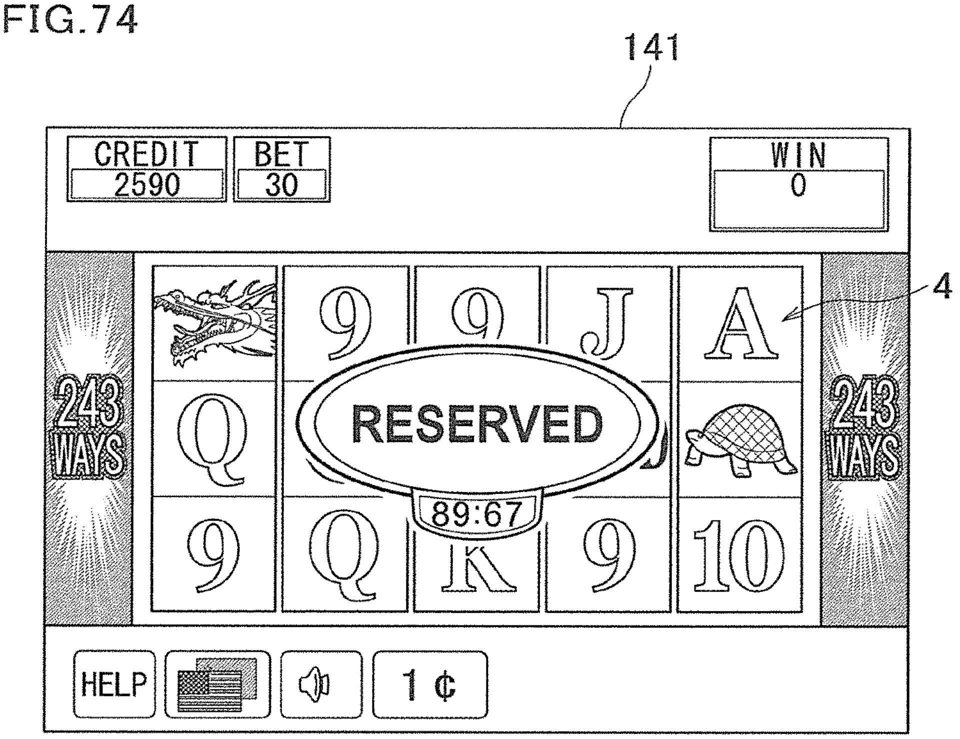
FIG. 74 shows a RESERVE screen in the slot machine related to the embodiment of the present invention.

The RESERVE screen shown in FIG. 74 is displayed when the RESERVE button 31 which is used to set the slot machine 1 in a standby state for a while when, for example, the player temporarily leaves the seat is pressed. When this RESERVE button 31 is pressed, a message "RESERVED" and the remaining time are displayed on the lower image display panel 141 as shown in FIG. 74.

[Win Meter Information Display]

Figure 75:
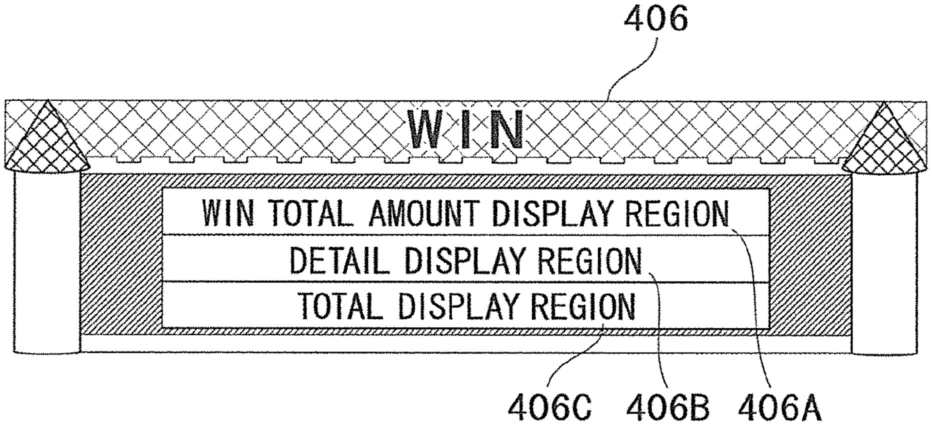
FIG. 75 shows a win meter information display of the slot machine related to the embodiment of the present invention.

Now, win meter information display of the slot machine 1 will be described with reference to FIG. 75. FIG. 75 illustrates the win meter information display of the slot machine of the embodiment of the present invention.

As shown in FIG. 75, a win meter 406 is provided with a WIN total amount display region 406A, a detail display region 406B, and a total display region 406C.

The WIN total amount display region 406A displays a win credit and a money amount. Increment display is performed based on a win increment speed sheet, when performed. More specifically, the WIN total amount display region 406A displays a credit amount obtained in the current game cycle (or in the previous game cycle). When a credit is obtained more than once in one game cycle, the credit is added each time it is obtained. For example, when the free game is triggered in the normal game and the player obtains a normal win 20 and a bonus win 100, the image display is incremented from "0" to "120". Thereafter, when the player obtains a payout amount of 200 in the free game, the increment display is conducted from 120 to 320. 0 is displayed either when the next game cycle starts or when lost in GAMBLE. In the meanwhile, when a win is achieved in GAMBLE, no increment is carried out and the displayed amount is immediately doubled.

The detail display region 406 relates to a win in the normal game and the free game. After the fifth reel stops, the win credit is displayed. When more than one payout simultaneously occurs, the line payouts are displayed one by one at intervals of 0.5 second. The payouts are serially displayed in an ascending order of the payout amount, and the smallest payout is again displayed after the largest payout is displayed. In other words, the detail display region 406 displays the details of the credit obtained by the spinning in this time. When there are plural elements (e.g., another line or scatter), the elements are switched at intervals of 0.5 second.

The total display region 406C displays the total credits of the detail display region 406 when the increment in the WIN total amount display region 406A is completed. The region is not displayed until the increment in the WIN total amount display region 406A is completed. In other words, the total display region 406C displays the details of the credit obtained by the spinning in this time. In this regard, the total credits are displayed after the increment in the WIN total amount display region 406A is finished.

[Gamble Specification]

Now, the GAMBLE specification in the slot machine 1 will be described with reference to FIG. 76 to FIG. 82. Each of FIG. 76 to FIG. 82 illustrates GAMBLE specification in the slot machine of the embodiment of the present invention.

Figure 76:
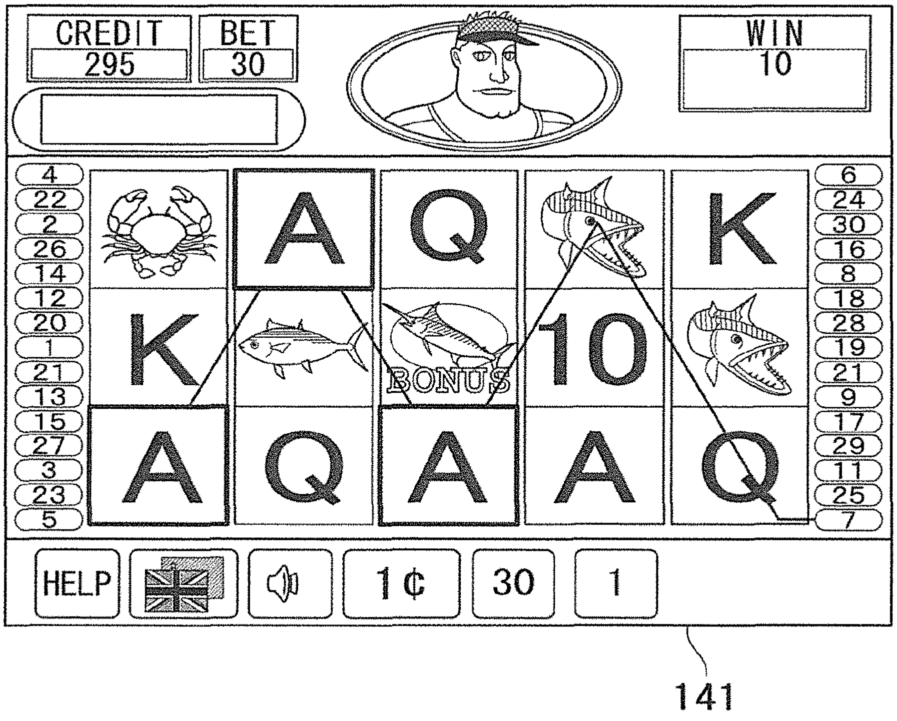
FIG. 76 shows GAMBLE specification of the slot machine related to the embodiment of the present invention.
Figure 77:
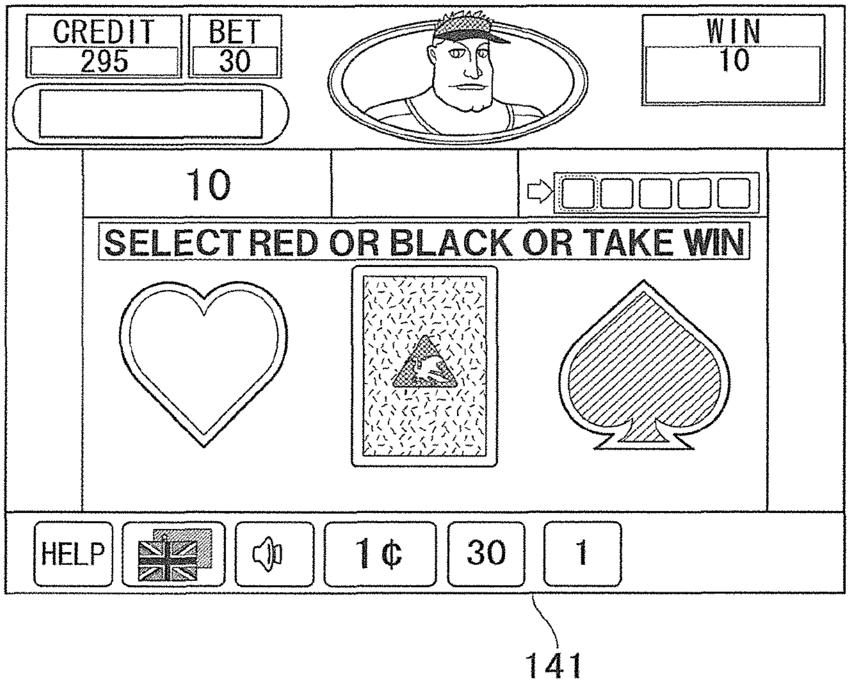
FIG. 77 shows GAMBLE specification of the slot machine related to the embodiment of the present invention.

To begin with, when a winning (WIN) is achieved, the lower image display panel 141 shown in FIG. 76 is changed to the lower image display panel 141 shown in FIG. 77. In other words, a gamble screen is displayed whereas the message "PLAY ON, GAMBLE or TAKE WIN" is deleted from the lower image display panel 141. In the meanwhile, a message "SELECT RED OR BLACK OR TAKE WIN" is displayed on the lower image display panel 141.

Figure 78:
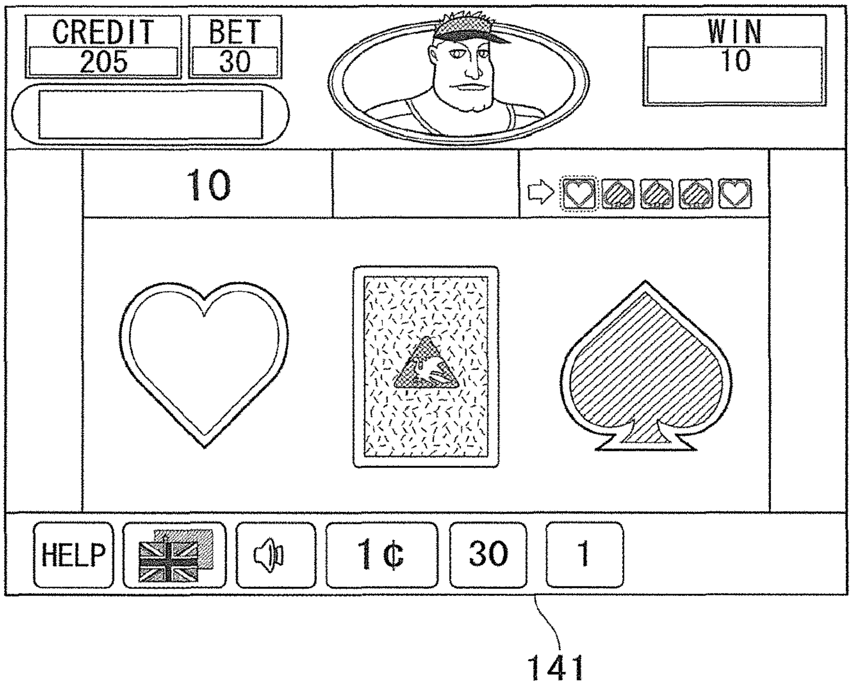
FIG. 78 shows GAMBLE specification of the slot machine related to the embodiment of the present invention.

Subsequently, on the lower image display panel 141 shown in FIG. 78, a betted amount is displayed on the lower image display panel 141 as "GAMBLE AMOUNT". The player selects "RED" or "BLACK". When the player succeeds in the selection, the lower image display panel 141 is changed to the later-described lower image display panel 141 shown in FIG. 81. In the meanwhile, when the player fails in the selection, the lower image display panel 141 is changed to the lower image display panel 141 shown in FIG. 79. When the player selects "TAKE WIN", the amount of win is immediately added to the credits on the lower image display panel 141 and the idle state returns.

Figure 79:
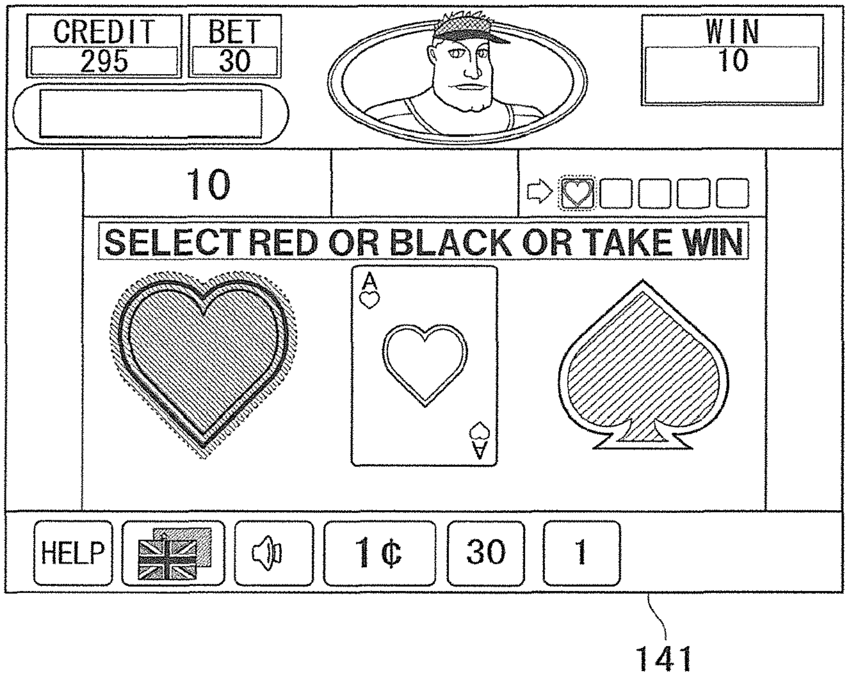
FIG. 79 shows GAMBLE specification of the slot machine related to the embodiment of the present invention.
Figure 80:
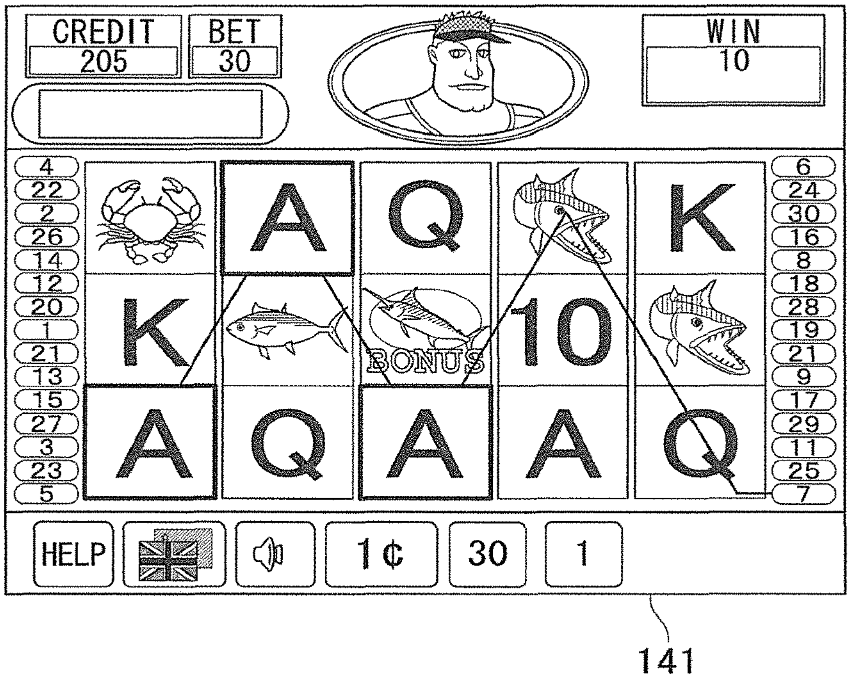
FIG. 80 shows GAMBLE specification of the slot machine related to the embodiment of the present invention.

When the player fails in the selection, the option ("RED" or "BLACK") which is not selected is darkened on the lower image display panel 141 shown in FIG. 79. On the lower image display panel 141 shown in FIG. 79, the history of card selection is immediately displayed at the leftmost part of the "GAMBLE HISTORY". When there is previous history of card selection, that previous history is moved to the immediate right. The trace of the movement is not illustrated in animation, and hence the history is rewritten at once. Furthermore, the result of the central card is immediately displayed. At this stage, however, neither the win meter nor the gamble amount meter changes. Then failure sound is reproduced, and after 1.2 seconds elapse after the sound reproduction, the screen is switched to a main game screen as indicated by the lower image display panel 141 shown in FIG. 80. At the same time as the switching to the main game screen, "0" is displayed on the win meter.

Figure 81:
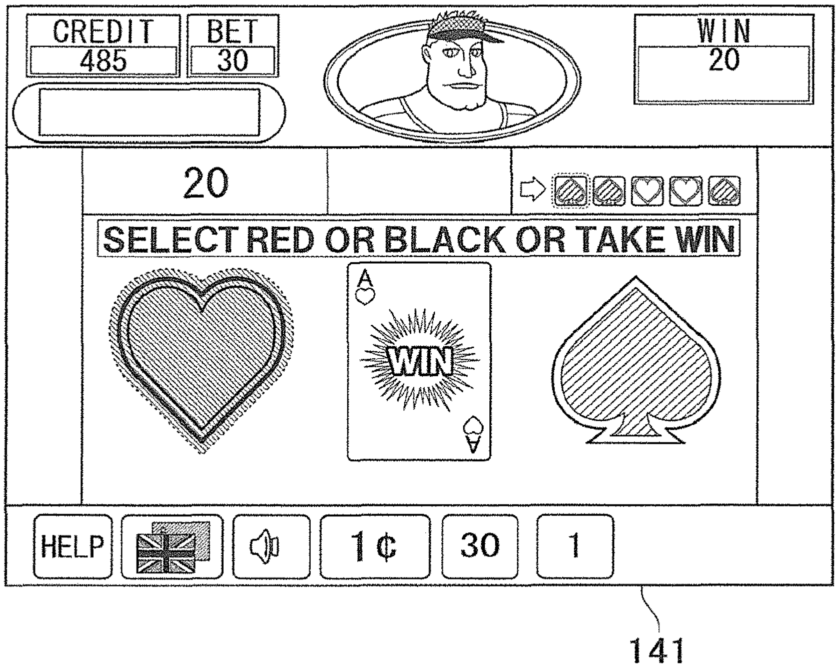
FIG. 81 shows GAMBLE specification of the slot machine related to the embodiment of the present invention.
Figure 82:
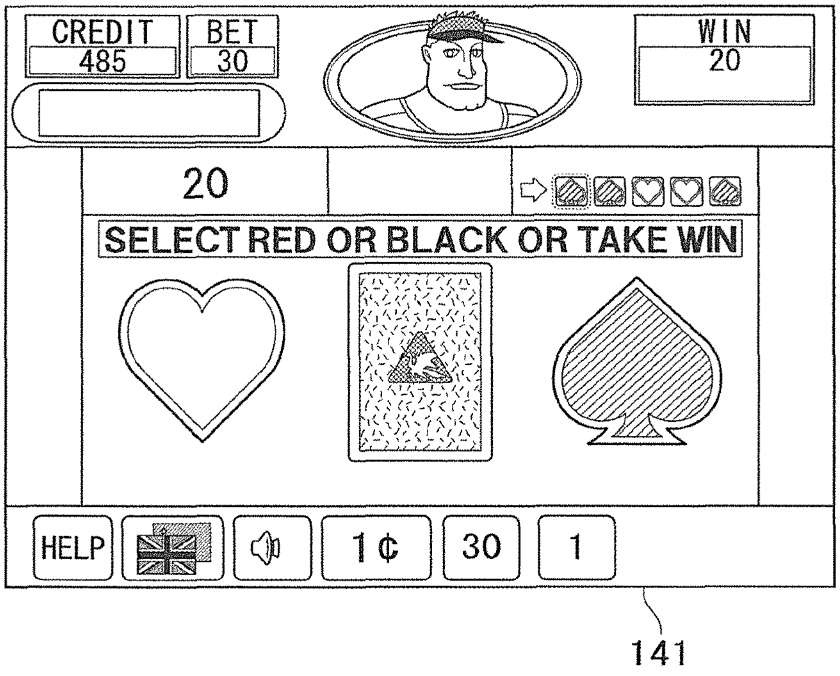
FIG. 82 shows GAMBLE specification of the slot machine related to the embodiment of the present invention.

When the player fails in the selection, the option ("RED" or "BLACK") which is not selected is darkened on the lower image display panel 141 shown in FIG. 81. On the lower image display panel 141 shown in FIG. 81, the history of card selection is immediately displayed at the leftmost part of the "GAMBLE HISTORY". When there is previous history of card selection, that previous history is moved to the immediate right. The trace of the movement is not illustrated in animation, and hence the history is rewritten at once. Furthermore, as the central card, a normal card and a card with a win text are alternately displayed for each frame, and success sound is reproduced for 1.2 seconds. To the win meter, the amount increased by the result of GAMBLE is immediately added. At this stage, however, neither the win meter nor the gamble amount meter changes.

When GAMBLE is played until reaching the upper limit number of times, the value of win is added to the credit at once and the idle state returns. In the meanwhile, the number of times of playing the GAMBLE has not reached the upper limit, the lower image display panel 141 is changed to the lower image display panel 141 shown in FIG. 82. On the lower image display panel 141 shown in FIG. 82, the central card is overturned. Thereafter, the lower image display panel 141 is changed to the lower image display panel 141 shown in FIG. 78.

[RESIDUAL GAMBLE]

Figure 83:
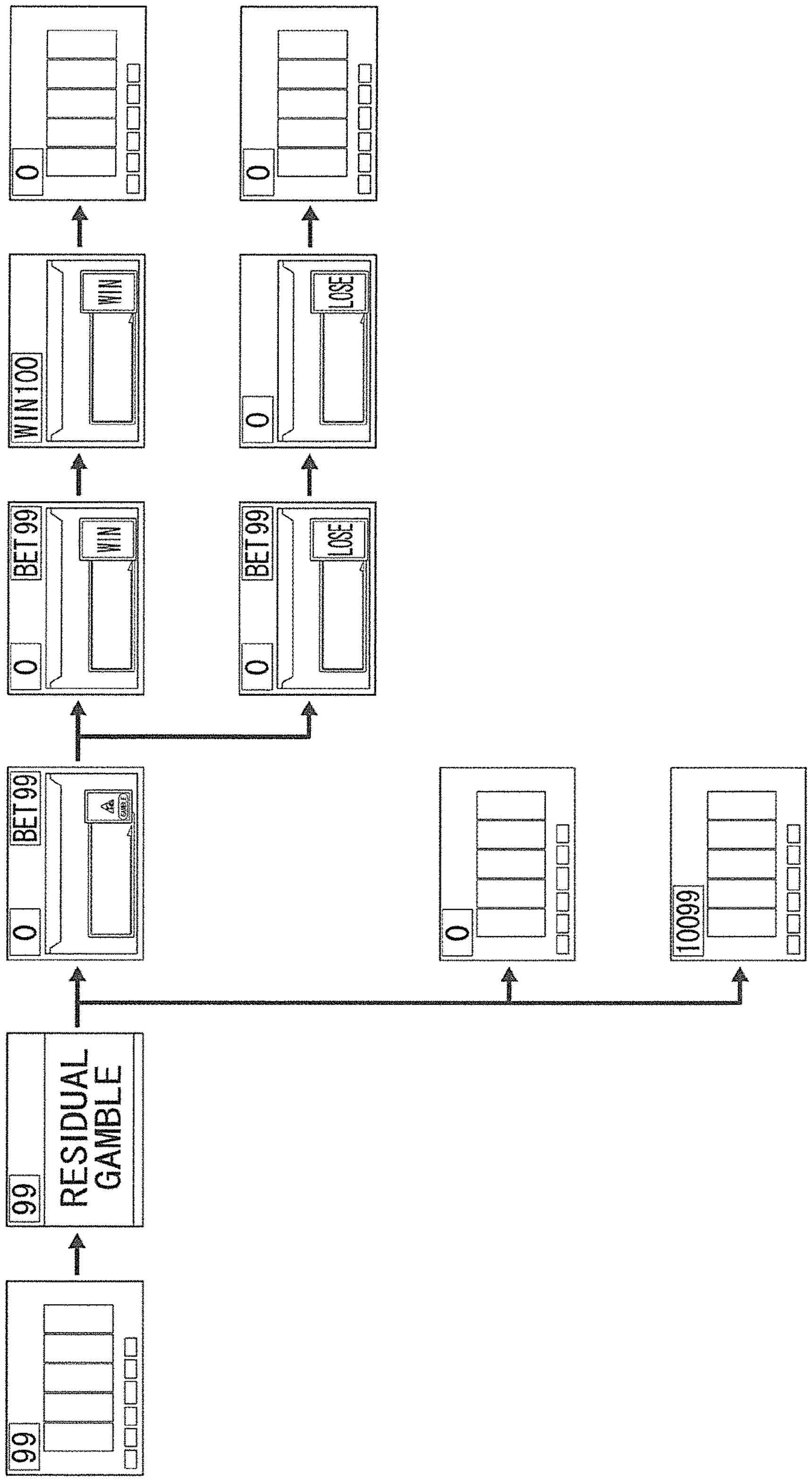
FIG. 83 shows RESIDUAL GAMBLE of the slot machine related to the embodiment of the present invention.
Figure 85:
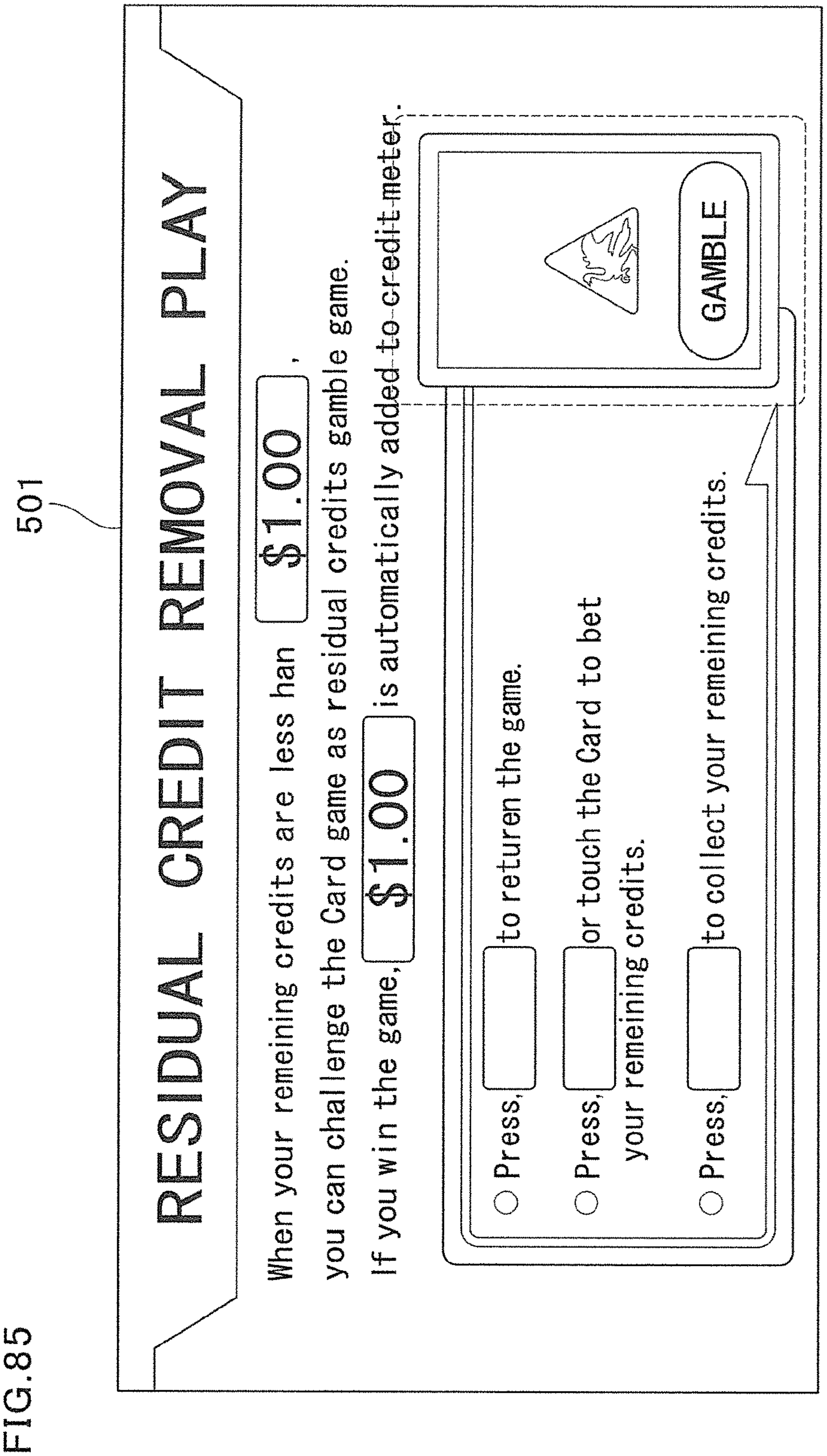
FIG. 85 shows RESIDUAL GAMBLE of the slot machine related to the embodiment of the present invention.

Now, a RESIDUAL GAMBLE in the slot machine 1 will be described with reference to FIG. 83 to FIG. 85. Each of FIG. 83 to FIG. 85 illustrates RESIDUAL GAMBLE in the slot machine of the embodiment of the present invention. RESIDUAL GAMBLE is executed in line with the flow shown in FIG. 83, by using a table shown in FIG. 84. In this connection, in a stage in the RESIDUAL GAMBLE, an image 501 shown in FIG. 85 is displayed on the lower image display panel 141.

[System Font Display Region]

Figure 86:
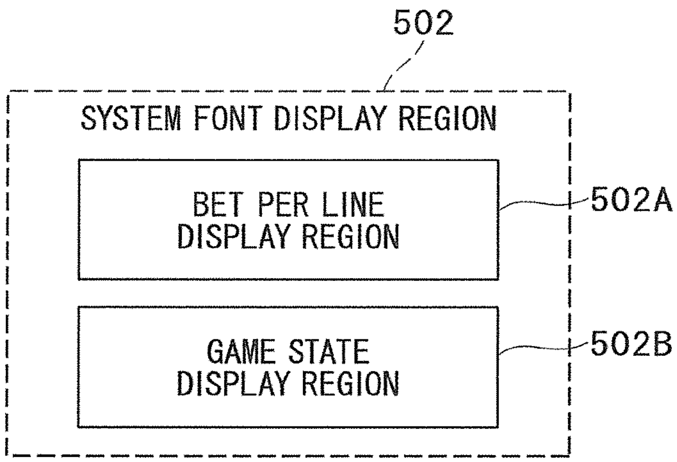
FIG. 86 shows a system font display region of the slot machine of the embodiment of the present invention.

Now, a system font display region of slot machine 1 will be described with reference to FIG. 86. FIG. 86 shows a system font display region of the slot machine of the embodiment of the present invention. The system font display region 502 shown in FIG. 86 is provided with a bet per line display region 502A and a game state display region 502B. The system font display region 502 is provided in the bet information and game state display region 407 on the lower image display panel 141.

[HELP Specification]

Figure 87:
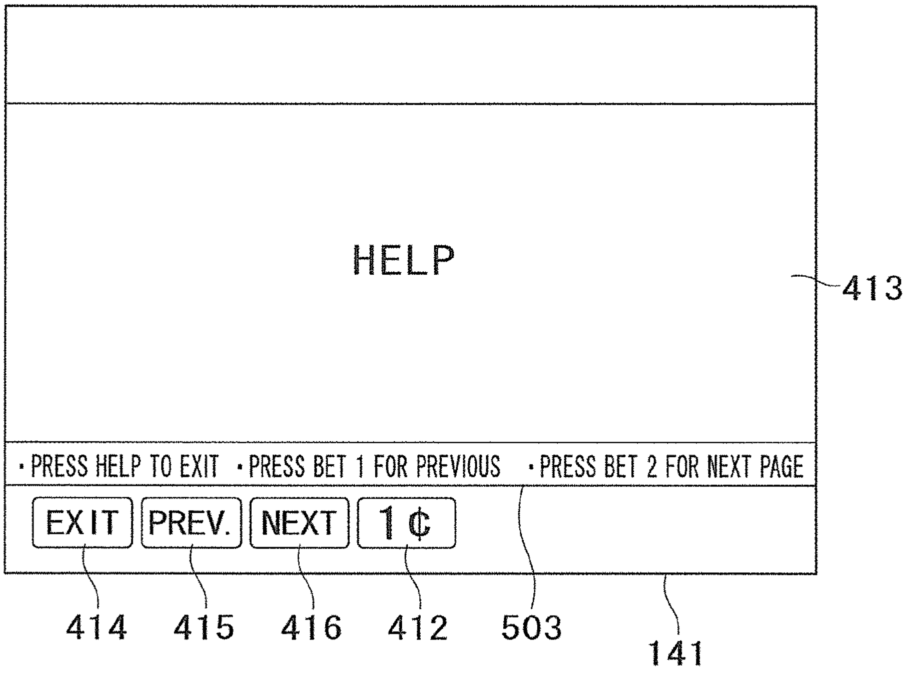
FIG. 87 shows HELP specification of the slot machine related to the embodiment of the present invention.

Now, the HELP specification in the slot machine 1 will be described with reference to FIG. 87 to FIG. 88. FIG. 87 and FIG. 88 explain HELP specification in the slot machine of the embodiment of the present invention. As shown in FIG. 87, on the lower image display panel 141 in HELP specification, a HELP screen 413 and a message region 503 are provided, and an EXIT touch button 414, a PREV. touch button 415, a NEXT touch button 416, and a denomination indicator 412 are displayed.

The message region 503 is displayed with system fonts. This region is linked with the control panel 30 or the control panel 460. For this reason, when another pattern is used and the number is changed, the image display on the region is changed to the correct one in accordance with the change.

As indicated in the table shown in FIG. 88, when the player touches or presses the EXIT touch button 414 or the help button on the control panel, the lower image display panel 141 in HELP specification is changed to the normal screen. When the player touches or presses the PREV, touch button 415 or a BETx1 button on the control panel, the lower image display panel 141 in HELP specification is changed to the preceding HELP page. When the player touches or presses the NEXT touch button 416 or a BETx2 button on the control panel, the lower image display panel 141 in HELP specification proceeds to the next HELP page.

[Layout of Screen Touch Buttons]

Now, the following will describe the layout of the screen touch buttons in the slot machine 1, with reference to FIG. 89 to FIG. 91. FIG. 89 to FIG. 91 show arrangement of screen touch buttons of the slot machine related to the embodiment of the present invention.

Figure 89A:
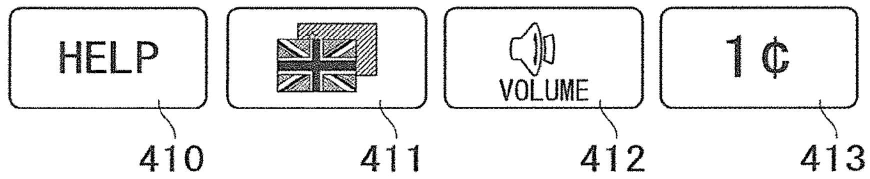
FIG. 89A shows arrangement of screen touch buttons of the slot machine related to the embodiment of the present invention.
Figure 89B:
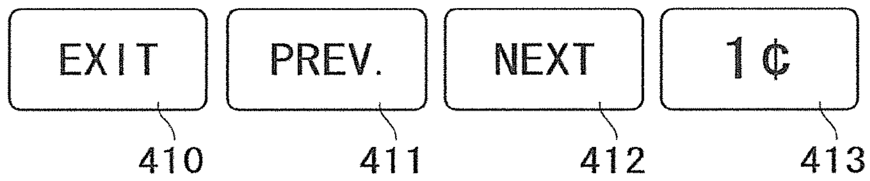
FIG. 89B shows arrangement of screen touch buttons of the slot machine related to the embodiment of the present invention.
Figure 89C:
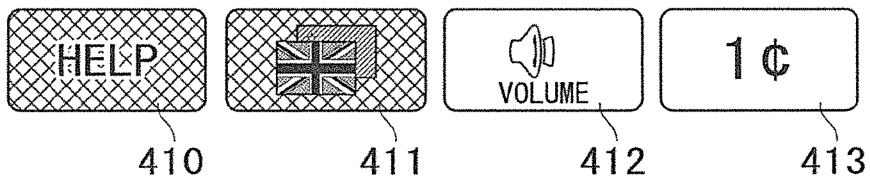
FIG. 89C shows arrangement of screen touch buttons of the slot machine related to the embodiment of the present invention.
Figure 89D:
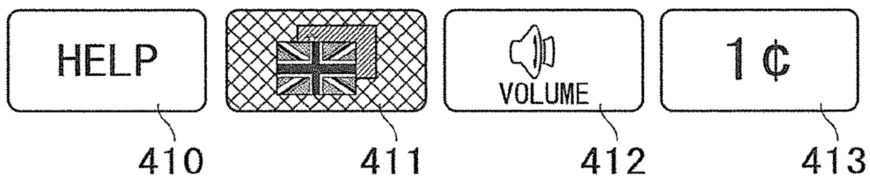
FIG. 89D shows arrangement of screen touch buttons of the slot machine related to the embodiment of the present invention.
Figure 90A:
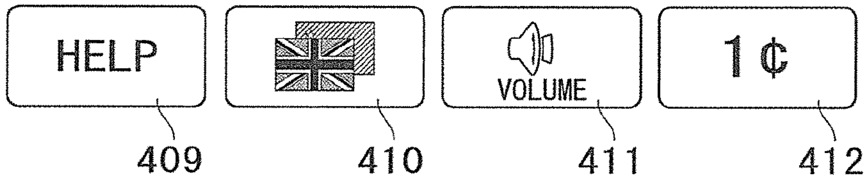
FIG. 90A shows arrangement of screen touch buttons of the slot machine related to the embodiment of the present invention.
Figure 90B:
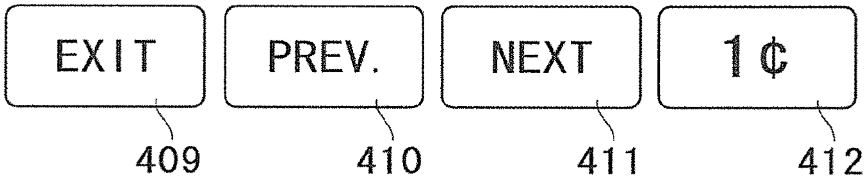
FIG. 90B shows arrangement of screen touch buttons of the slot machine related to the embodiment of the present invention.
Figure 90C:
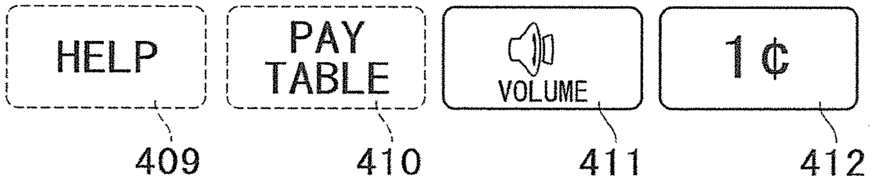
FIG. 90C shows arrangement of screen touch buttons of the slot machine related to the embodiment of the present invention.
Figure 90D:
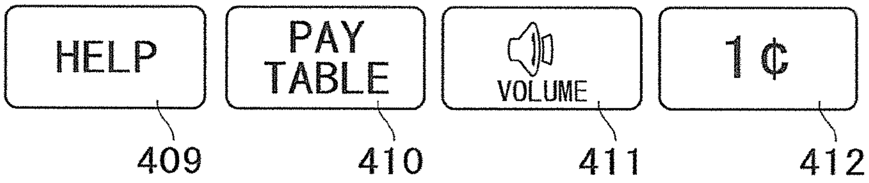
FIG. 90D shows arrangement of screen touch buttons of the slot machine related to the embodiment of the present invention.

FIG. 89A shows the layout of the screen touch buttons during IDLE. FIG. 89B shows the layout of the screen touch buttons during HELP. FIG. 89C shows the layout of the screen touch buttons while the game is in progress. FIG. 89D is the layout of the screen touch buttons in the state of GAMBLE or TAKE WIN. FIG. 90A shows the layout of the screen touch buttons in IDLE (language switching disabled). FIG. 90B shows the layout of the screen touch buttons in HELP (language switching disabled). FIG. 90C shows the layout of the screen touch buttons during the game (language switching disabled). FIG. 90D shows the layout of the screen touch buttons in the state of GAMBLE or TAKE WIN (language switching disabled).

In the layout of the screen touch buttons in the slot machine 1, a help touch button 409, a language switching touch button 410, a sound volume switching touch button 411*a*, a denomination indicator 412, an EXIT touch button 414, a PREV, touch button 415, or NEXT touch button 416 is provided. In particular, when the language switching is disabled and the game is in progress or the state is in GAMBLE or TAKE WIN, as shown in FIGS. 90C and 90D, a paytable touch button 504 is provided. These touch buttons are active when turned on and inactive when turned off as shown in FIG. 91.

[Sound Volume Switching Touch Button]

Figure 92:
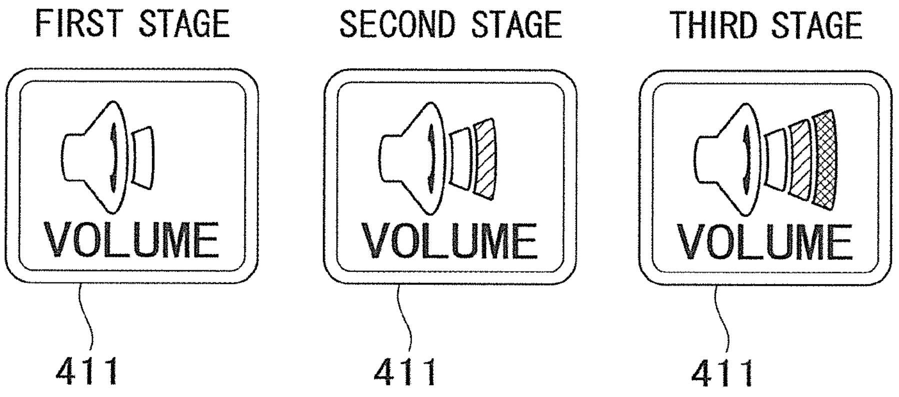
FIG. 92 shows a sound volume switching touch button of the slot machine of the embodiment of the present invention.
Figure 93:
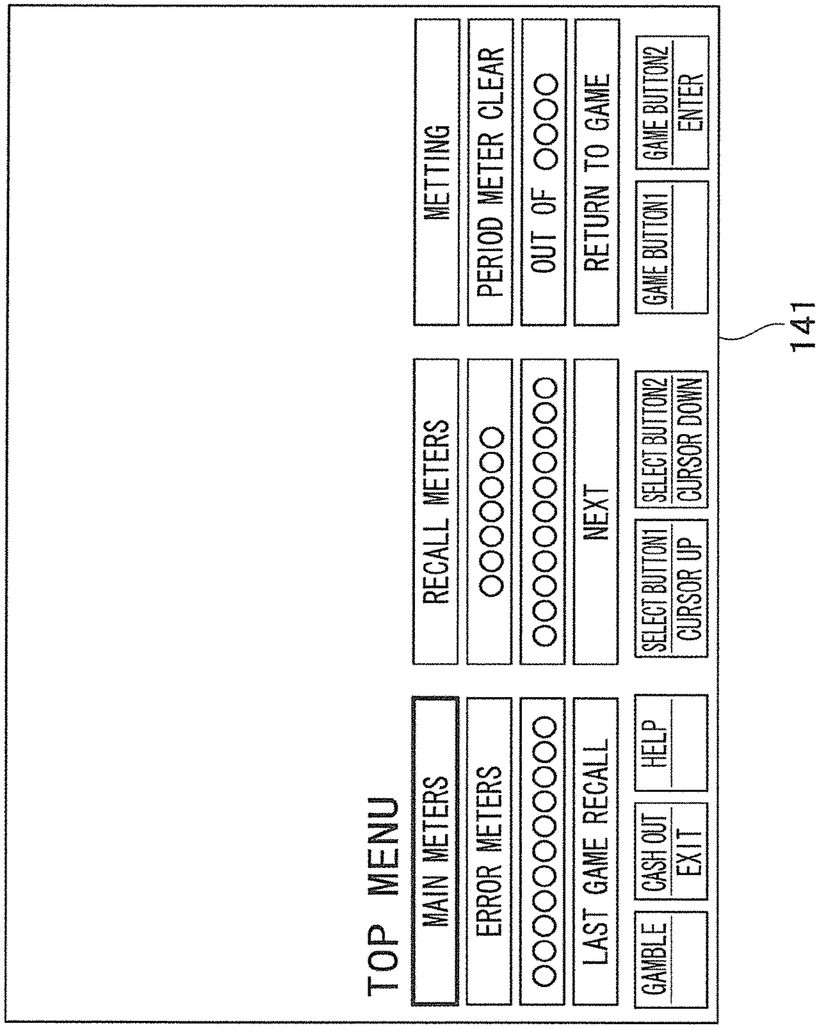
FIG. 93 shows AUDIT national flag switch setting in the slot machine of the embodiment of the present invention.
Figure 94:
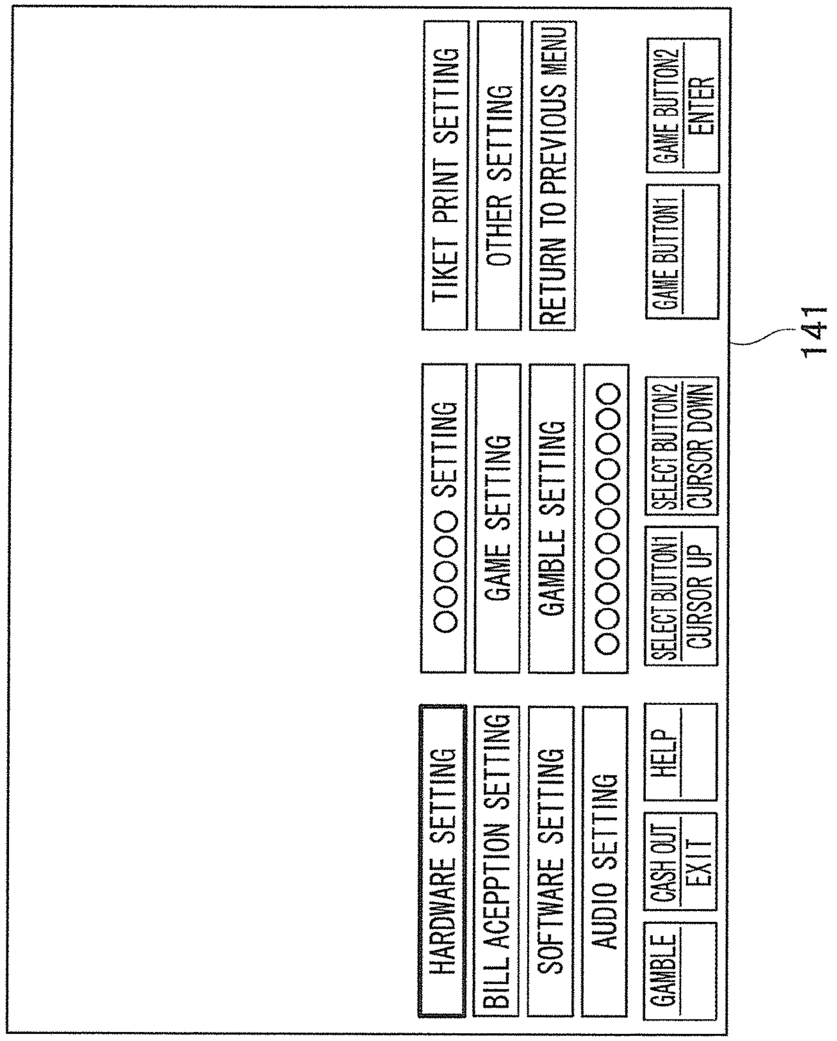
FIG. 94 shows AUDIT national flag switch setting in the slot machine of the embodiment of the present invention.
Figure 95:
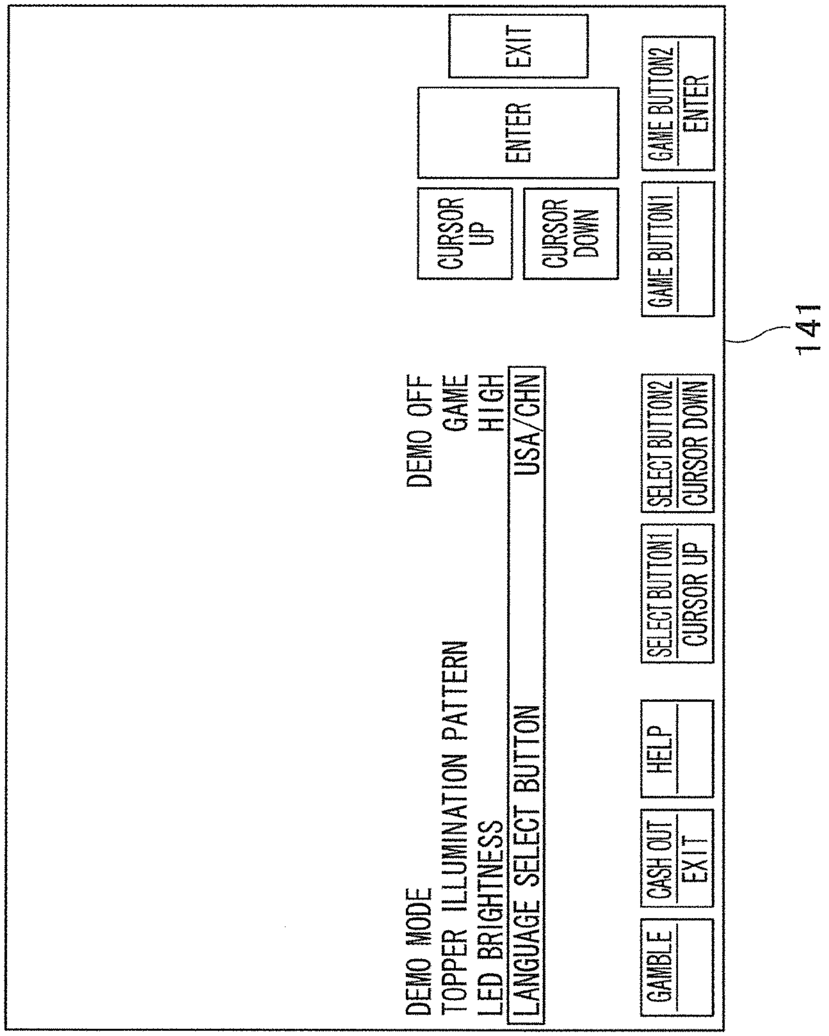
FIG. 95 shows AUDIT national flag switch setting in the slot machine of the embodiment of the present invention.
Figure 96:
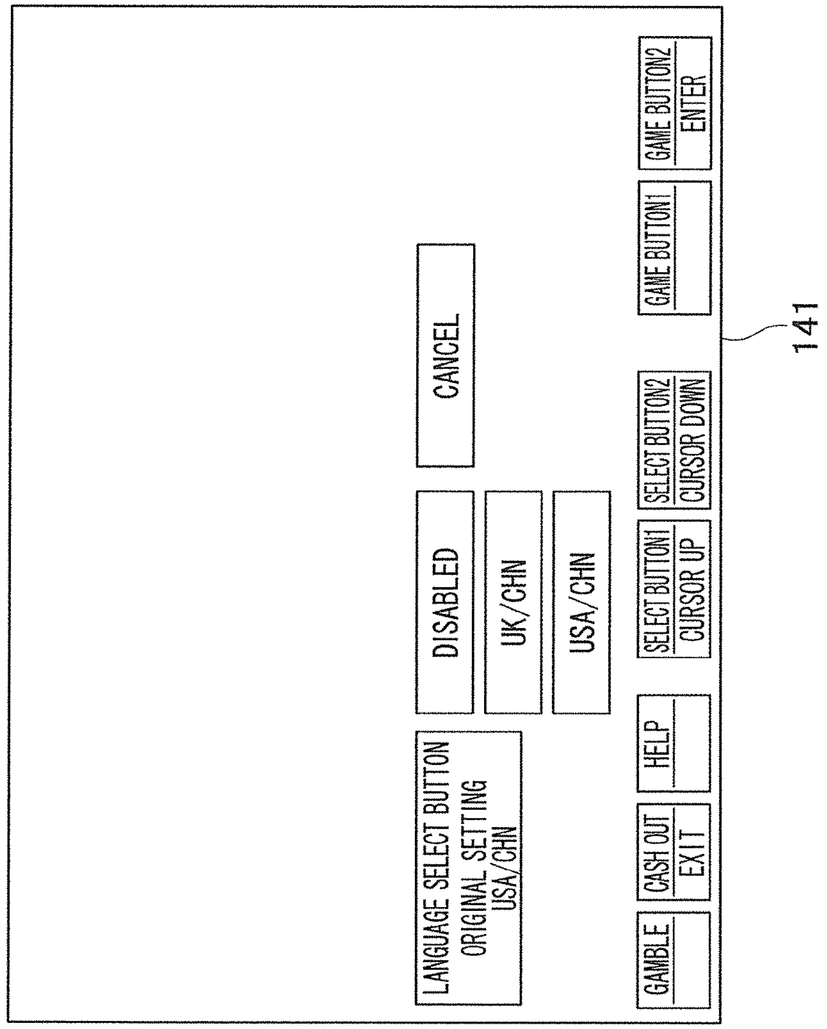
FIG. 96 shows AUDIT national flag switch setting in the slot machine of the embodiment of the present invention.

Now, referring to FIG. 92, the following will describe the sound volume switching touch button 411 of the slot machine 1. FIG. 92 illustrates the sound volume switching touch button of the slot machine of the embodiment of the present invention. As shown in FIG. 92, the sound volume switching touch button 411 is used for selecting one of the first-stage minimum volume, second-stage intermediate volume, and third-stage maximum volume. The sound volume is set at the first-stage minimum volume in the initial setting. Each time the player touches the sound volume switching touch button 411, the sound volume is changed to the second-stage intermediate volume, to the third-stage maximum volume, to the first-stage minimum volume, and to the second-stage intermediate volume, in a looped manner.

[AUDIT National Flag Switch Setting]

Now, referring to FIG. 93 to FIG. 96, AUDIT national flag switch setting of the slot machine 1 will be described. FIGS. 93 to 96 show AUDIT national flag switch setting in the slot machine of the embodiment of the present invention. On the lower image display panel 141 shown in FIG. 93 to FIG. 96, the AUDIT national flag switch setting of the slot machine of the embodiment of the present invention makes it possible to specify, by the AUDIT MENU, the "national flag" displayed on the language switching touch button 410 when switching the language. The "national flag" displayed on the language switching touch button 410 is one of the national flags, of U.S.A., U.K., and China.

[Other Notes]

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a display device configured to display a game result by rearranging symbols;

a storage device configured to store a bonus random determination table used for determining whether to award the right to run a bonus game, and including a running right stocking area in which the right to run the bonus game is accumulatively stored; and a controller, the controller executing the steps of:

(1-1) accepting, via a gaming medium acceptor, a gaming medium with a monetary value which establishes a credit balance for the player;

(1-2) receiving, via a bet input device, a bet whose amount is designated by the player based on the credit balance;

(1-3) executing a normal game as a result of the player's bet;

(1A) as the normal game, randomly selecting symbols to be rearranged on the display device;

(1B) rearranging the symbols selected in the step (1A) on the display device and awarding a benefit based on a combination of the rearranged symbols;

(1C) when the awarded benefit is the right to run the free game for a predetermined number of times, randomly selecting, as a free game, symbols to be rearranged on the display device;

(1D) rearranging the symbols selected in the step (1C) on the display device, awarding a benefit based on a combination of the rearranged symbols, and executing, based on the bonus random determination table, bonus random determination for a number of times corresponding to the number of specific symbols rearranged;

(1E) accumulatively storing, in the running right stocking area of the storage device, the right to run the bonus game obtained as a result of the bonus random determination;

(1F) repeating the steps (1C) to (1E) until the free game is run for the awarded number of times; and (1G) after the running of the free game for the predetermined number of times, successively running the bonus game for a number of times corresponding to the right to run the bonus game accumulatively stored in the running right stocking area of the storage device.

2. The gaming machine according to claim 1, wherein, the storage device includes a bonus storage area in which a part of a bet amount betted to run the normal game is accumulatively stored as a resource, a table storage area in which a bonus random determination table for determining whether to award the right to run the bonus game and a bonus payout determination table for determining the payout amount in the bonus game based on the resource, and the running right stocking area in which the right to run the bonus game is accumulatively stored, and the controller is configured to execute the steps of:

(2A) in the bonus storage area of the storage device, accumulatively storing a part of a bet amount betted to run the normal game as a resource;

(2B) as the normal game, randomly selecting symbols to be rearranged on the display device;

(2C) rearranging the symbols selected in the step (2B) on the display device and awarding a benefit based on a combination of the rearranged symbols;

(2D) when the awarded benefit is the right to run the free game for a predetermined number of times, randomly selecting, as a free game, symbols to be rearranged on the display device;

(2E) rearranging the symbols selected in the step (2D) on the display device, awarding a benefit based on a combination of the rearranged symbols, and executing, based on the bonus random determination table, bonus random determination for a number of times corresponding the number of specific symbols rearranged;

(2F) accumulatively storing, in the running right stocking area of the storage device, the right to run the bonus game obtained as a result of the bonus random determination;

(2G) repeating the steps (2D) to (2F) until the free game is run for the awarded number of times;

(2H) after the running of the free game for the predetermined number of times, serially running the bonus game for a number of times corresponding to the right to run the bonus game accumulatively stored in the running right stocking area of the storage device, as random determination based on the bonus payout determination table.

3. The gaming machine according to claim 1, wherein, the controller is configured to:

award the right to run the free game for the predetermined number of times when the number of the specific symbols rearranged on the display device is a predetermined number or more; and in the step (1B), execute bonus random determination based on the bonus random determination table for a number of times corresponding to the number of the specific symbols rearranged, and accumulatively store, in the running right stocking area of the storage device, the right to run the bonus game obtained as a result of the bonus random determination.

4. The gaming machine according to claim 1, wherein, the controller is configured to:

when the right to run the bonus game at least once is awarded as a result of the bonus random determination, display a message notifying that the right to run the bonus game is awarded on the display device, during a period from awarding of the right to run the bonus game to end of running of the free game for the predetermined number of times.

5. The gaming machine according to claim 1, wherein, the controller is configured to:

execute an effect of changing a display state of the specific symbol rearranged on the display device to another display state.

6. The gaming machine according to claim 1, wherein, the controller is configured to:

when the specific symbol is rearranged on the display device and winning is achieved in random determination, execute a step-up effect of displaying effect images from a minor effect to a major effect stepwise on the display device.

7. The gaming machine according to claim 1, wherein, the controller is configured to:

in the step (1G), display a payout amount awarded as a result of the bonus game on the display device;

when the right to run the bonus game is awarded as a result of the bonus random determination, execute confirmation effect random determination of determining whether to execute a bonus game confirmation effect; and when the bonus game confirmation effect is executed as a result of the confirmation effect random determination, execute the bonus game confirmation effect of emphasizing the awarding of the right to run the bonus game on the display device, at a timing before a payout amount awarded in the bonus game is displayed on the display device.

8. A gaming machine comprising:

a symbol display unit configured to rearrange symbols of plural types including a specific symbol which triggers bonus random determination; and a control unit that accepts, via a gaming medium acceptor, a gaming medium with a monetary value which establishes a credit balance for the player, receives, via a bet input device, a bet whose amount is designated by the player based on the credit balance, and executes a normal game as a result of the player's bet; and that includes:

a free game control processing unit configured to successively execute a free game more than once when a predetermined condition is triggered in the normal game;

a random determination processing unit configured to execute, when the specific symbol is displayed on the symbol display unit, bonus random determination for a number of times corresponding to the number of the displayed specific symbols;

a storage processing unit configured to store at least one result of the bonus random determination by the random determination processing unit; and a processing unit configured to serially award a prize based on the at least one result of the bonus random determination stored in the storage processing unit and the number of the at least one result, after execution of the free game more than once by the free game control unit.

9. The gaming machine according to claim 1, wherein the controller, in the step (1D), counts how many specific symbols are rearranged on the display device, and wherein the number of specific symbols is the counted number in the step (1D).

10. The gaming machine according to claim 1, wherein the bonus game is a different type of game from the free game.

11. The gaming machine according to claim 8, wherein the random determination processing unit counts how many specific symbols are displayed on the symbol display unit, and wherein the number of the displayed specific symbols is the number counted by the random determination processing unit.

12. The gaming machine according to claim 8, wherein the at least one result is to provide a bonus game being a different type of game from the free game.

* * * * *